(12) United States Patent
Jung et al.

(10) Patent No.: US 10,055,693 B2
(45) Date of Patent: Aug. 21, 2018

(54) LIFE EXPERIENCE MEMORIALIZATION WITH OBSERVATIONAL LINKAGE VIA USER RECOGNITION

(71) Applicant: Elwha, LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 14/338,345

(22) Filed: Jul. 22, 2014

(65) Prior Publication Data

US 2015/0294631 A1 Oct. 15, 2015

Related U.S. Application Data

(63) Continuation-in-part of application No. 14/253,692, filed on Apr. 15, 2014.

(51) Int. Cl.
*G09G 3/36* (2006.01)
*G06Q 10/00* (2012.01)

(52) U.S. Cl.
CPC .................................. *G06Q 10/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,502,947 B2 * | 3/2009 | Chen | ...................... | G06F 3/1438 345/502 |
| 8,839,012 B2 * | 9/2014 | Khodorkovsky | ..... | G06F 1/3287 345/502 |
| 9,035,956 B1 * | 5/2015 | Schreyer | ................... | G06T 1/60 345/502 |
| 9,165,282 B2 | 10/2015 | Fischer et al. | | |

(Continued)

OTHER PUBLICATIONS

"How to successfully begin your IEEE WebEx conference (Visual and audio)"; bearing a date of 2013; printed on Jul. 31, 2017; pp. 1-5 located at: http://sites.ieee.org/ias-icps/files/2013/04/ieee_webex_meeting_instructions.pdf.

*Primary Examiner* — Carolyn R Edwards
*Assistant Examiner* — Deeprose Subedi

(57) ABSTRACT

Disclosed herein are example embodiments for life experience memorialization with observational linkage via user recognition. For certain example embodiments, at least one machine may include: (a) at least one first component including at least a first set of voltages coupled to at least one light-perturbing unit of at least one display, the first set of voltages corresponding to at least one media item; (b) at least one second component including at least a second set of voltages coupled to at least one sensor, the second set of voltages representative of at least one user; or (c) at least one third component including at least a third set of voltages having one or more voltage levels that are responsive at least to: (i) a first set of voltages of at least one first component and (ii) a second set of voltages of at least one second component. However, claimed subject matter is not limited to any particular described embodiments, implementations, examples, or so forth.

31 Claims, 34 Drawing Sheets

(56) References Cited

U.S. PATENT DOCUMENTS

| | | |
|---|---|---|
| 2003/0126275 A1 | 7/2003 | Mungavan et al. |
| 2004/0044532 A1 | 3/2004 | Karstens |
| 2007/0245243 A1 | 10/2007 | Lanza et al. |
| 2009/0055385 A1 | 2/2009 | Jeon et al. |
| 2009/0077064 A1 | 3/2009 | Daigle |
| 2009/0271524 A1 | 10/2009 | Davi et al. |
| 2010/0070858 A1 | 3/2010 | Morris et al. |
| 2011/0060742 A1 | 3/2011 | Heller et al. |
| 2011/0246908 A1 | 10/2011 | Akram et al. |
| 2011/0274405 A1 | 11/2011 | Godar |
| 2012/0030587 A1 | 2/2012 | Ketkar |
| 2013/0018882 A1 | 1/2013 | Listermann |
| 2013/0061280 A1 | 3/2013 | Bartnik et al. |
| 2013/0166651 A1 | 6/2013 | Joshi |
| 2014/0012905 A1 | 1/2014 | Roche et al. |
| 2014/0052785 A1* | 2/2014 | Sirpal ............ H04N 5/44 709/204 |
| 2014/0074759 A1 | 3/2014 | Lewis et al. |
| 2014/0086458 A1 | 3/2014 | Rogers |
| 2014/0089980 A1 | 3/2014 | Alexander et al. |
| 2014/0156746 A1* | 6/2014 | Wheatley ............ H04L 67/22 709/204 |
| 2014/0181123 A1 | 6/2014 | Tuffet Blaise et al. |
| 2014/0188997 A1 | 7/2014 | Schneiderman et al. |
| 2014/0250390 A1 | 9/2014 | Holmes et al. |
| 2014/0298395 A1 | 10/2014 | Yang et al. |
| 2015/0127727 A1 | 5/2015 | Tseng et al. |
| 2015/0134653 A1 | 5/2015 | Bayer et al. |
| 2015/0143409 A1 | 5/2015 | Maughan |
| 2015/0189377 A1 | 7/2015 | Wheatley et al. |
| 2015/0245095 A1 | 8/2015 | Gonzalez |
| 2015/0249864 A1 | 9/2015 | Tang et al. |
| 2015/0249906 A1 | 9/2015 | Thomas et al. |
| 2015/0272496 A1 | 10/2015 | Klappert et al. |
| 2016/0014477 A1 | 1/2016 | Siders |
| 2016/0034573 A1 | 2/2016 | Mayo et al. |

\* cited by examiner

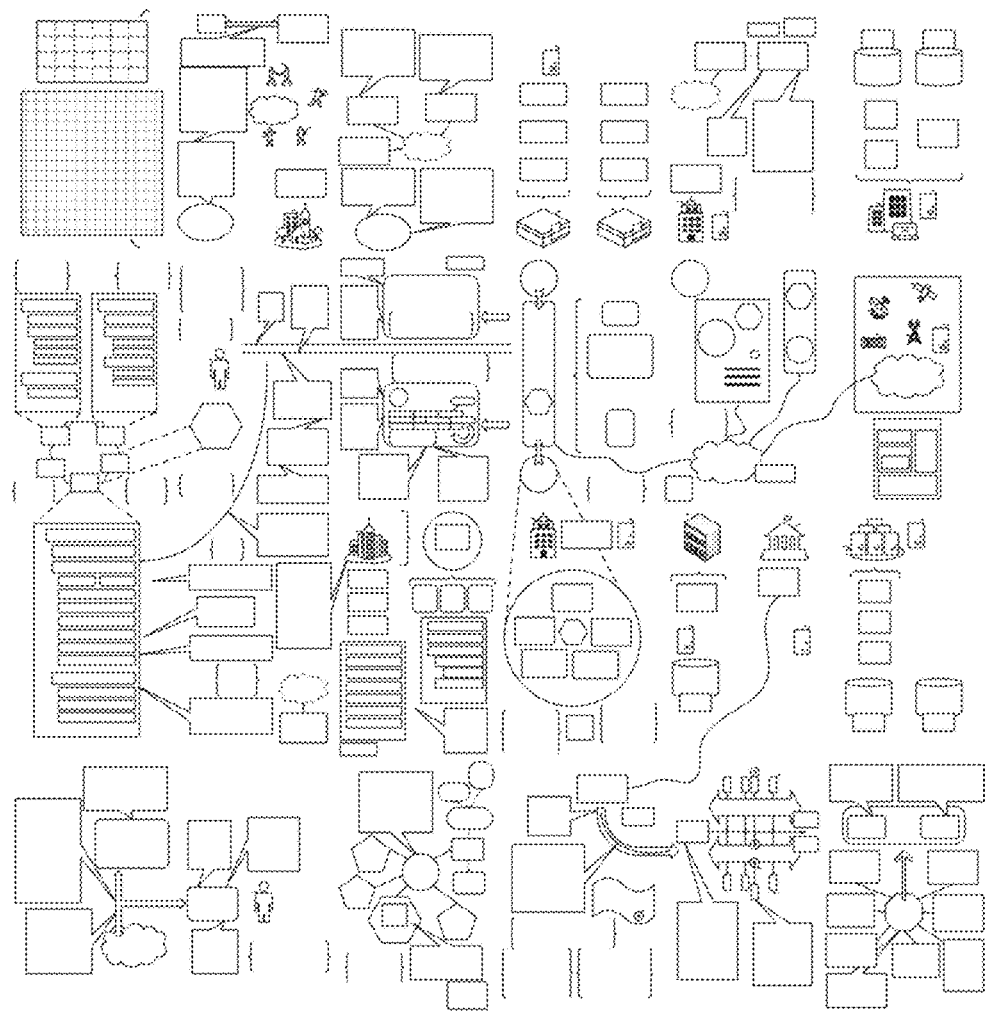

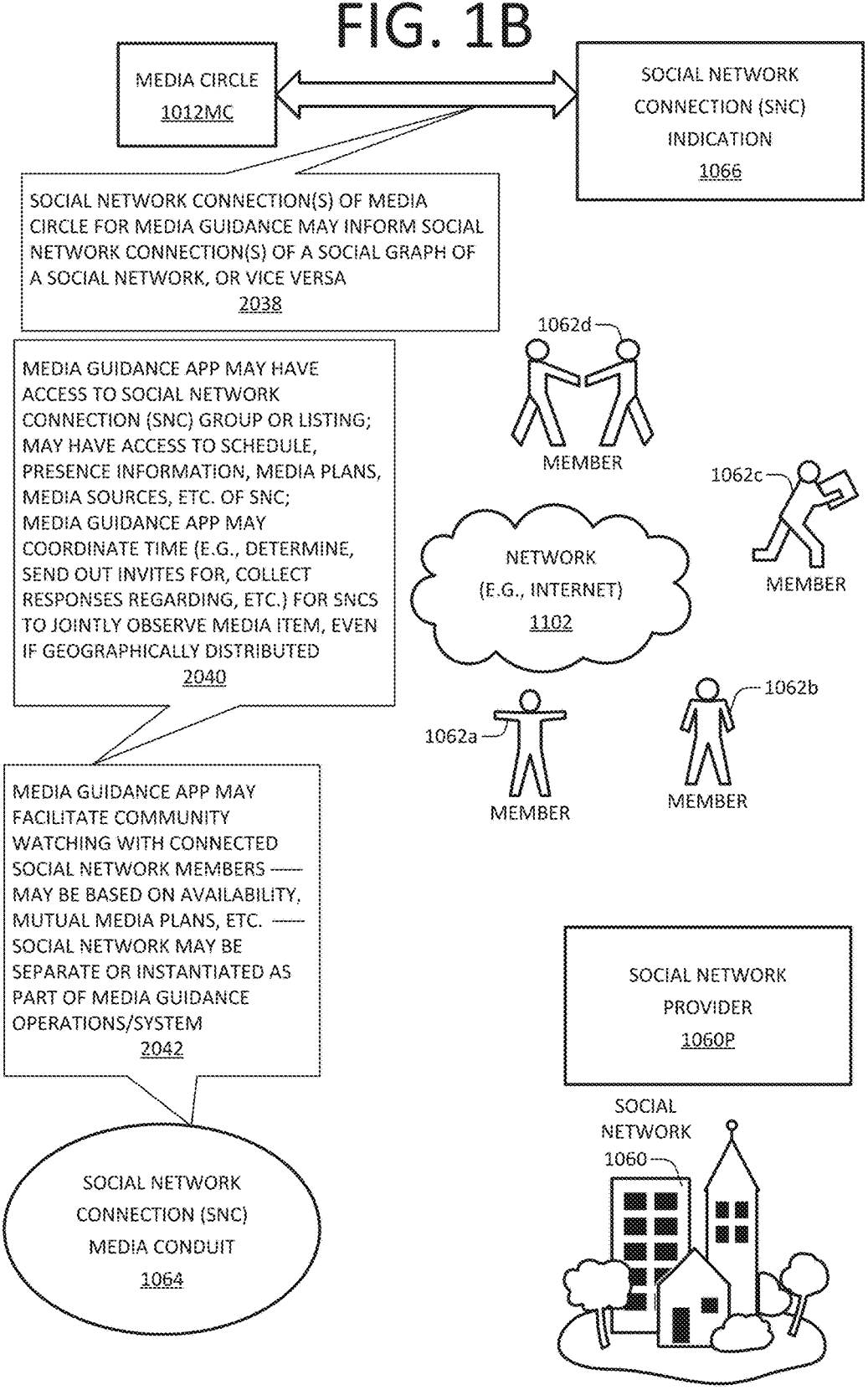

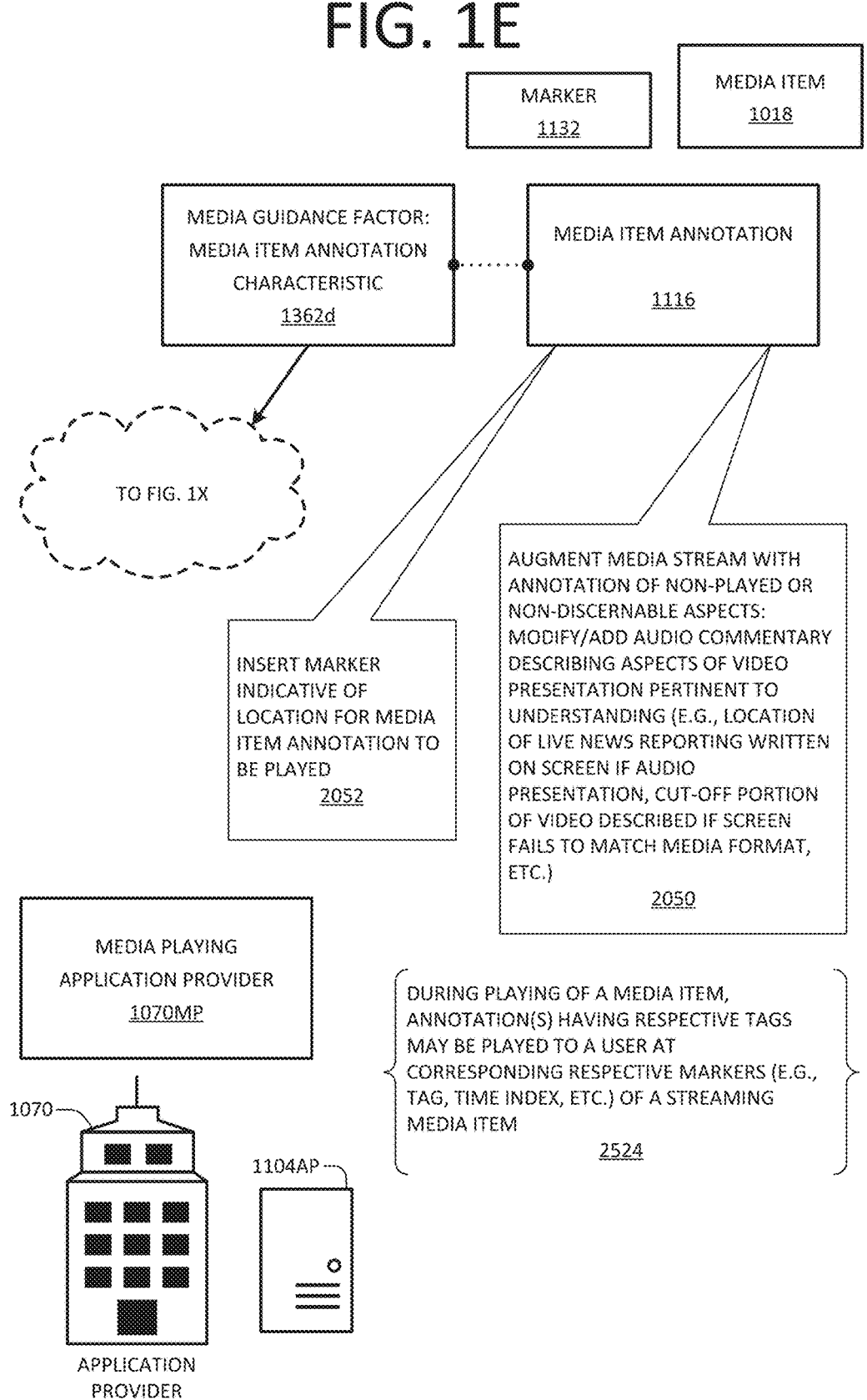

FIG. 1F
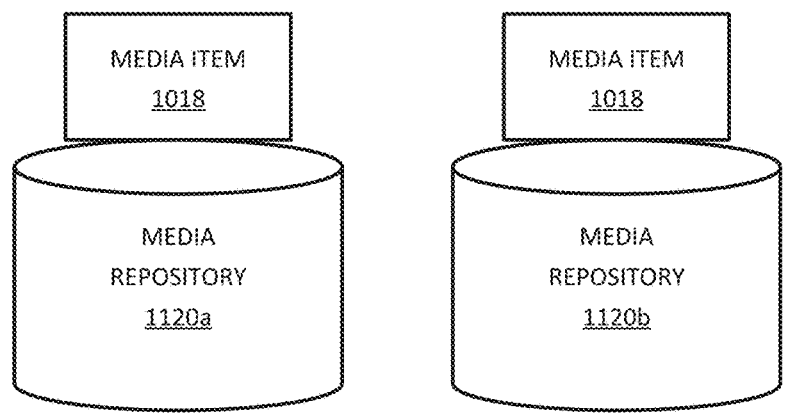
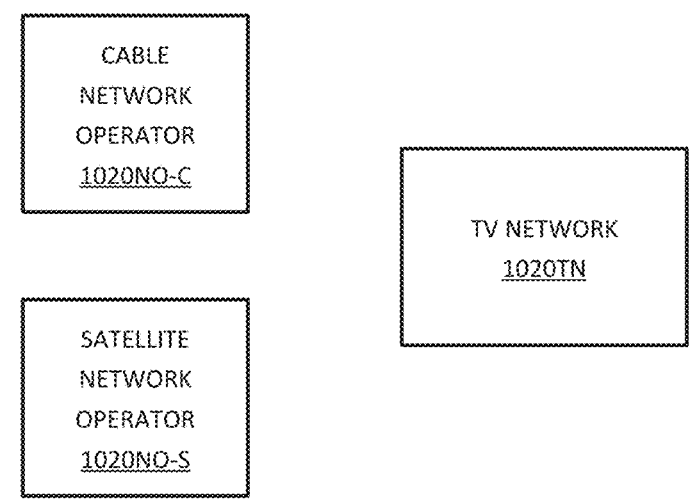
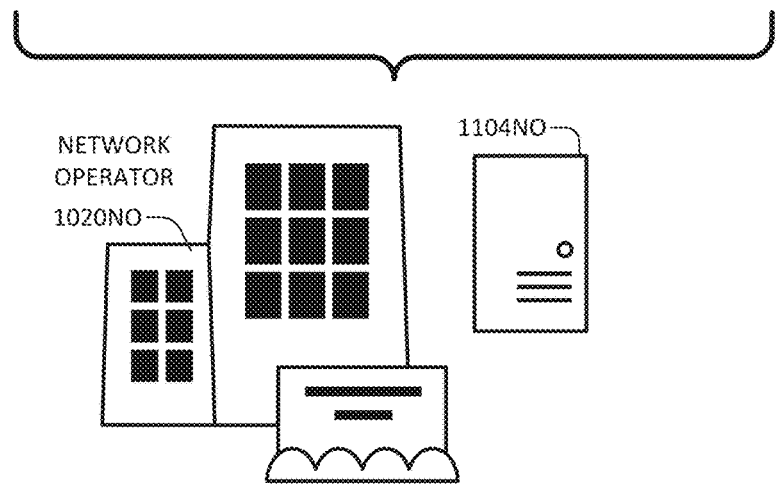

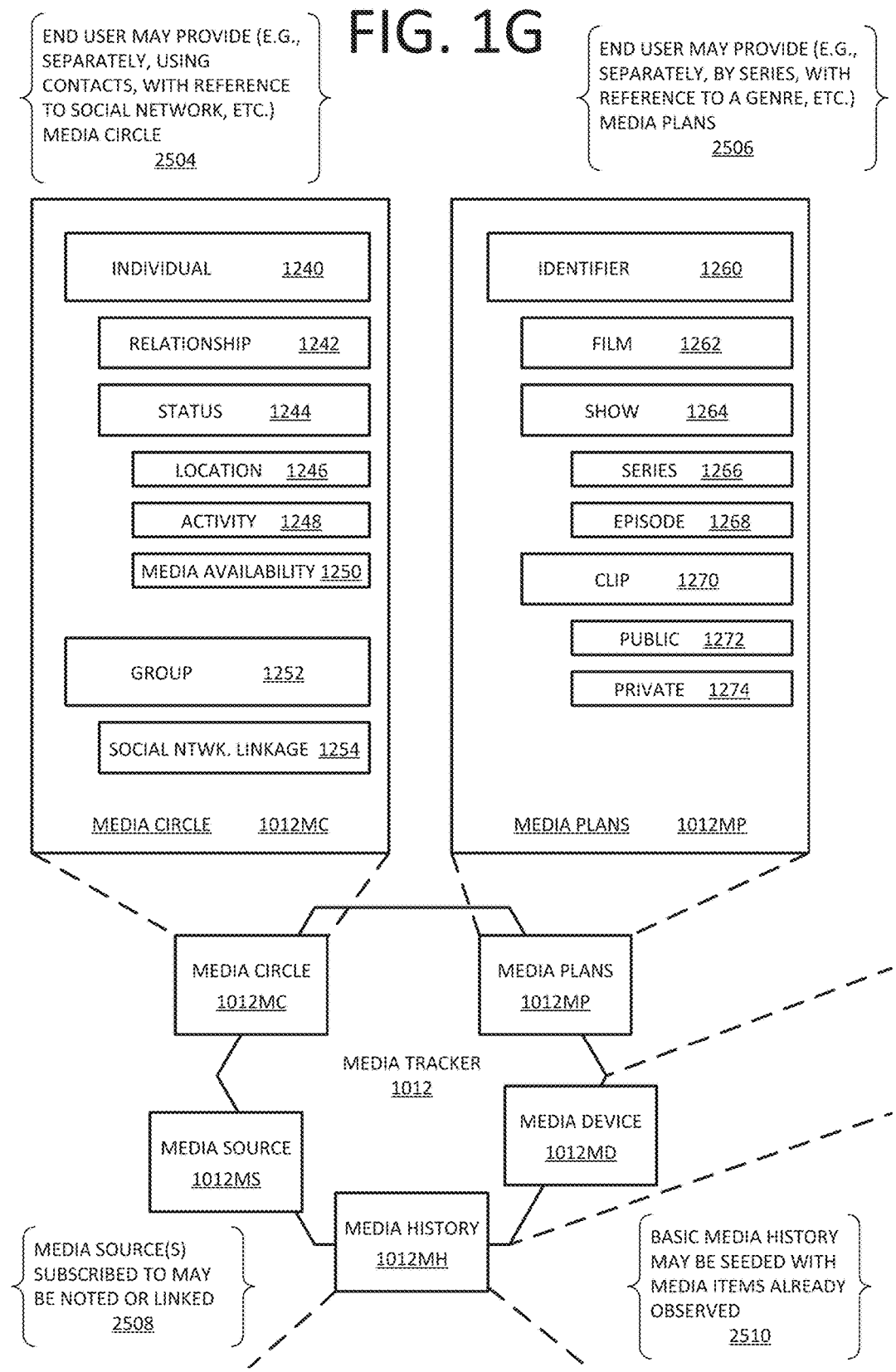

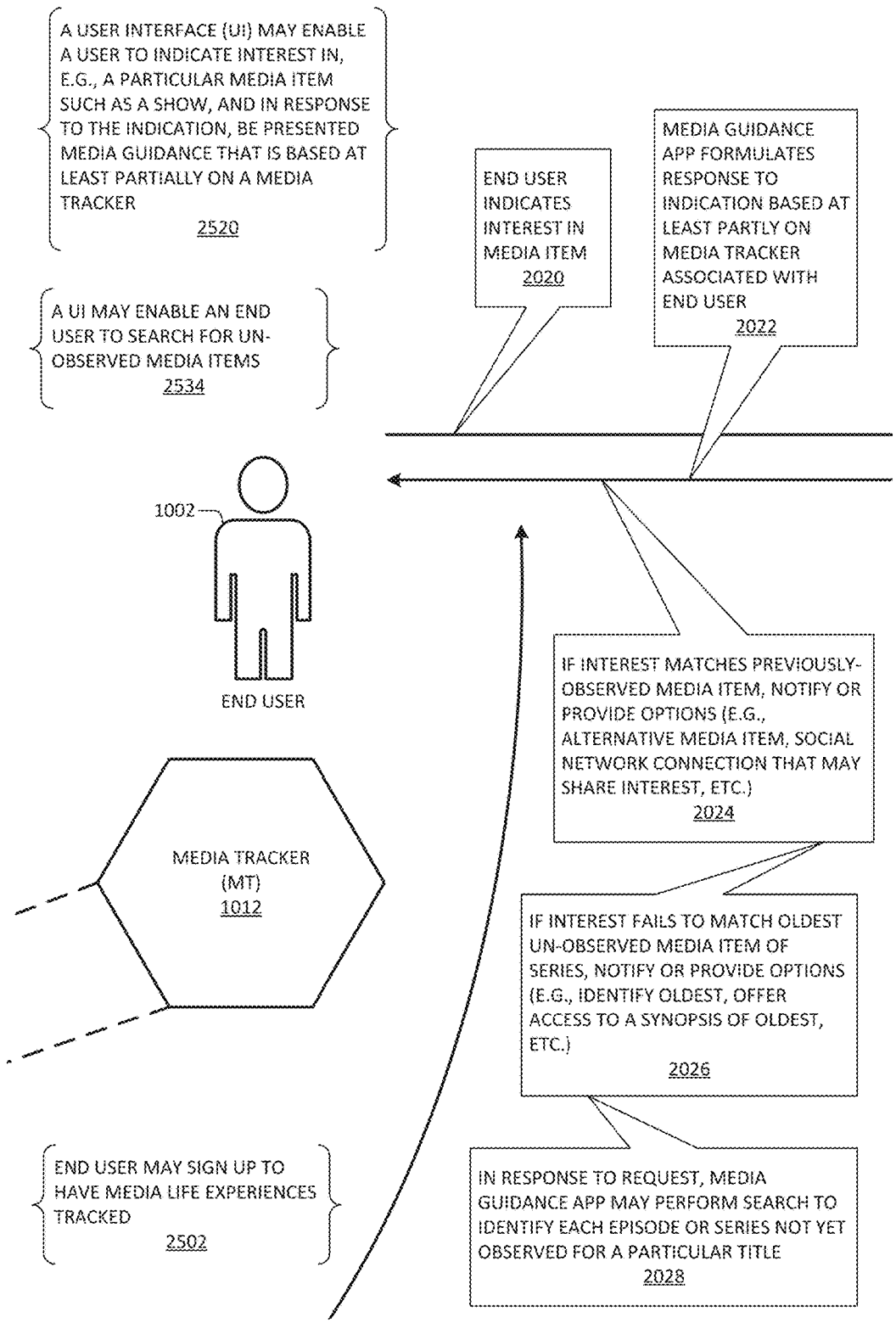

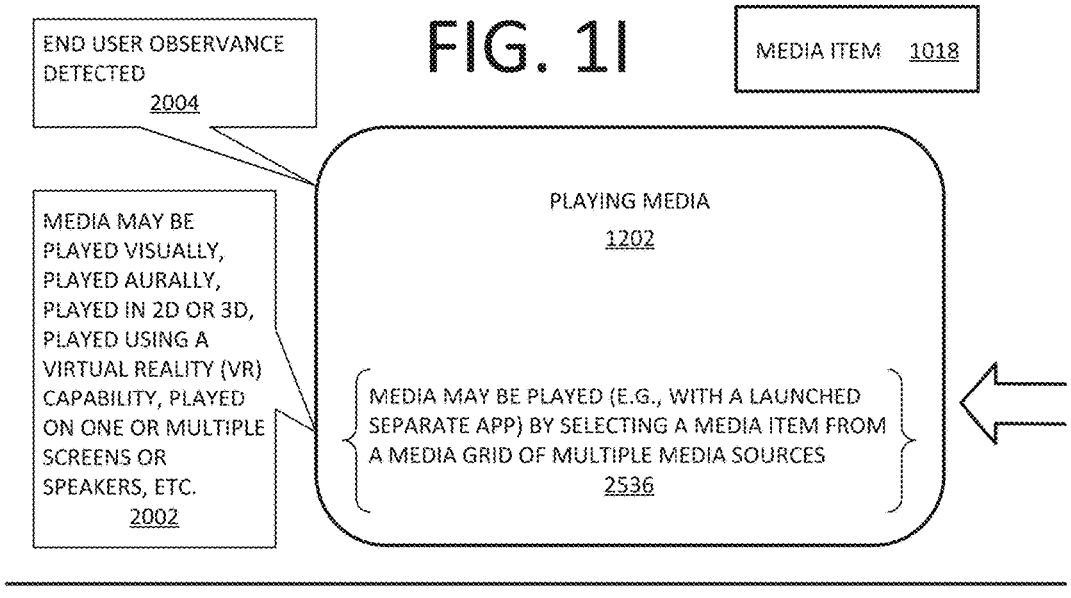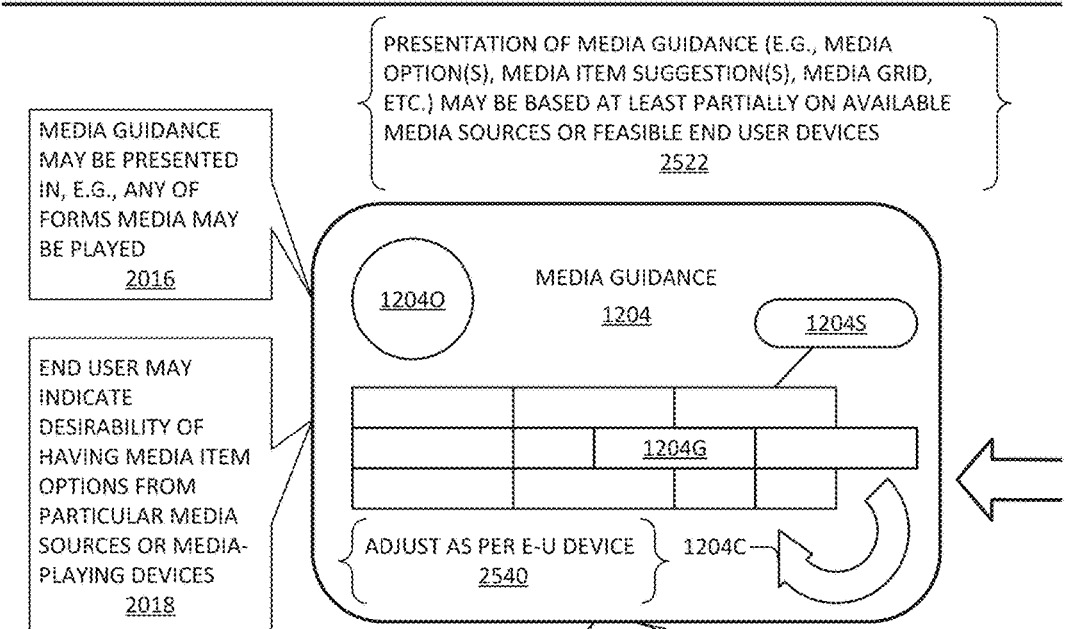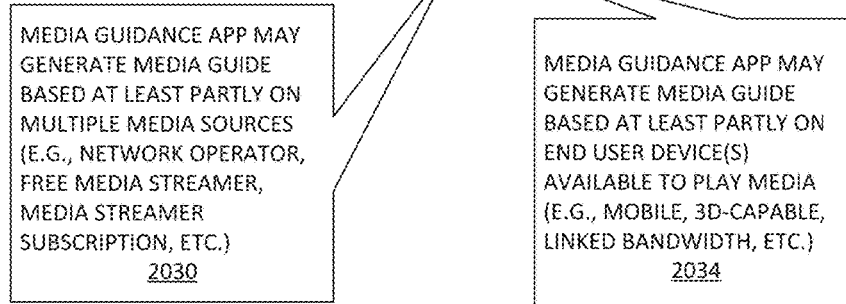

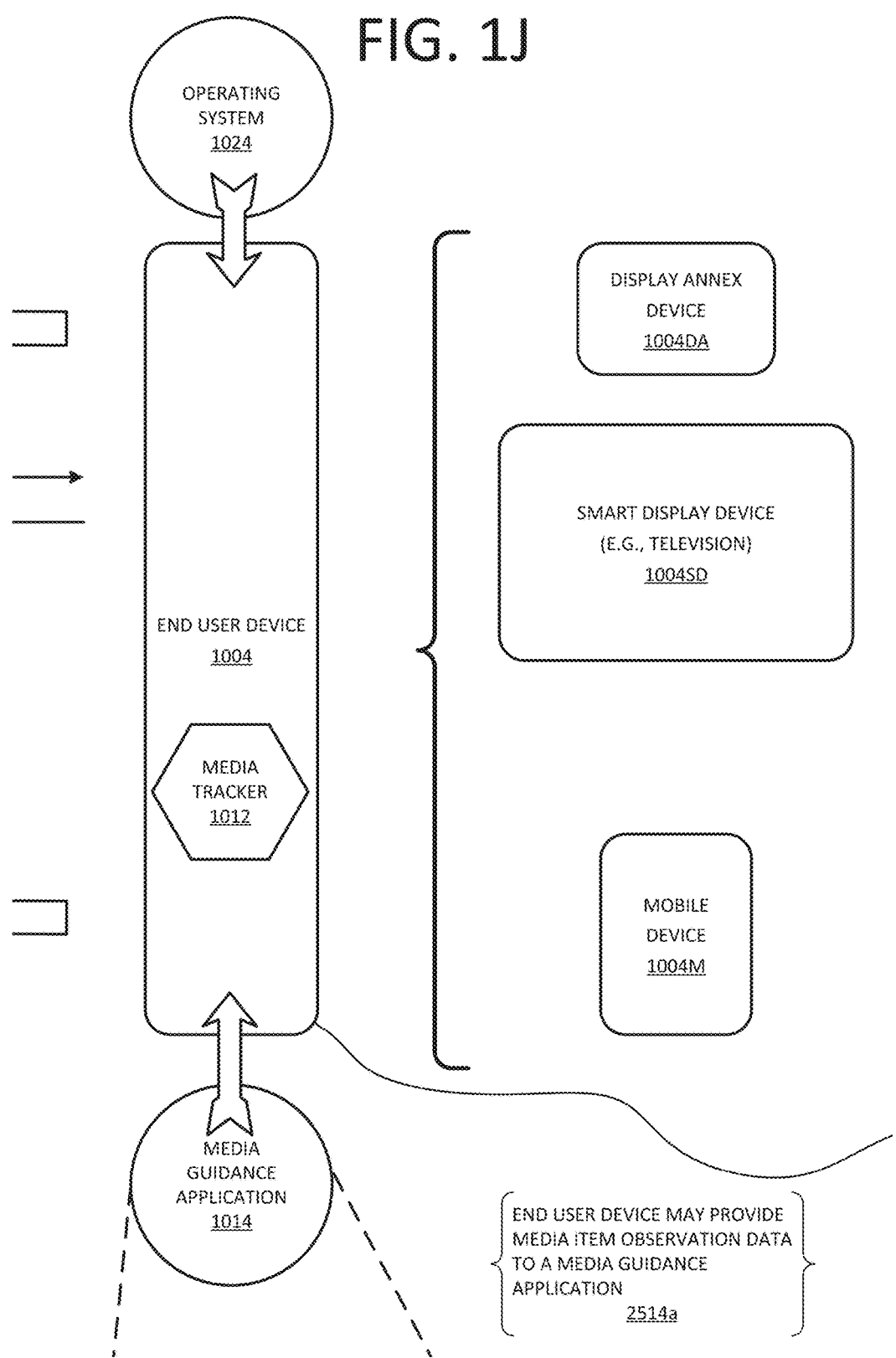

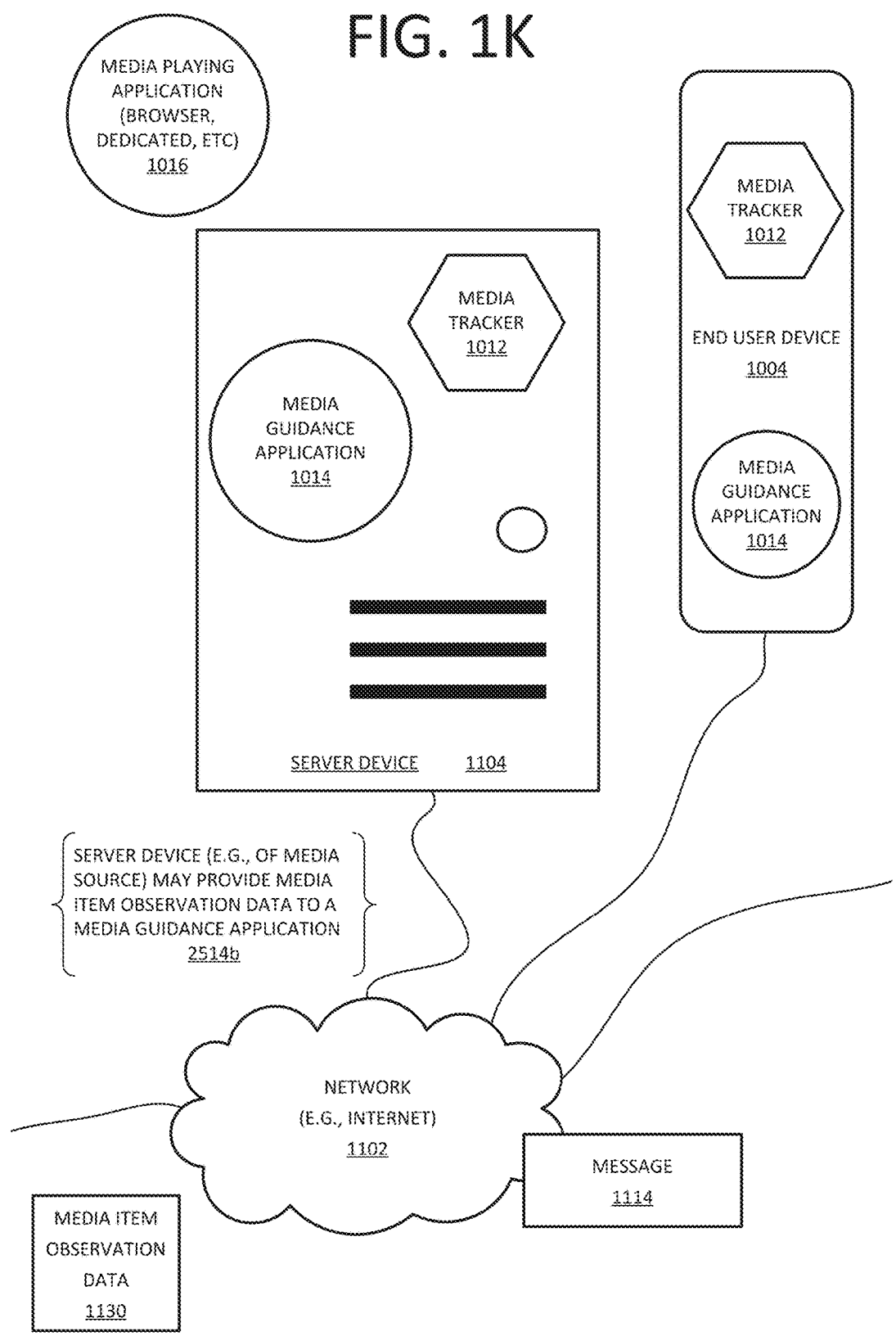

FIG. 1L
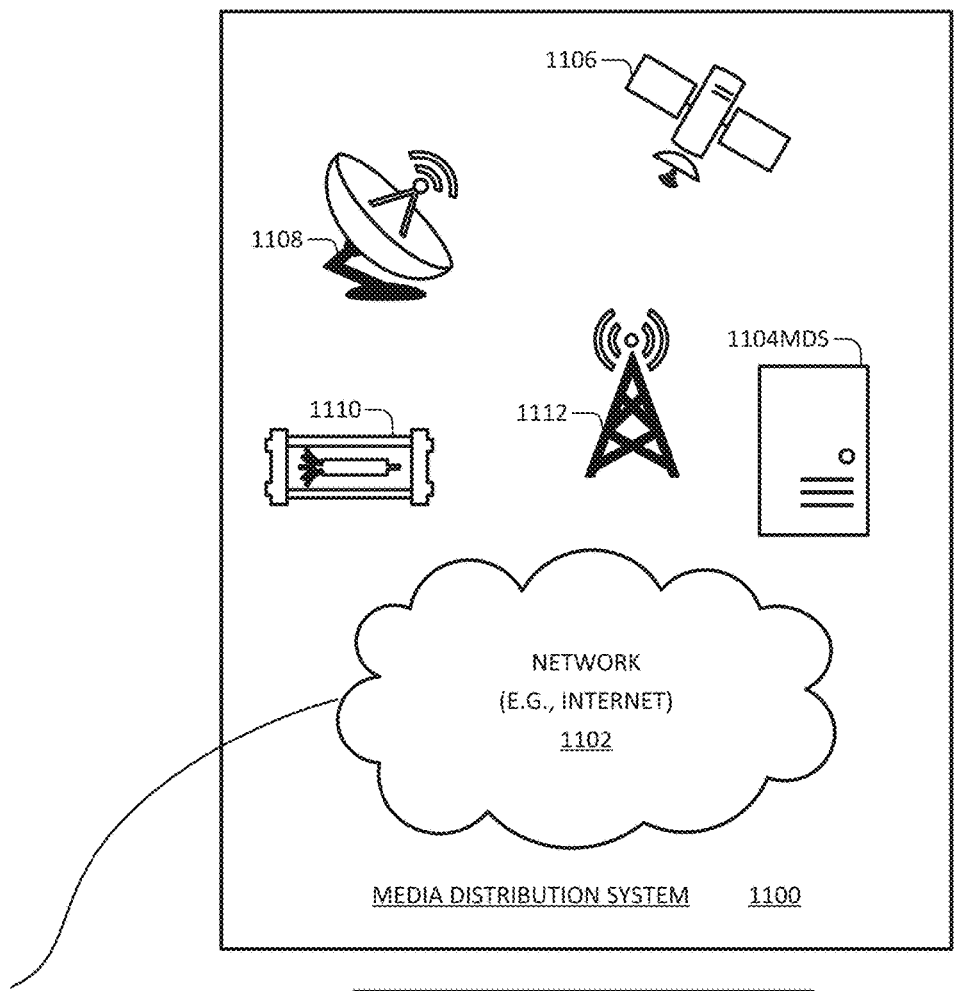
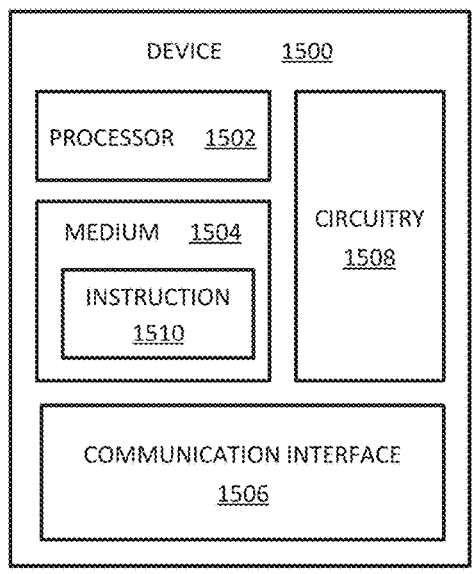

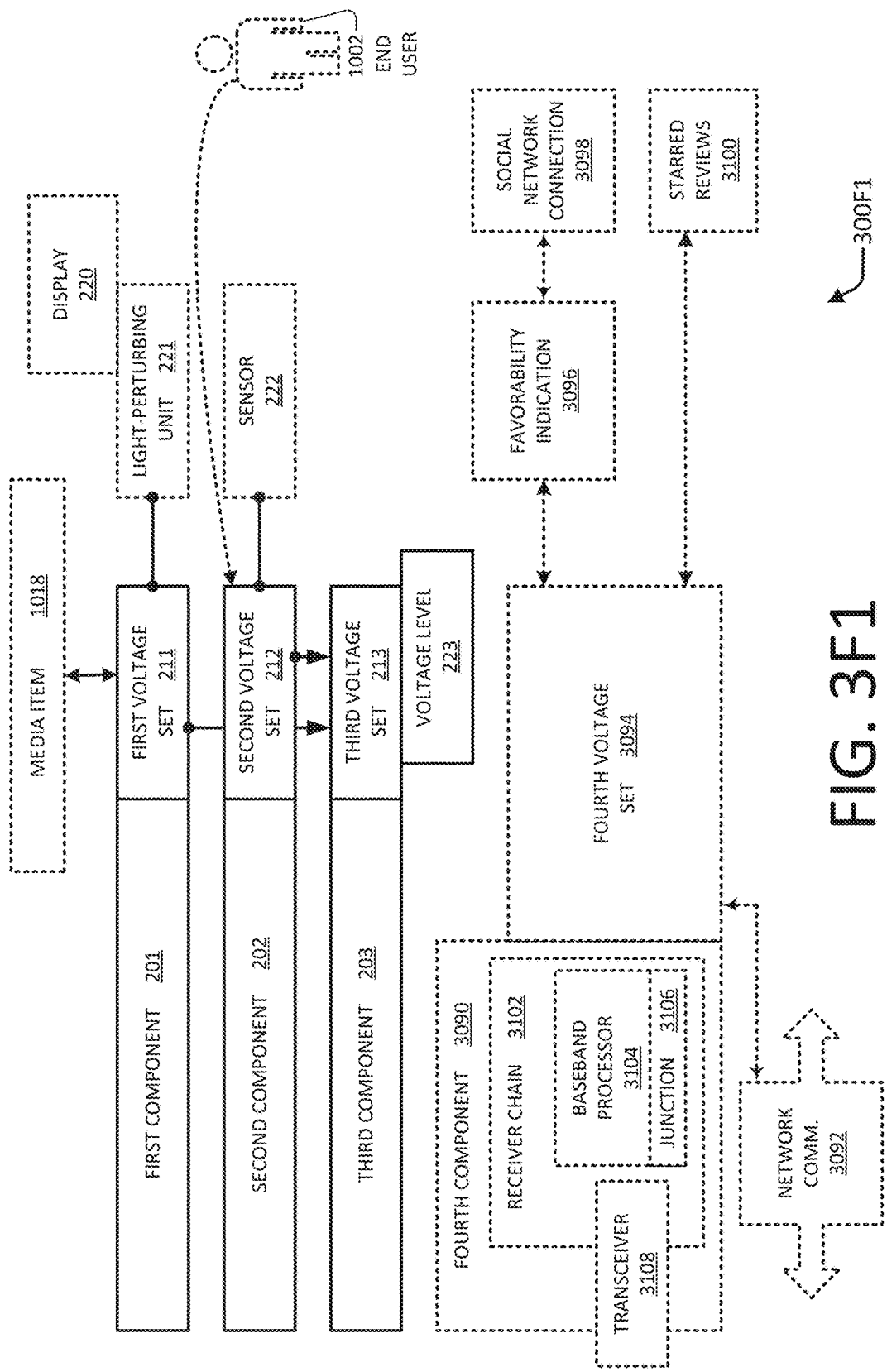
FIG. 3F1

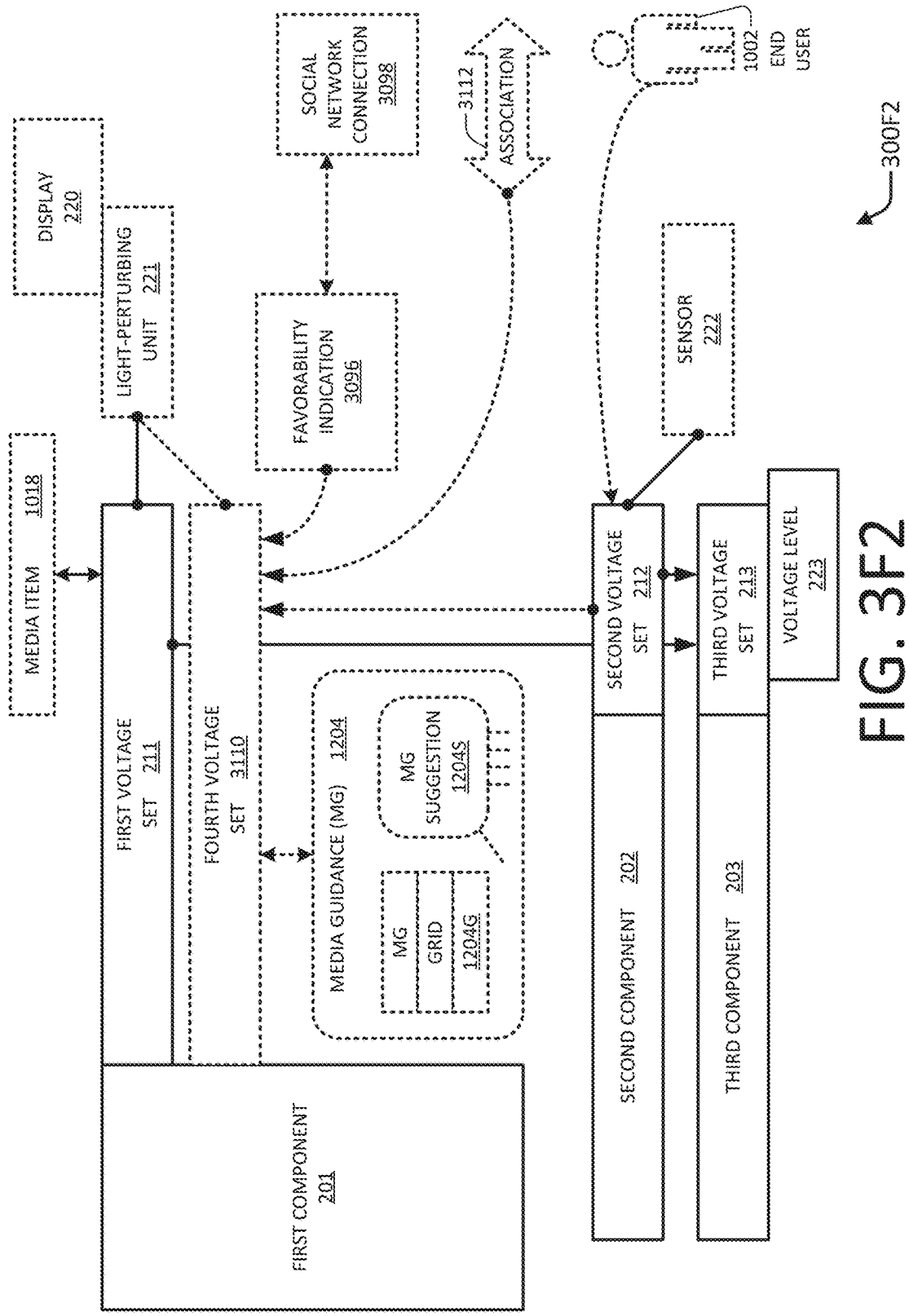
FIG. 3F2

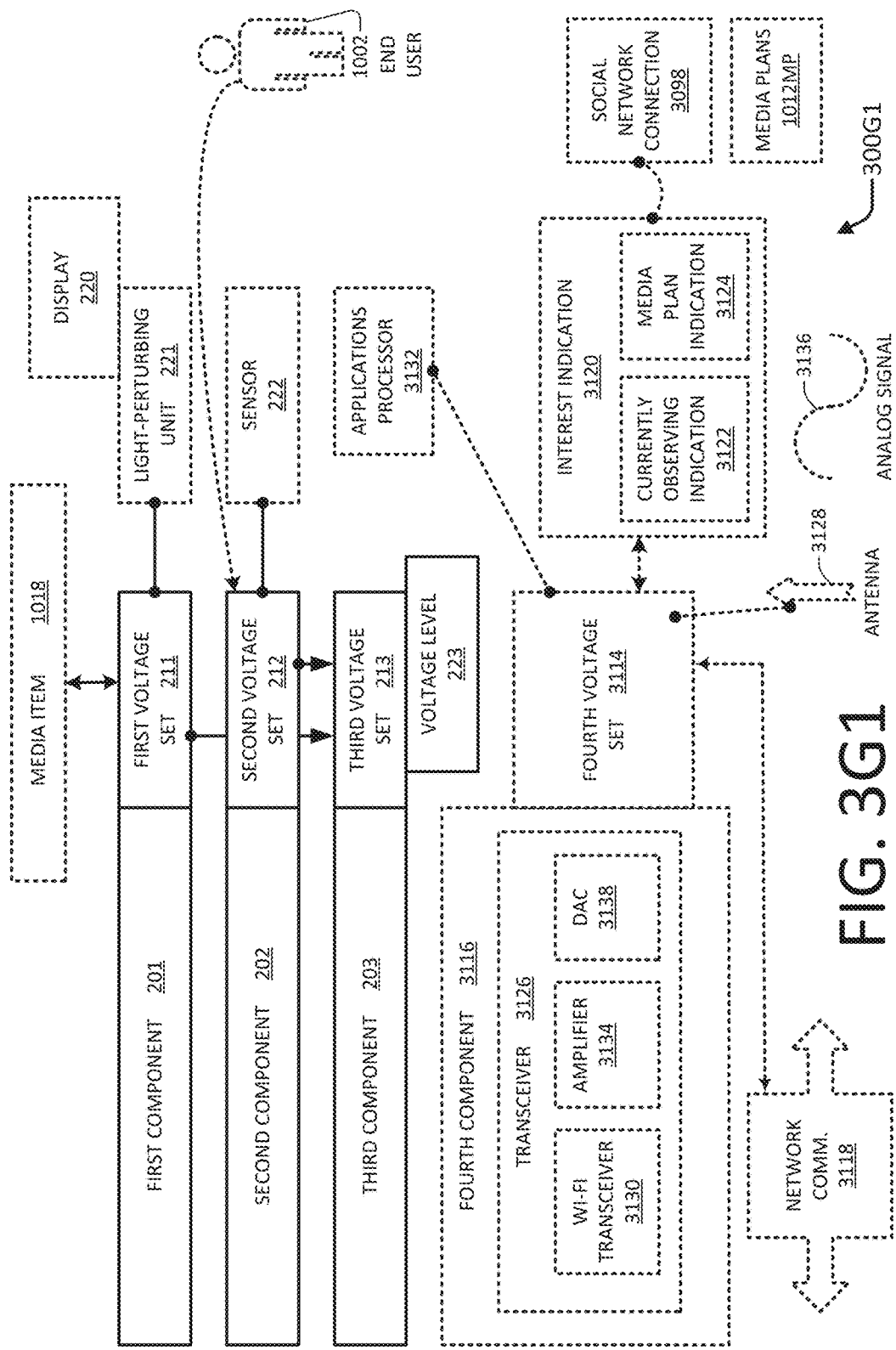
FIG. 3G1

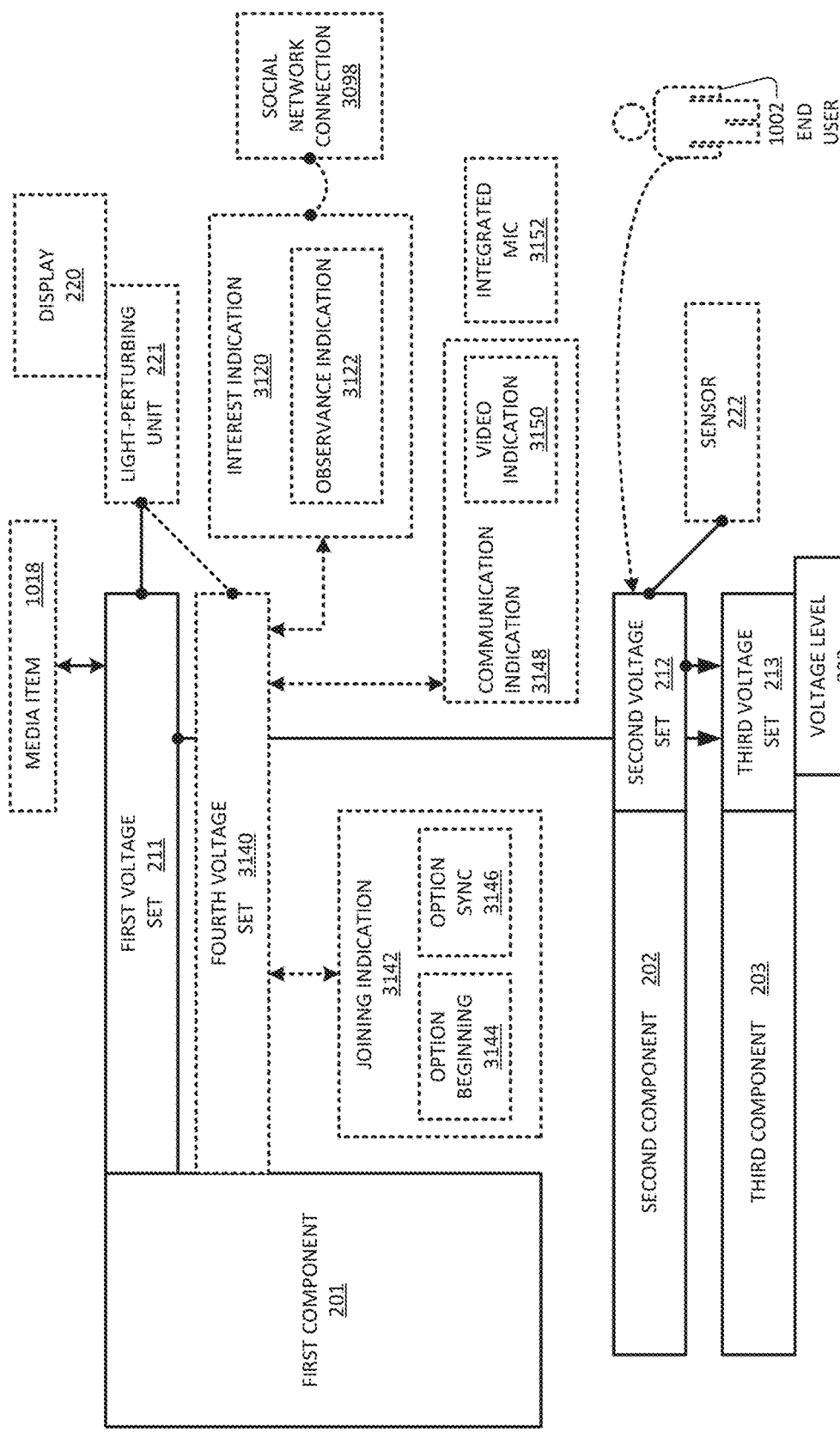
FIG. 3G2

LIFE EXPERIENCE MEMORIALIZATION WITH OBSERVATIONAL LINKAGE VIA USER RECOGNITION

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application constitutes a continuation-in-part of U.S. patent application Ser. No. 14/253,692, entitled "Life Experience Memorialization", naming Edward K. Y. Jung, Royce A. Levien, Richard T. Lord, Robert W. Lord, and Mark A. Malamud as inventors, filed 15 Apr. 2014 which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BRIEF DESCRIPTION OF THE FIGURES

In accordance with 37 C.F.R. §1.84(h)(2)

TABLE 1

Table 1 shows an alignment of enclosed partial view drawing sheets so as to form a single complete view of one or mor environments.

| Sheet Pos. (x, y) | Column 1 | Column 2 | Column 3 | Column 4 | Column 5 | Column 6 |
| --- | --- | --- | --- | --- | --- | --- |
| Row 1 | FIG. 1A (1, 1) | FIG. 1B (1, 2) | FIG. 1C (1, 3) | FIG. 1D (1, 4) | FIG. 1E (1, 5) | FIG. 1F (1, 6) |
| Row 2 | FIG. 1G (2, 1) | FIG. 1H (2, 2) | FIG. 1I (2, 3) | FIG. 1J (2, 4) | FIG. 1K (2, 5) | FIG. 1L (2, 6) |
| Row 3 | FIG. 1M (3, 1) | FIG. 1N (3, 2) | FIG. 1O (3, 3) | FIG. 1P (3, 4) | FIG. 1Q (3, 5) | FIG. 1R (3, 6) |
| Row 4 | FIG. 1S (4, 1) | FIG. 1T (4, 2) | FIG. 1U (4, 3) | FIG. 1V (4, 4) | FIG. 1W (4, 5) | FIG. 1X (4, 6) |

In accordance with 37 C.F.R. §1.84(h)(2), FIG. 1 is " . . . a view of a large machine or device in its entirety . . . broken into partial views . . . extended over several sheets . . . [with] no loss in facility of understanding the view." The partial views drawn on the several sheets indicated in the above Table 1 are capable of being linked edge to edge, so that no partial view contains parts of another partial view. In addition, a smaller scale view has been included as FIG. 1 on the first sheet, showing the whole formed by the partial views and therefore further indicating the positions of the individual sheets in forming the complete view. As here, "where views on two or more sheets form, in effect, a single complete view, the views on the several sheets are so arranged that the complete figure can be assembled without concealing any part of any of the views appearing on the various sheets." 37 C.F.R. §1.84(h)(2).

It is noted that one or more of the partial views of the drawings may be blank, or may not contain substantive or numbered elements (e.g., may show only lines, connectors, or the like). These drawings are included in order to assist readers of the application in assembling the single complete view from the partial sheet format required for submission by the USPTO, and, although their inclusion is not required and may be omitted in this or other applications, their inclusion is proper, and should be considered intentional.

Figure 1C:
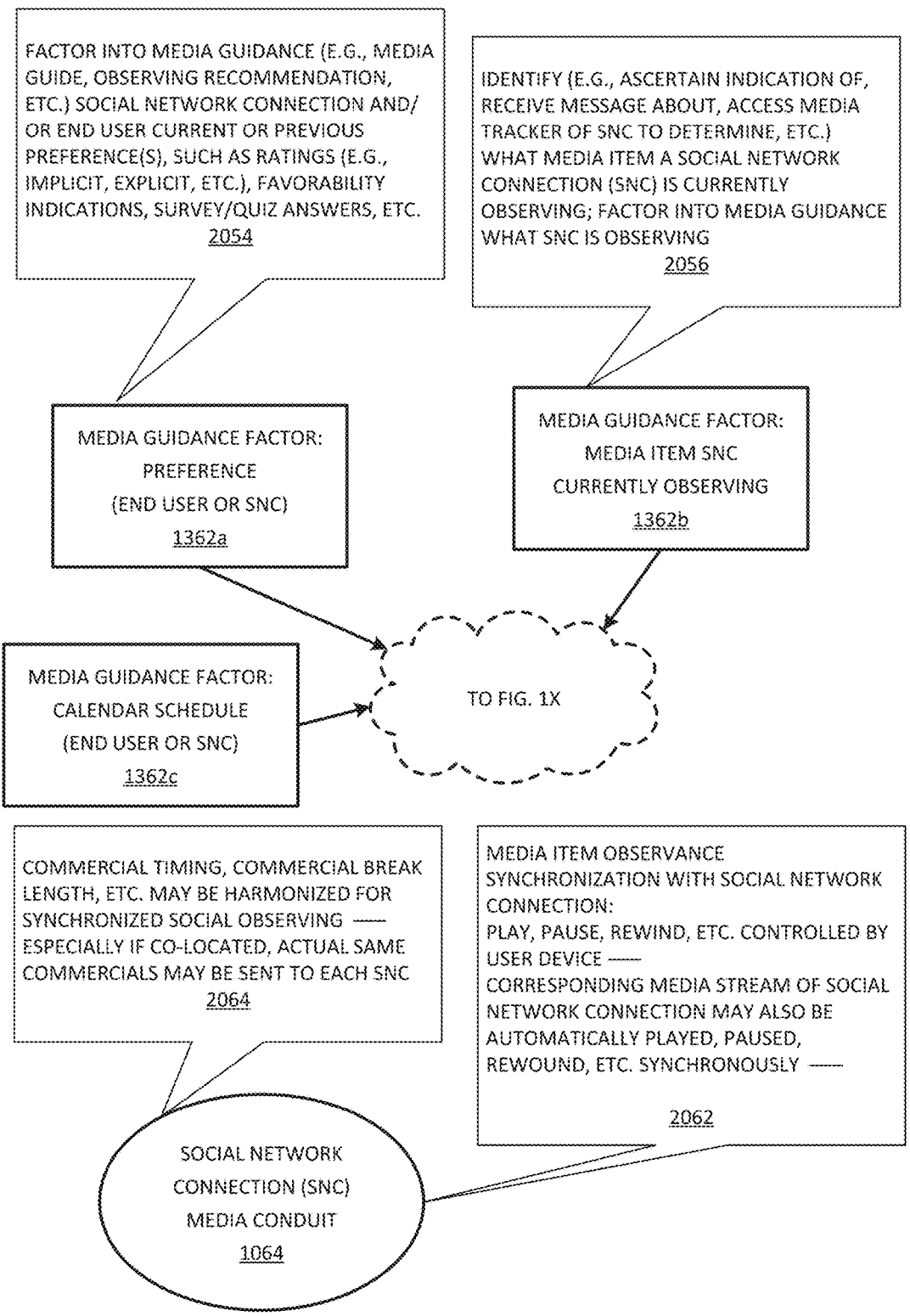
FIG. 1 shows "a view of a large machine or device in its entirety . . . broken into partial views . . . extended over several sheets" that are labeled FIG. 1A through FIG. 1X (Sheets 1-24). The "views on two or more sheets form, in effect, a single complete view, [and] the views on the several sheets . . . [are] so arranged that the complete figure can be assembled" from "partial views drawn on separate sheets . . . linked edge to edge. Thus, for FIG. 1, a "smaller scale view" is "included, showing the whole formed by the partial views and indicating the positions of the parts shown," e.g., as described in 37 C.F.R. § 1.84(h)(2). For FIG. 1, the partial view sheets of FIGS. 1A through 1X are ordered alphabetically, by increasing in columns from left to right, and then by increasing in rows from top to bottom, as shown in the following table.
Figure 1D:
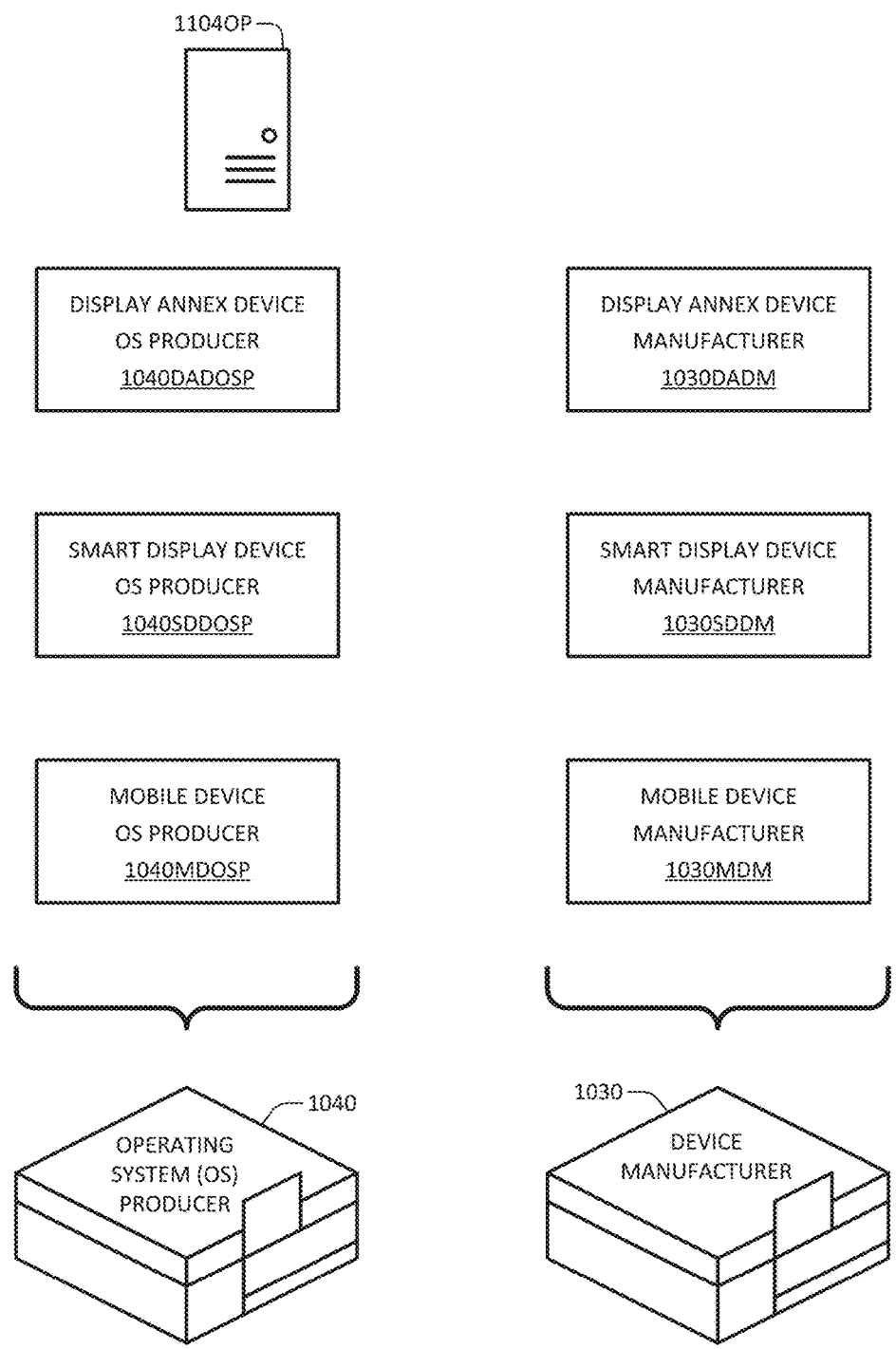
Figure 1M:
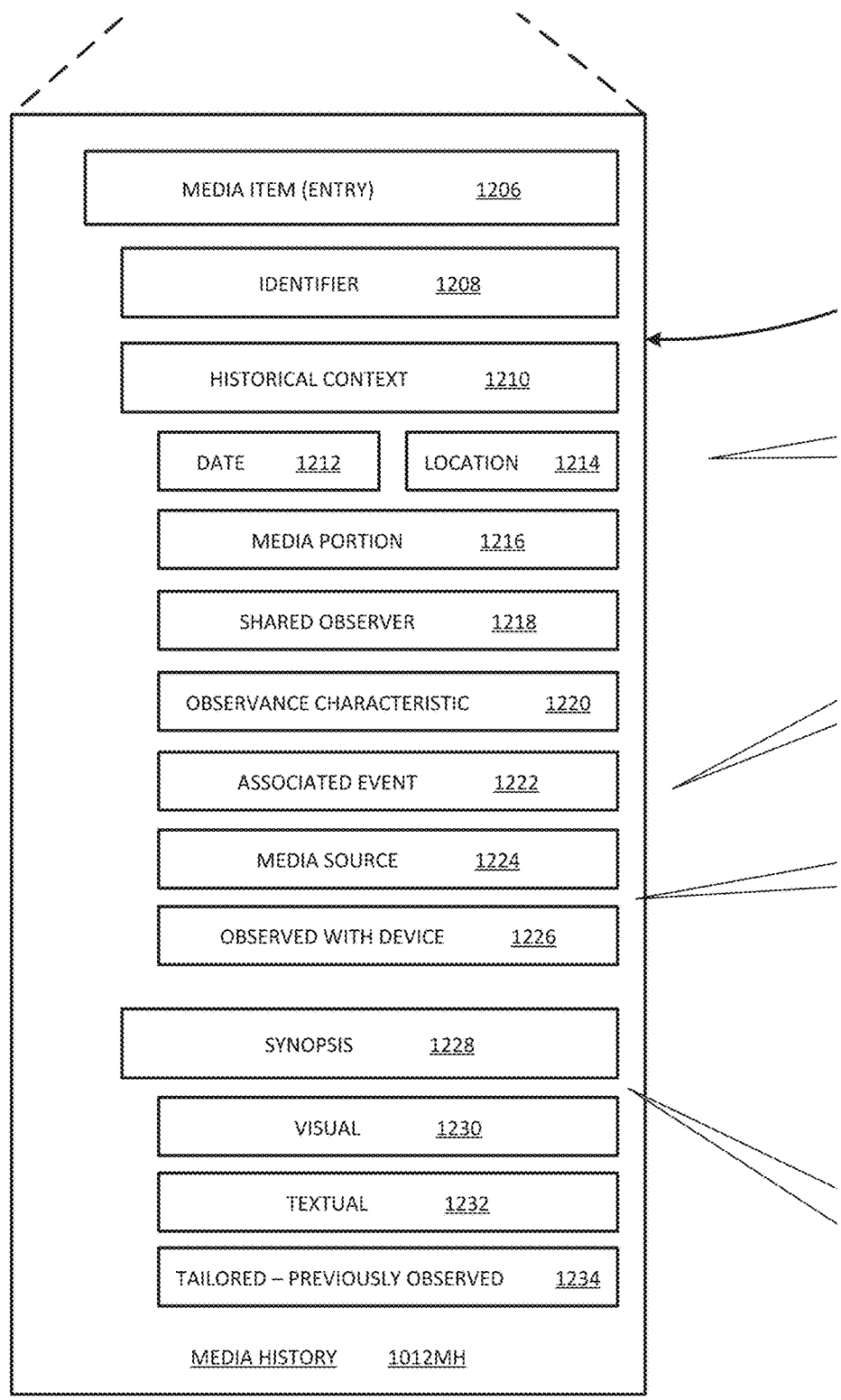
Figure 1N:
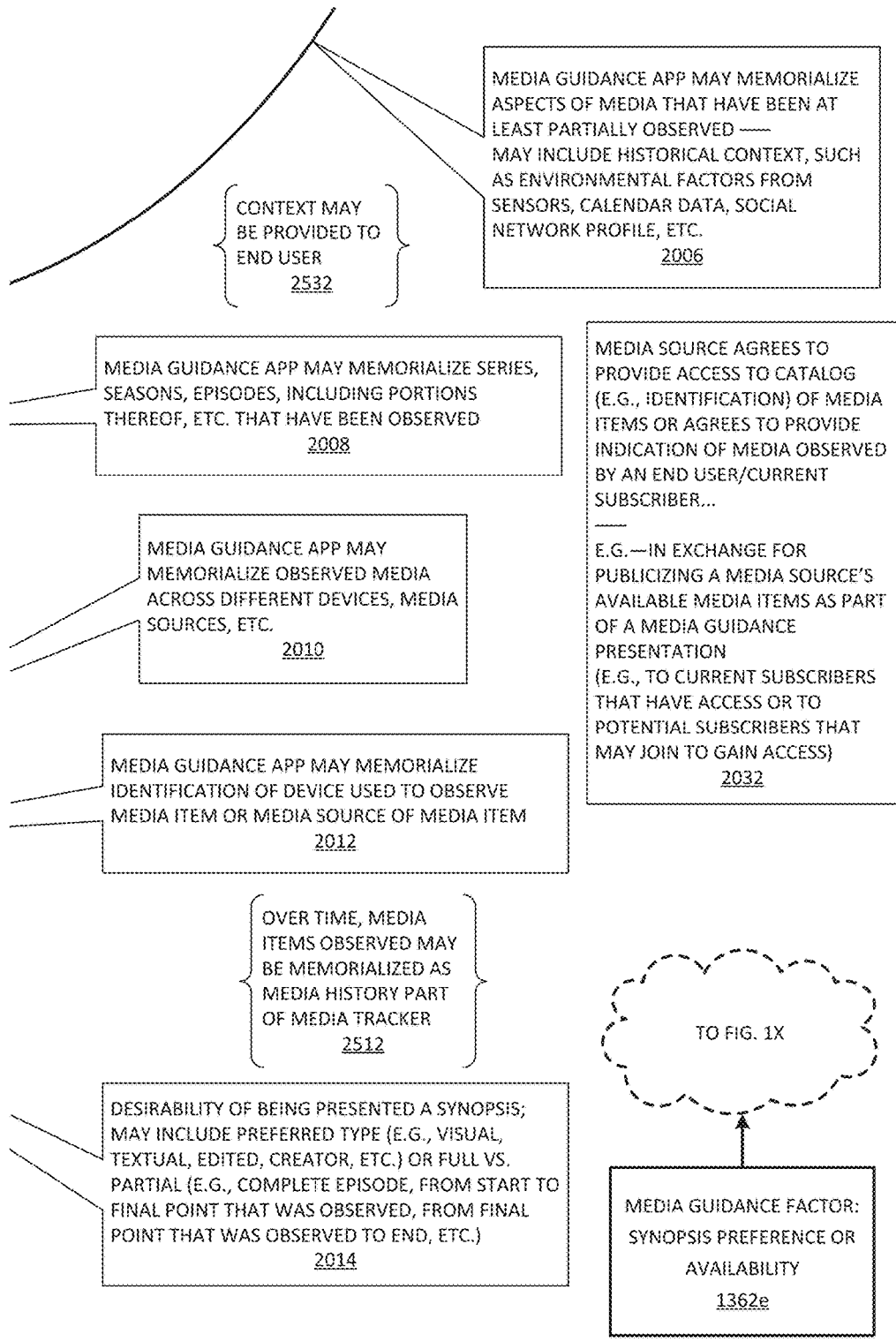
Figure 10:
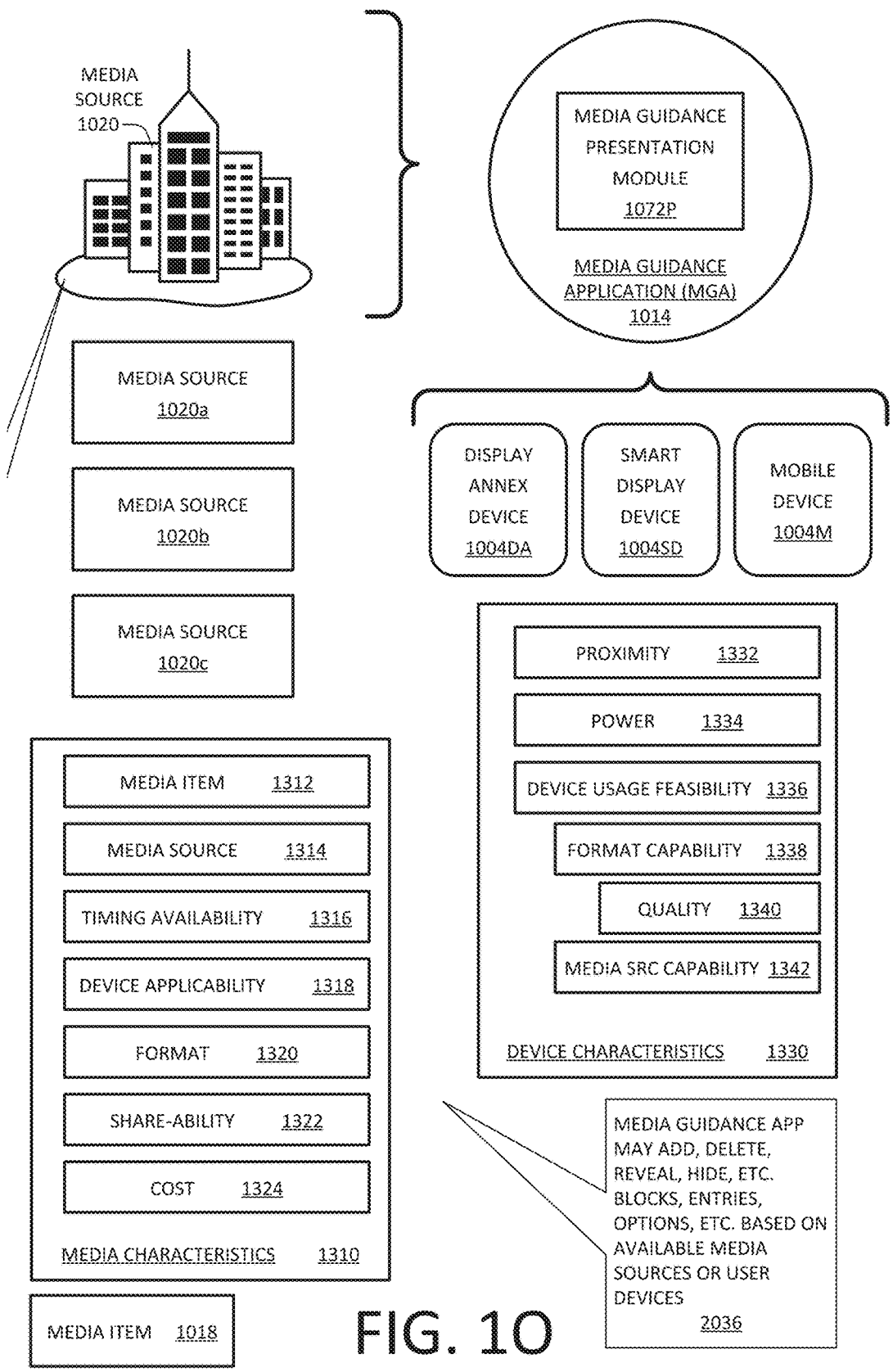
Figure 1P:
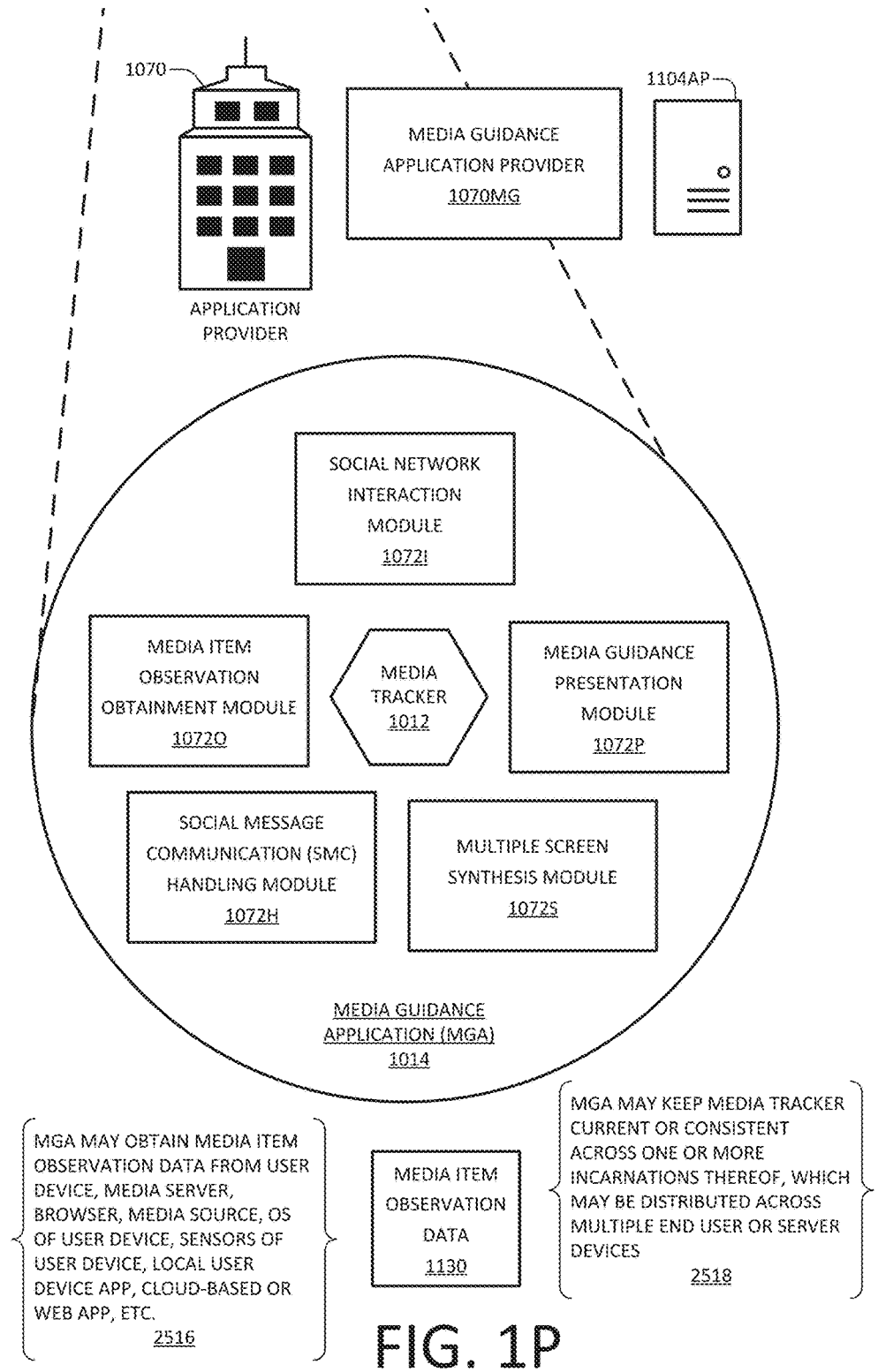
Figure 1Q:
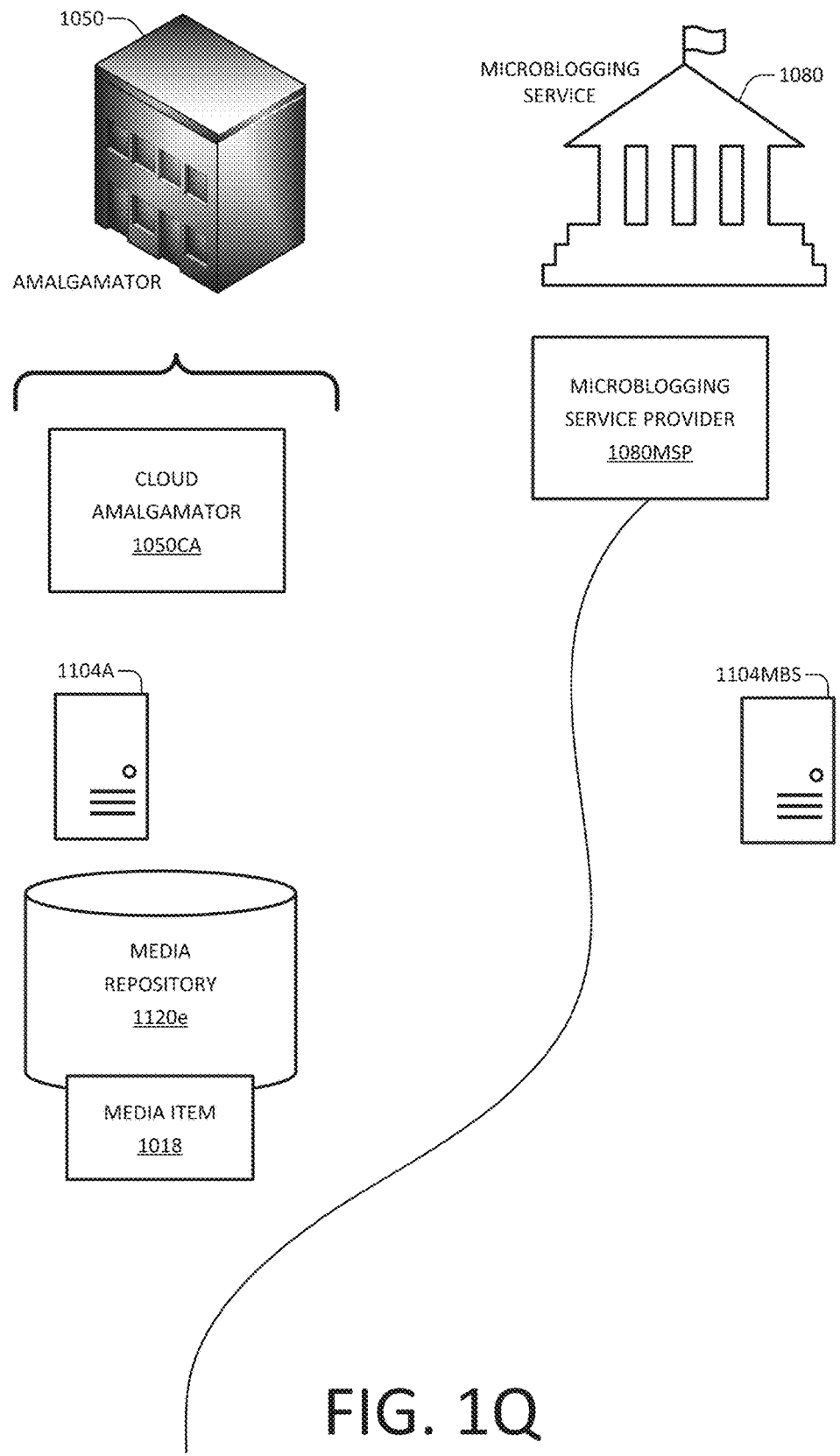
Figure 1R:
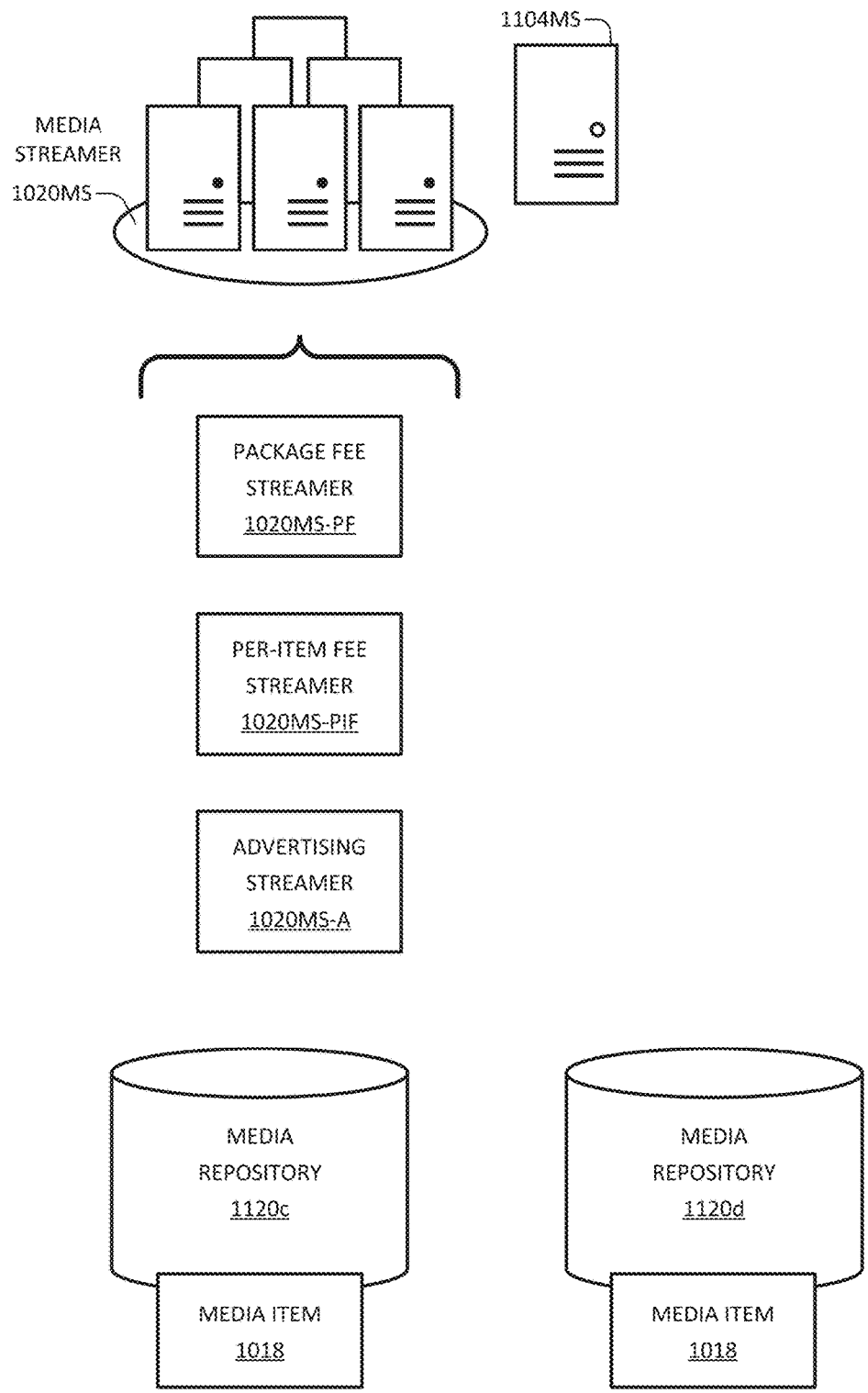
Figure 1S:
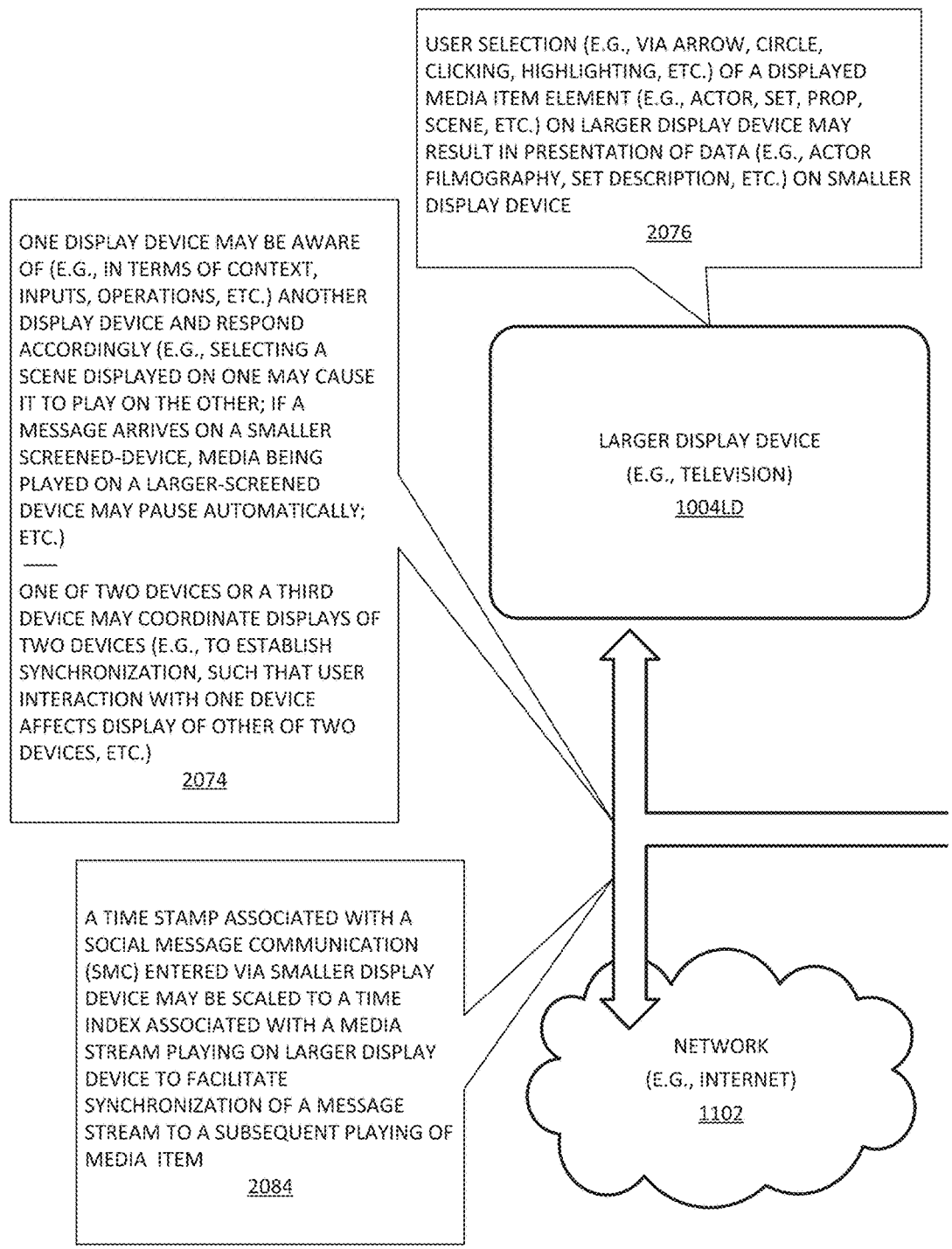
Figure 1T:
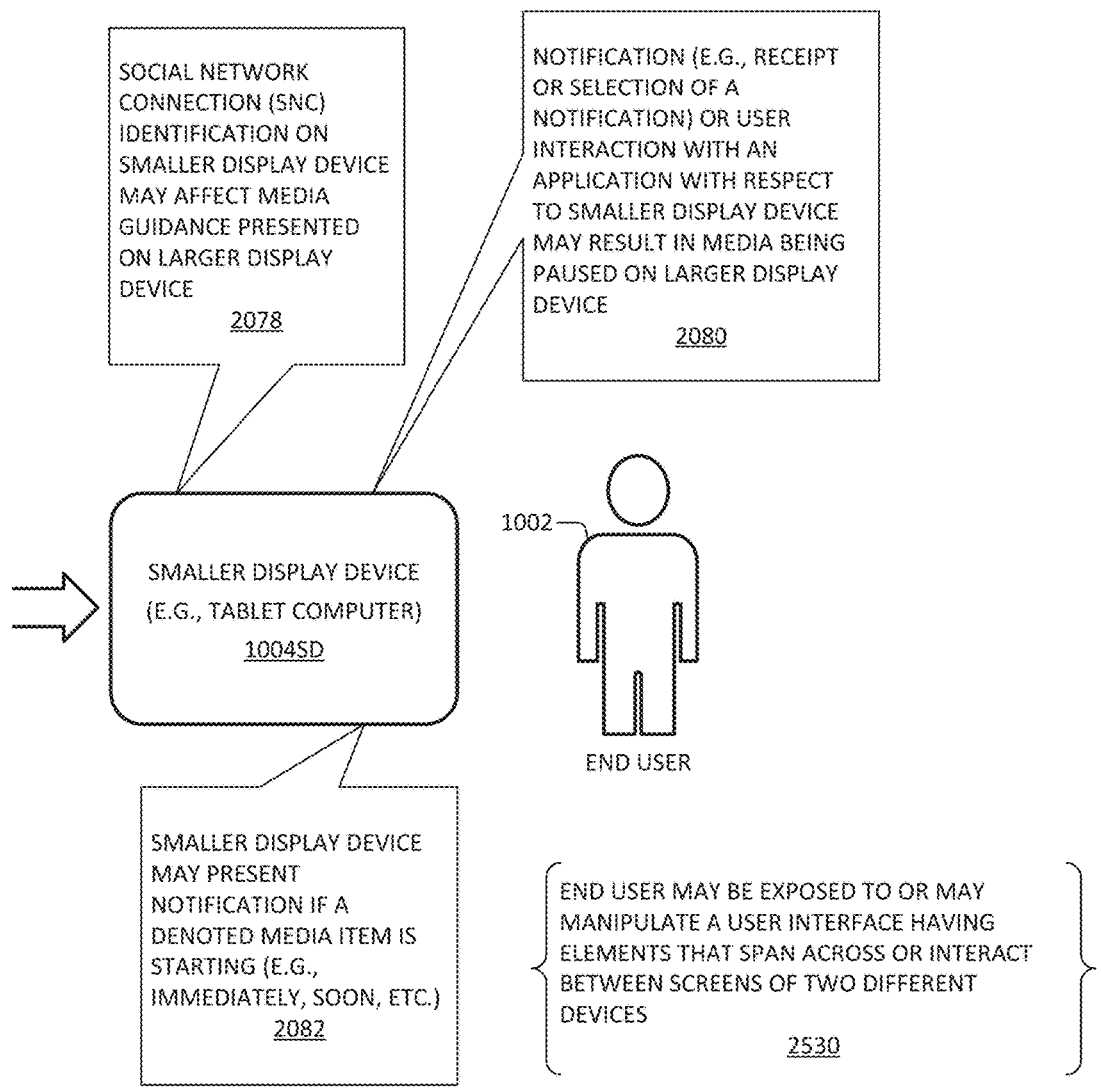
Figure 1U:
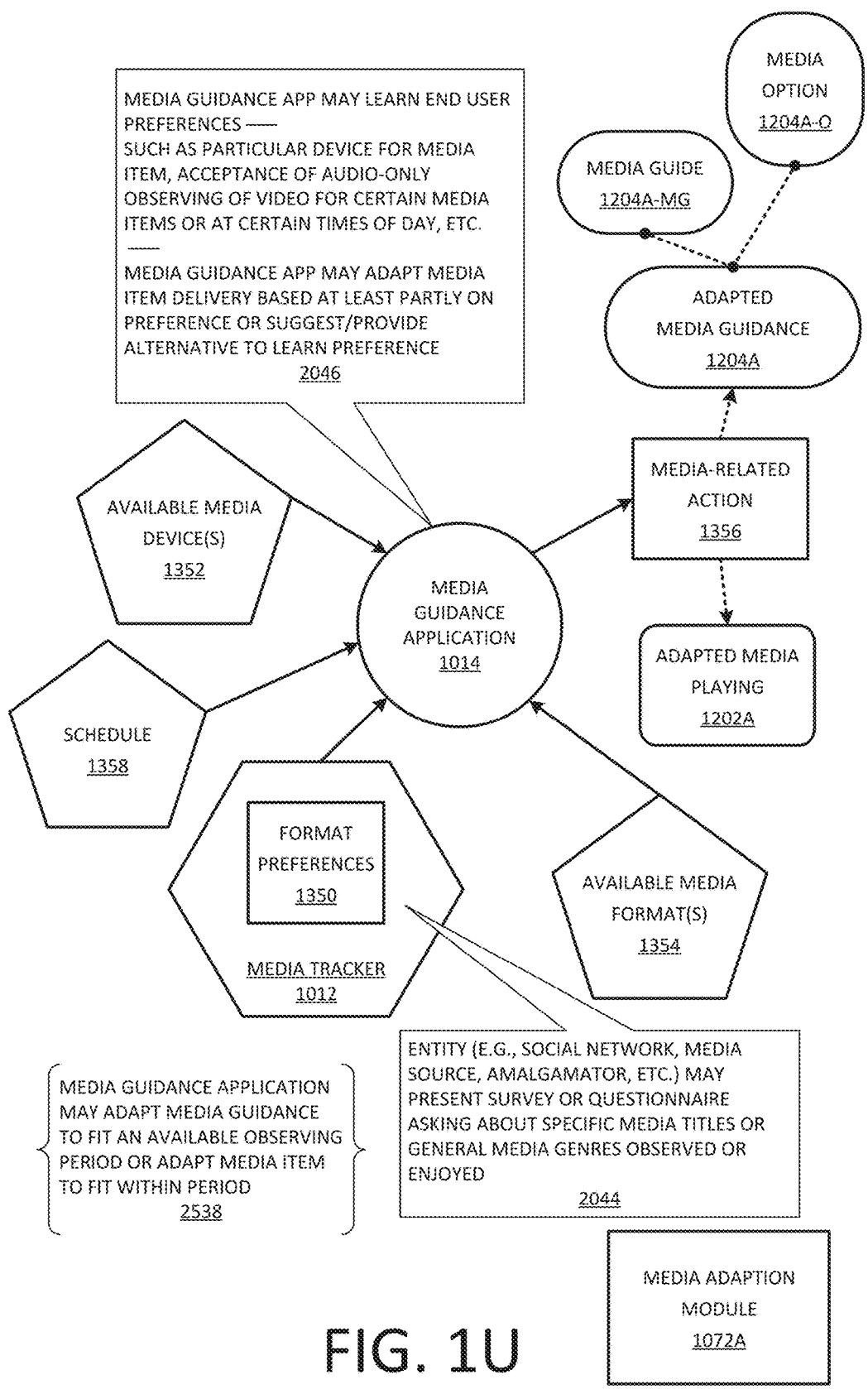
Figure 1V:
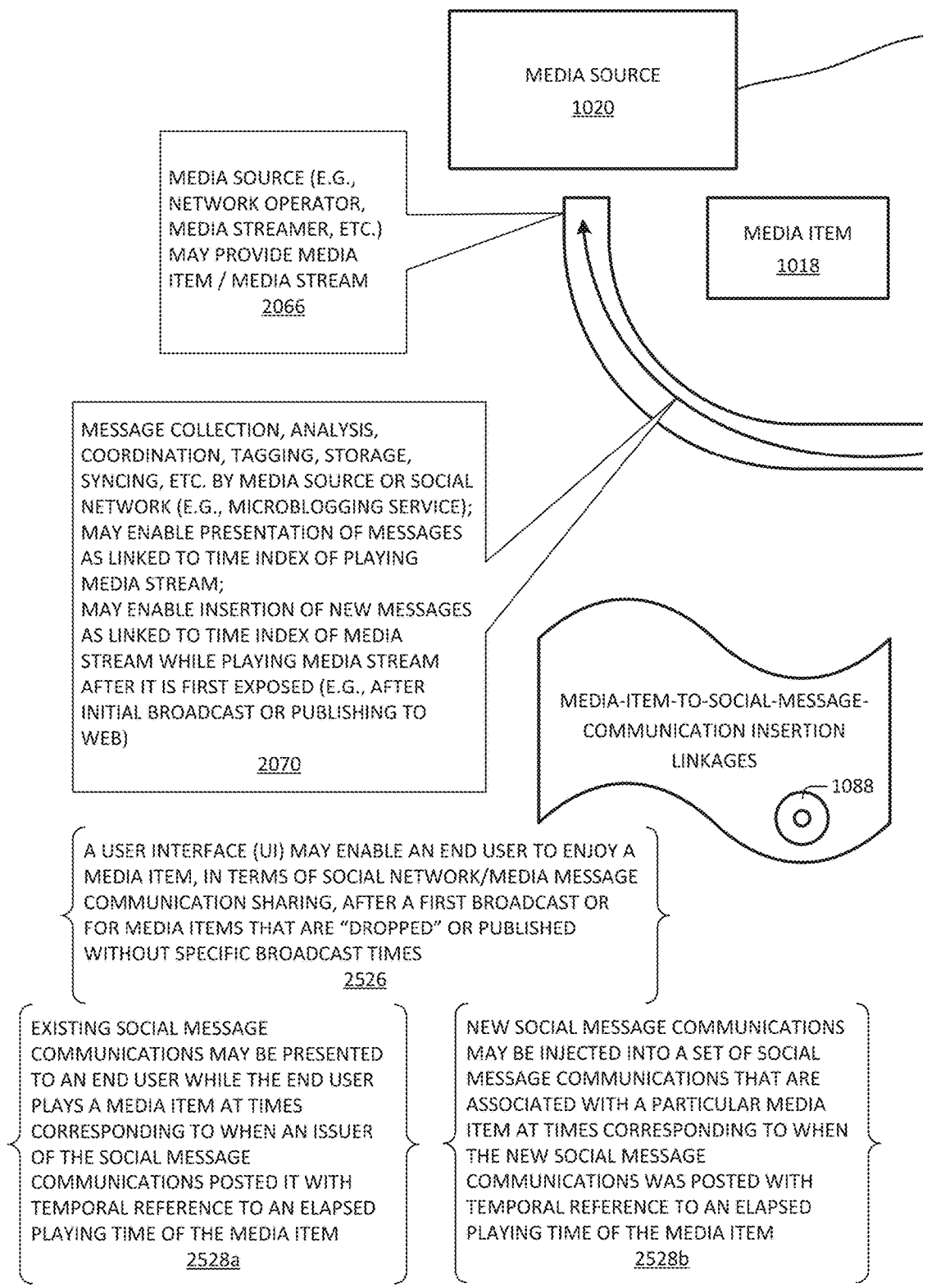
Figure 1W:
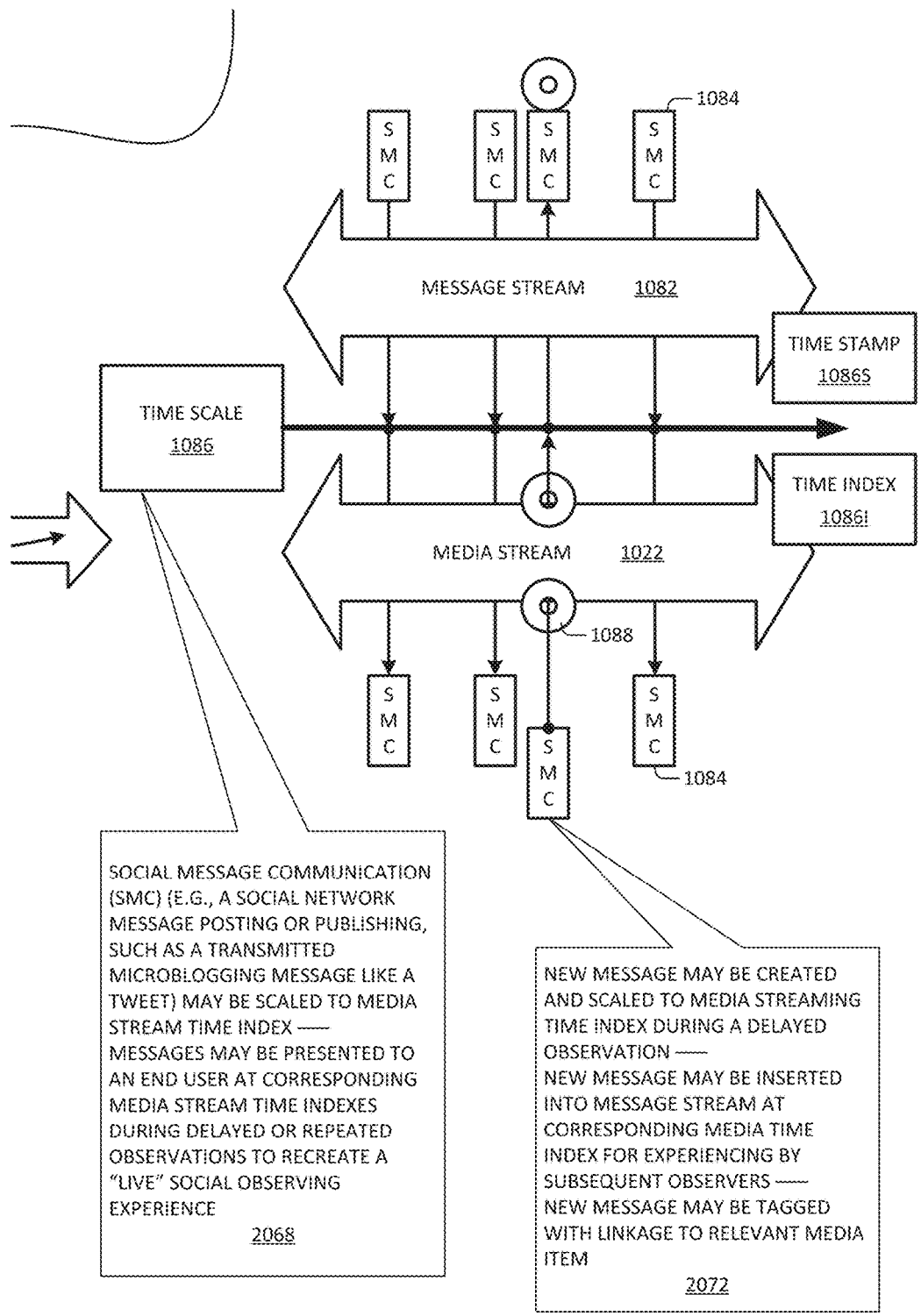
Figure 1X:
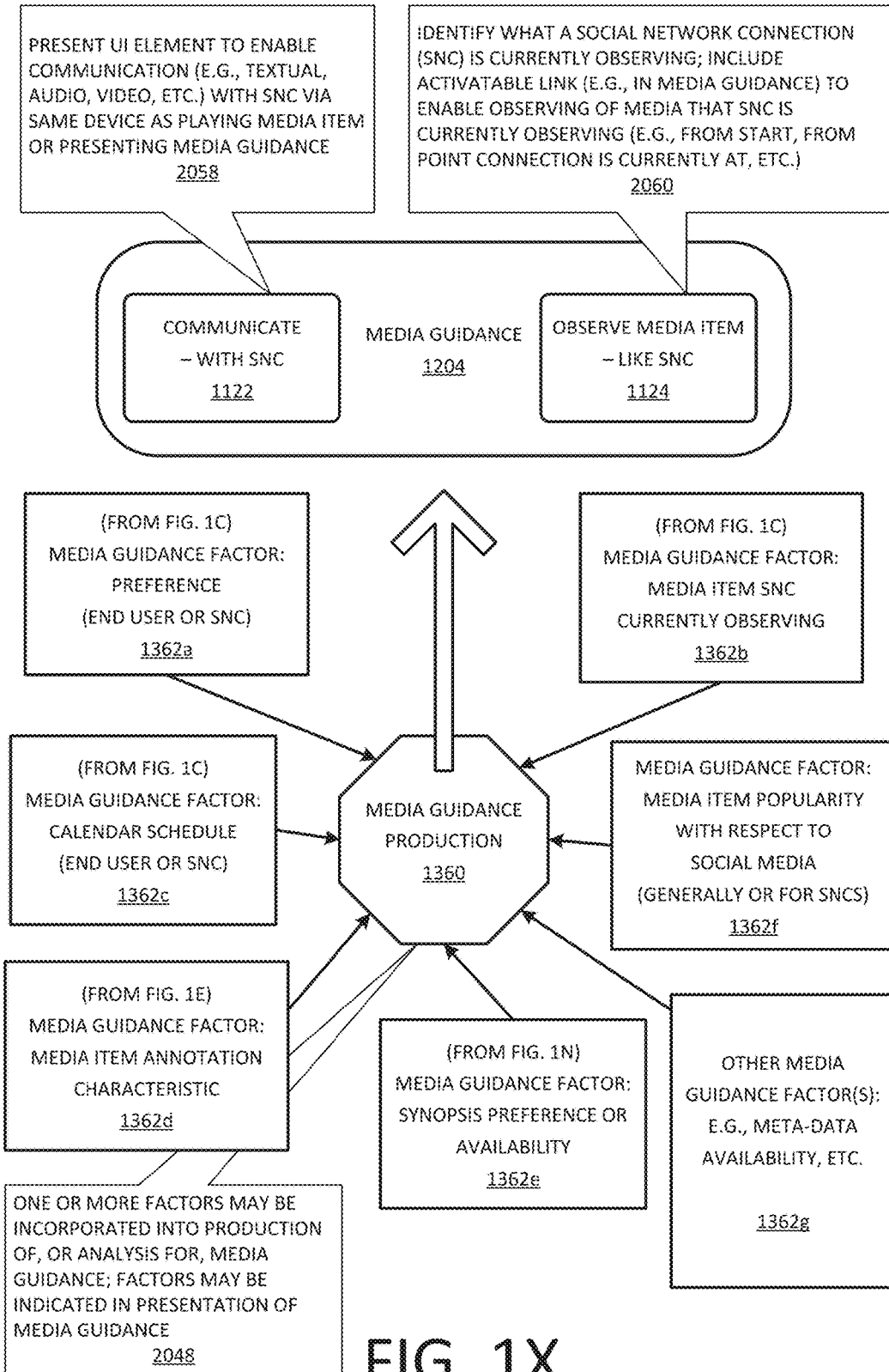

Thus, FIG. 1 is a schematic diagram of a miniaturized image or "smaller scale view" of FIGS. 1A-1X, which together depict at least an example enviro-system or affiliated processes related to certain example embodiments.

FIG. 1A is a block diagram indicative of a spatial relationship or interconnectedness between or among drawing sheets that respectively correspond to FIGS. 1A-1X, which together depict at least an example enviro-system or affiliated processes related to certain example embodiments.

FIGS. 1B-1X are individual schematic diagrams of "partial views drawn on separate sheets" that may be combined to form a joint schematic diagram or "large machine or device" illustrating example implementations for life experience memorialization or life experience memorialization with observational linkage via user recognition in accordance with certain example embodiments.

Figure 2:
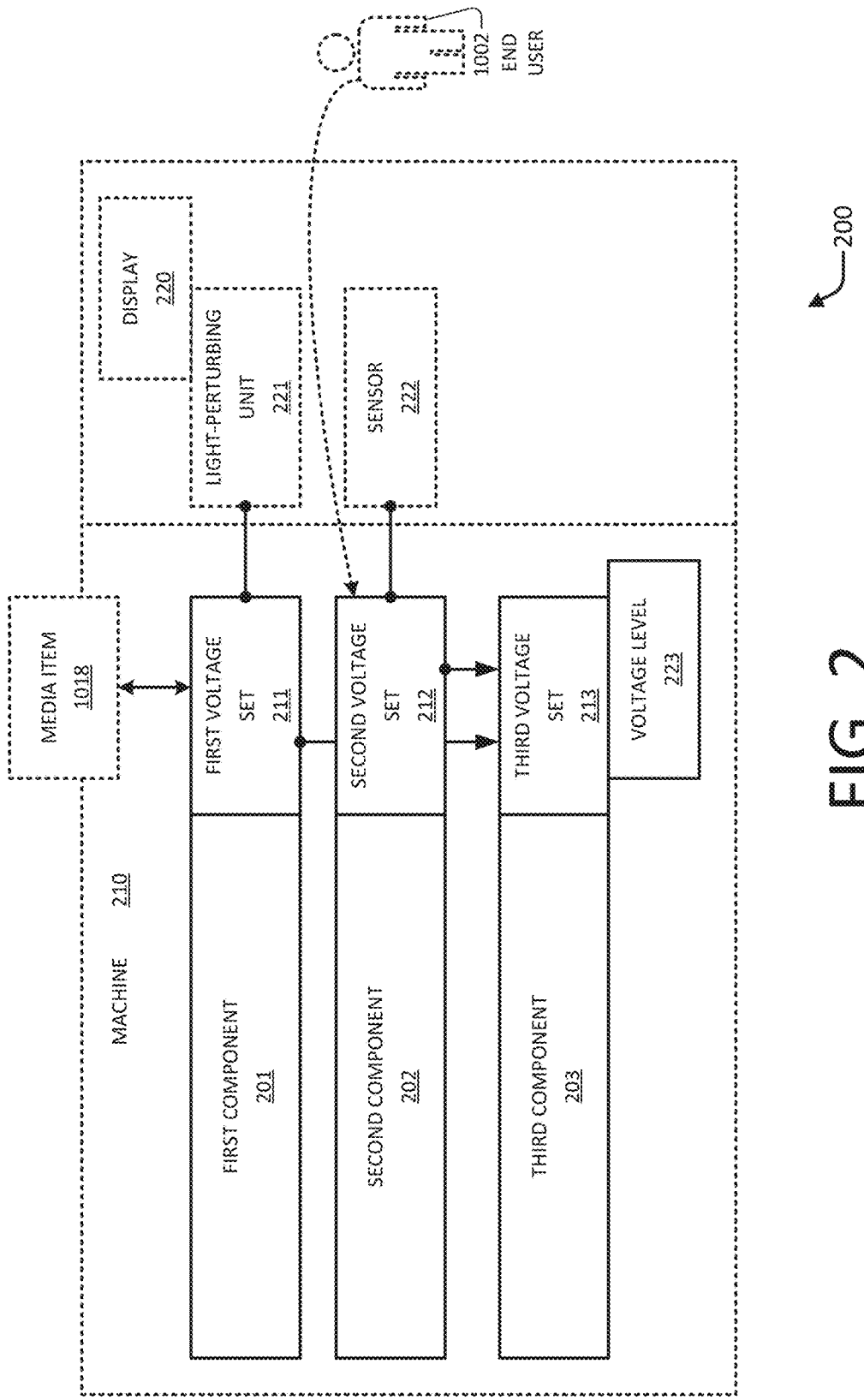

FIG. 2 is a schematic diagram that includes at least one example machine that is capable of handling scenarios or situations for life experience memorialization with observational linkage via user recognition in accordance with certain example embodiments.

Figure 3A:
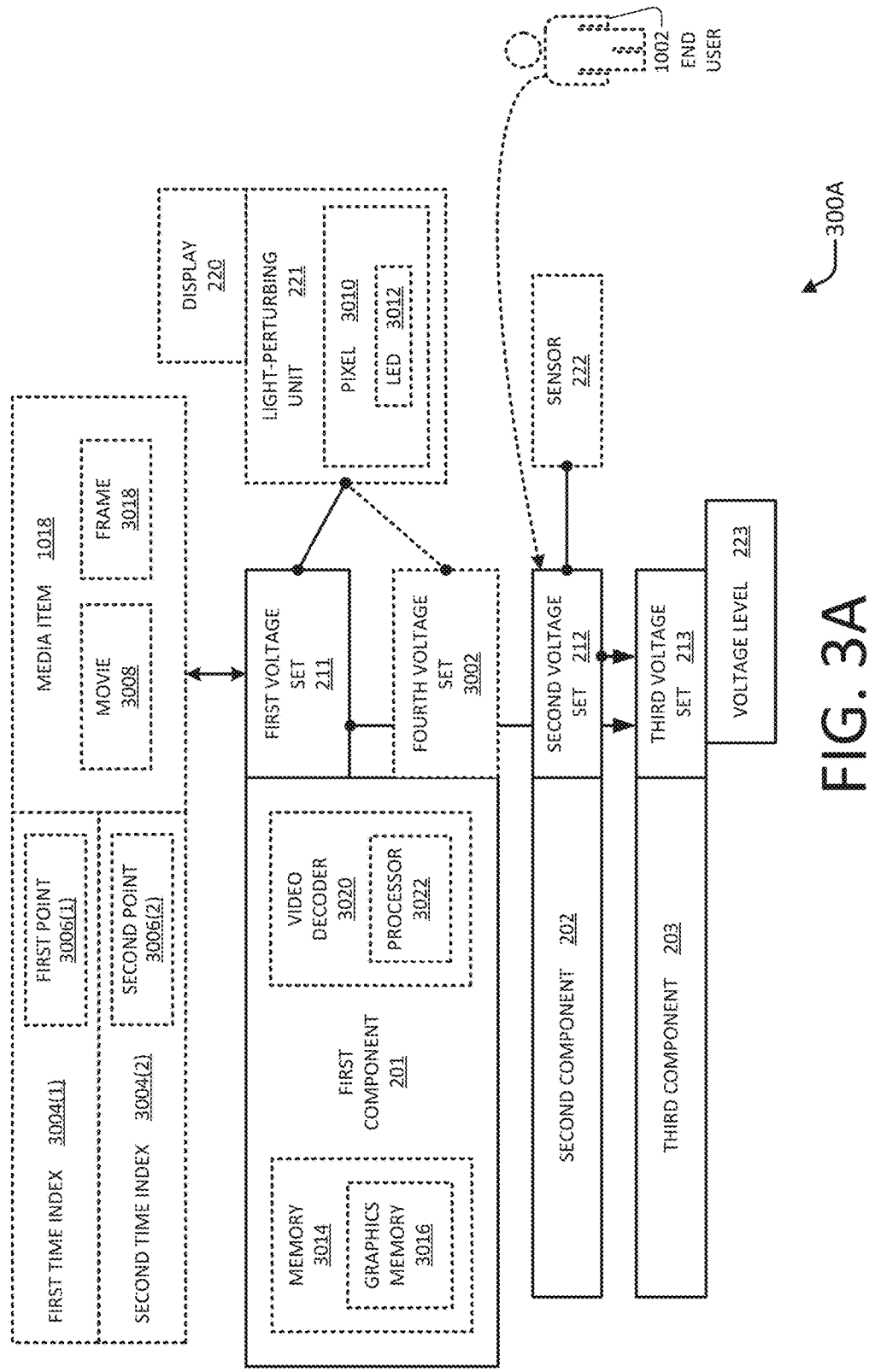

FIGS. 3A-3G2 are schematic diagrams 300A-300G2 that include at least a portion of at least one example machine and that depict example additional or alternative scenarios or machine states for life experience memorialization with observational linkage via user recognition in accordance with certain example embodiments.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a miniaturized image 1000 of a schematic diagram of FIGS. 1A-1X. Generally, a comparison of miniaturized image 1000 FIG. 1 to FIGS. 1B-1X, in view of FIG. 1A, reveals a number of illustrated aspects. First, a top row (starting at FIG. 1B) illustrates, inter alia and moving from left to right, at least one social network 1060, at least one operating system (OS) producer 1040, at least one device manufacturer 1030, at least one network operator 1020NO, etc. Second, the next row (starting at FIG. 1G) illustrates, inter alia and moving from left to right, at least one media tracker 1012, at least one end user 1002, at least some media guidance 1204, at least one end user device 1004, at least one server device 1104, at least one media distribution system 1100, at least one device 1500 that is capable of being transformed into a special-purpose computing apparatus by implementation of one or more instructions, etc. Third, the next to bottom row (starting at FIG. 1M) illustrates, inter alia and moving from left to right, at least one media history 1012MH (e.g., portion of a media tracker 1012), at least one media source 1020, at least one media guidance application (MGA) 1014, at least one application provider 1070, at least one amalgamator 1050, at least one microblogging service 1080, at least one media streamer 1020MS, etc. Fourth, the bottom row (starting at FIG. 1S) illustrates, inter alia and moving from left to right, at least part of a multi-display device (e.g., a larger display device 1004LD or a smaller display device 1004SD) environment, at least part of a media adaptation environment (e.g., with a media adaptation module 1072A of a media guidance application 1014), at least part of a social message communication (SMC) 1084 environment, at least part of a media guidance production 1360 environment, etc.

FIG. 1A is a block diagram 1000A indicative of a spatial relationship or interconnectedness between or among drawing sheets that respectively correspond to FIGS. 1A-1X, which together depict at least an example enviro-system or affiliated processes related to certain example embodiments. As shown, FIG. 1A illustrates a grid of rectangles representing drawing sheets. The grid includes four rows (e.g., starting with FIG. 1A, FIG. 1G, FIG. 1M, and FIG. 1S from top to bottom) having six columns each (e.g., starting with FIG. 1A, FIG. 1B, FIG. 1C, FIG. 1D, FIG. 1E, and FIG. 1F from left to right). Thus, row one has FIGS. 1A-1F, row two has FIGS. 1G-1L, row three has FIGS. 1M-1R, and row four has FIGS. 1S-1X.

Multiple and various independent or interrelated example embodiments are described herein below with reference to one or more of any of at least FIGS. 1B-1X. However, claimed subject matter is not limited to any particular described embodiments, implementations, examples, or so forth.

With reference to FIG. 1H or 1J, for certain example embodiments, an end user 1002 may be proximate to or may be associated with at least one end user device 1004. As used herein, unless context or an express notation indicates otherwise, an observer of a media item may be interchangeably substituted for an end user 1002 of an end user device 1004, such as an end user of a mobile user device or an end user of a non-mobile user device. For certain example implementations, an end user 1002 may comprise at least or may include but is not limited to: a person, at least one human, an individual, at least one robotic entity or agent, a group (e.g., a family, a couple, a partnership, a team, or a combination thereof, etc.), some combination thereof, or so forth.

For certain example implementations, an end user device 1004 may include at least one mobile device 1004M, at least one smart display device 1004SD, at least one display annex device 1004DA, some combination thereof, or so forth. By way of example but not limitation, a smart display device 1004SD may include an intelligent television (e.g., an Apple iTV or an Amazon Fire Television), a television that runs one or more applications (e.g., a Samsung Smart TV), a projector that presents images on a wall or screen and enables user control via a menu-based or an icon-based user interface or with a remote control or mobile device, a non-mobile computer such as a desktop or all-in-one touch-screen computer, some combination thereof, or so forth. By way of example but not limitation, a display-annex device 1004DA may include a set-top box (e.g., a Sling Box, a TiVo machine, etc.), a cable box (e.g., a machine for Charter or Comcast cable service), a media streaming device (e.g., an Apple TV, a Roku streaming or media player, Amazon FireTV, etc.), a game machine (e.g., a Microsoft Xbox, a Sony Play Station, a Nintendo WiiU, etc.), a device coupled by wire or wirelessly to a display device to enable media observation (e.g., a USB dongle, a tablet casting video to a separate display screen, or a combination thereof, etc.), some combination thereof, or so forth. By way of example but not limitation, a mobile device 1004M may include a mobile phone (e.g., an Apple iPhone), a tablet (e.g., an Apple iPad or Amazon Fire), a slate computer (e.g., a Dell Windows 8 machine), a phablet (e.g., a Samsung Galaxy Note), a portable gaming device (e.g., a Nintendo DS), a smart-phone (e.g., an HTC One), a notebook computer (e.g., an Apple Mac Book Pro or Chromebook), a user equipment (UE), a mobile station (MS), a laptop computer (e.g., a Dell Inspiron), an ultra-book (e.g., an Apple Mac Book Air), a tablet-notebook convertible (e.g., a Lenovo Yoga), a wearable computing device such as a so-called smart watch (e.g., Samsung Galaxy Gear or Apple iWatch) or intelligent glasses (e.g., Google Glass), an electronic device having wireless communication capabilities that is typically carried by or with a person on a regular basis such as daily, a vehicle having infotainment capabilities (e.g., BMW iDrive), some combination thereof, or so forth.

With reference to FIG. 1I, at least one instance of playing media 1202 and at least one instance of media guidance 1204 are shown. One or more media may be played 1202 or media guidance 1204 may be presented by at least one end user device 1004 as indicated by two respective arrows that overlap FIG. 1J and FIG. 1I proximate to playing media 1202 and media guidance 1204, respectively. Media may be played 1202 in at least one manner that is discernable by one or more human senses, including but not limited to sight or sound. By way of example only, a slideshow may be shown visually, a song may be played aurally, a book may be shown textually or performed verbally, a movie may be played visually and aurally, some combination thereof, or so forth. An end user device 1004 may play media 1202 using one or more in-built components (e.g., a display screen, a projection mechanism, a speaker, or a combination thereof, etc.), using one or more separate components (e.g., a display device that is dumb or in a pass-through mode, earphones, a surround sound speaker system, or a combination thereof, etc.), some combination thereof, or so forth. Media guidance 1204 may be presented in at least one manner that is discernable by one or more human senses, including but not limited to sight, sound, or touch. By way of example only, a grid 1204G may be displayed on a screen; a user interface (UI) may be routed to a separate device, such as a mobile phone or a smart watch; options 1204O may be given over at least one speaker; a media item suggestion 1204S may be laid over a video that is being played; a carousel 1204C of media items by time or channel or social network connection may be presented three-dimensionally on a screen or in space; some combination thereof; or so forth. Media guidance 1204 may be based, at least partially, on at least one media tracker 1012 (e.g., of FIG. 1H).

With reference to FIG. 1H, a media tracker (MT) 1012 is depicted as being associated with at least one end user 1002.

For certain example embodiments, a media tracker 1012 may be associated with at least one end user 1002 via one or more accounts (e.g., free, paid, based on user name or password or facial image/recognition, individual, group, or a combination thereof, etc.), via one or more devices (e.g., an owned smart phone, a tablet to which one is signed in, or a combination thereof, etc.), via at least one device-based account, via at least one cloud-based account, via an electronic file representing a facial image of a user, some combination thereof, or so forth. A media tracker 1012 may be individualized or may correspond to a group, such as a family or spouses. A media tracker 1012 may be tied to a device or may span multiple devices. A media tracker 1012 may be tied to a single account (e.g., a Netflix account) or multiple accounts (e.g., a Netflix account and a Hulu+ account and a Time Warner Cable account). Additionally or alternatively, a media tracker 1012 may be separate from social networks, may be adapted to link to at least one social network, may be integrated with a new or an existing social network, some combination thereof, or so forth. Also, an end user 1002 may be associated with a single media tracker 1012 or multiple media trackers 1012 (e.g., an individual one and a family one).

With reference to FIG. 1G or 1M, an example media tracker 1012 is depicted. For certain example embodiments, a media tracker 1012 may include any one or more of the following portions or aspects: media device 1012MD, media source 1012MS, media history 1012MH, media circle 1012MC, media plans 1012MP, some combination thereof, or so forth. A media tracker 1012 may include at least one data structure, one or more instructions, a listing of items, a table of characteristics, at least one or more references to media tracking data, multiple entries, at least one field, one or more blocks having media tracking data, some combination thereof, or so forth. For certain example implementations, a media tracker 1012 may be stored at least partially at or by at least one end user device 1004, at least one server device 1104 (e.g., of FIG. 1K), another device, as a whole unit in a single location or device, distributed across multiple end user or server devices, cached at one or more end user devices with an "official" copy maintained consistently in the cloud, some combination thereof, or so forth.

For certain example implementations, media source portion 1012MS may identify one or more media sources affiliated with (e.g., currently, frequently, occasionally, etc. accessible to—such as subscribed to by) an associated end user 1002. Media sources may include cable companies (e.g., Time Warner Cable), media streaming services (e.g., Netflix or Amazon Instant Video), cable channels (e.g., USA or HBO/HBO Go), broadcast channels (e.g., CBS), internet-based video services (e.g., YouTube), personal video sources (e.g., media located on a home server), some combination thereof, or so forth. Media source 1012MS may include media source account information, such as account number, username or user identification, password, login/logon information, some combination thereof, or so forth to enable some level of account access generally or with respect to media devices 1012MD. For certain example implementations, media device portion 1012MD may identify one or more media devices affiliated with (e.g., currently, frequently, occasionally, etc. accessible to—capable of being manipulated, operated, or otherwise used by) an associated end user 1002 to observe media. A media device may include a mobile device 1004M, a smart display device 1004SD, a display annex device 1004DA, an electronic device that is capable of directly or indirectly playing at least one type of media, some combination thereof, or so forth.

Media device 1012MD may include an indication of which end user devices 1004 are sufficiently proximate so as to be reasonably accessible to an end user 1002 (e.g., within arm's reach, in a same room, on a same floor, within a same house or building, or a combination thereof, etc.) generally or with respect to a device that is enabled to play media from a particular media source.

For certain example implementations, a media history portion 1012MH may identify with at least one media item 1206 entry one or more media items that an associated end user 1002 has observed (e.g., experienced through one or more human senses, such as sight, sound, touch, smell, etc.). By way of example but not limitation, a media item 1206 entry may include any one or more of the following (e.g., entries): identifier 1208 (e.g., name or title, date of creation or release, studio, series title, episode title, alphanumeric designation, universal/uniform resource identifier (URI), uniform resource locator (URL), or a combination thereof, etc.), historical context 1210 (e.g., factors, characteristics, relevant details, description, or a combination thereof, etc. surrounding or related to an observation of a media item), synopsis 1228 (e.g., indication of preferred type or source of synopsis, indication of how much synopsis is pertinent to observed or unobserved portion, reference such as link or pointer to enable synopsis acquisition, actual synopsis, or a combination thereof, etc.), some combination thereof, or so forth. By way of example but not limitation, a historical context 1210 entry may include any one or more of the following (e.g., fields): date 1212 (e.g., date media item was observed, with or without day of week), location 1214 (e.g., physical or virtual location media item was observed, such as GPS coordinates, address, city, room identification, or a combination thereof, etc.), media portion 1216 (e.g., amount of media item observed, such as percentage, start-stop points, or a combination thereof, etc.), shared observer 1218 (e.g., identification of person that observed media item with (e.g., that is physically present with or that is watching together virtually along with) an associated end user, such as name, alias, family member designation, or a combination thereof, etc.), observance characteristic 1220 (e.g., quality or type of media, such as high definition (HD), 4K, 3D, surround sound, virtual reality (VR), projection, personal device, large screen, movie theater, format, edition—such as standard or extended or director's cut, or a combination thereof, etc.), associated event 1222 (e.g., personal situation, cultural touchstone, trip, event, or a combination thereof, etc. such as business trip to Rome, son's birthday, hospital stay, or a combination thereof, etc.—which may be pulled from calendar data, social network data, or a combination thereof, etc.), media source 1224 (e.g., bulk media streamer such as Netflix, per-item streamer such as Apple iTunes, cable company name, web site, television channel or website thereof, or a combination thereof, etc.), observed with device 1226 (e.g., name or description or other identification of a device, such as an end user device that an associated end user relied on to observe a media item), some combination thereof, or so forth. By way of example but not limitation, a synopsis 1228 entry, which may directed to a summary/condensed description/compendium, may include any one or more of the following (e.g., indicators): visual 1230 (e.g., preference indication of visual synopsis, source of visual synopsis, indication of number of frames per minute of media time or rapidity of video review, or a combination thereof, etc.), textual 1232 (e.g., preference indication of textual synopsis; source of textual synopsis—such as most popular, specific company, social network connections, merged or multiple ones, or a combination thereof, etc.), tailored (previously observed) 1234 (e.g., indication of whether an associated end user prefers a synopsis to be tailored to a portion previously-observed, such as including or excluding an observed portion or an unobserved portion—e.g., if an end user wants to be reminded of what was already watched to avoid spoilers or just wants to be updated on what was missed to catch up and move to a next episode, or a combination thereof, etc.), some combination thereof, or so forth.

For certain example implementations, a media circle portion 1012MC may identify one or more individuals 1240 or one or more groups 1252 that an associated end user 1002 is linked to via at least one social network (e.g., is a social network connection separately from or as part of a media guidance system, with a separate social network may be identified as part of a media circle 1012MC). By way of example but not limitation, an individual 1240 entry, which may be directed to a particular social network member, may include any one or more of the following (e.g., fields): relationship 1242 (e.g., friend, co-worker, circle, family member, daughter, parent, social network through which link is established, or a combination thereof, etc.), status 1244 (e.g., a description or one or more indicators providing a current or instantaneously-updated information related to whether a social network connection may participate in joint media observing over time or in real-time or whether a social network connection is sharing his/her media plans, etc.), some combination thereof, or so forth. By way of example only, a status 1244 entry or field may include any one or more of the following (e.g., indicators): location 1246 (e.g., work, home, vehicle, room, city, address, or a combination thereof, etc.), activity 1248 (e.g., working, studying, traveling, driving, observing other media, eating, playing basketball, alone, with company, or a combination thereof, etc.), media availability 1250 (e.g., media sources subscribed to; media sources accessible via a device accessible to an individual; media appropriateness in terms of age, content, graphicness, or a combination thereof, etc.; or a combination thereof, or so forth), some combination thereof, or so forth. By way of example but not limitation, a group 1252 entry or field, which may identify via a listing of individuals or a group moniker one or more social network connections, may include any one or more of the following (e.g., fields): social network linkage 1254 that may include one or more indicators of different social networks, different social network groups—such as a Google+ circle, data enabling access to a social network or a part thereof corresponding to a social network member, some combination thereof, or so forth.

For certain example implementations, a media plans portion 1012MP may include one or more identifiers 1260 (e.g., name or title, date of creation or release, studio, series title, episode title, alphanumeric designation, universal/uniform resource identifier (URI), uniform resource locator (URL), one or more search terms to acquire, or a combination thereof, etc.) of media items (e.g., a television show, a movie, a song, a video clip, or a combination thereof, etc.) that an associated end user 1002 intends (e.g., has affirmatively added to a list, has clicked an icon or a search result representing, or a combination thereof, etc.) or may intend (e.g., that fits a profile of an end user, that a mechanism predicts will be enjoyed by an end user, if end user characteristics or media ratings cause a calculated confidence level of interest to meet a particular desirability level, or a combination thereof, etc.) to observe at some future definite or indefinite time or to observe under particular conditions (e.g., with a particular person, at a particular quality level, at a particular location, or a combination thereof, etc.). By way of example but not limitation, an identifier 1260 entry may include any one or more of the following (e.g., fields): film 1262 (e.g., an identifier of a television move, theater-released motion picture, or feature-length movie, or a combination thereof, etc.), show 1264 (e.g., media having multiple parts released over time or "dropped" at once, such as for one or more seasons), clip 1270 (e.g., a video clip posted to YouTube, an animated clip created by a novice, a home movie, or a combination thereof, etc.), some combination thereof, or so forth. By way of example only, a show 1264 entry or field may include any one or more of the following (e.g., fields): series 1266 (e.g., identification of a series, such as for web or television, in which multiple parts form an ongoing story or have recurring characters or actors), episode 1268 (e.g., identification of a particular episode or episodes by name, by overall episode number, by season/season episode number, or a combination thereof, etc.), some combination thereof, or so forth. By way of example only, a clip 1270 entry or field may include any one or more of the following (e.g., indicators): public 1272 (e.g., whether a clip is available over the internet generally—such as via YouTube), private 1274 (e.g., whether a clip is accessible to those having certain access—such as to a home server or with a username or password), some combination thereof, or so forth.

With reference to FIG. 1J or 1D, for certain example embodiments, at least a portion of a media tracker 1012 may be located at (e.g., stored at, accessed from, beneficially used by, or a combination thereof, etc.) an end user device 1004, such as a display annex device 1004DA, a smart display device 1004SD, or a mobile device 1004M. An end user device 1004 may be manufactured by a device manufacturer 1030 fully within a single country or in multiple countries. Examples of device manufacturers 1030 may include, but are not limited to, a display annex device manufacturer 1030DADM (e.g., Arris, Cisco, Roku, Amazon, a TiVo manufacturer, Huawei, Apple with respect to Apple TV, Sling Media with respect to Slingbox, Broadcom, Comcast, Echostar, etc.), a smart display device manufacturer 1030SDDM (e.g., Samsung, LG, Apple with respect to iTV, Sony, Vizio, etc.), ae mobile device manufacturer 1030MDM (e.g., Apple with respect to iPhone and iPad, Samsung with respect to Galaxy smartphones and tablets, Lenovo, Dell, Amazon, etc.), some combination thereof, or so forth. By way of example only, a display annex device 1004DA may be manufactured by a display annex device manufacturer 1030DADM, a smart display device 1004SD may be manufactured by a smart display device manufacturer 1030SDDM, or a mobile device 1004M may be manufactured by a mobile device manufacturer 1030MDM. However, a single device manufacturer 1030 may manufacture devices of different types.

For certain example embodiments, an end user device 1004 may be controlled at least partially by at least one operating system 1024. By way of example only, an operating system (e.g., UNIX, QNX, Windows, iOS, Android, Linux, OS X, Windows Phone, Symbian, Tizen, or a combination thereof, etc.) may include at least one or more computer programs or modules that manage hardware resources of a device or that offer resources to one or more applications that run on top of an operating system. An operating system 1024 may be delivered, loaded, installed, activated, or otherwise provided to an end user device 1004 by a manufacturer of a device, by a third party, by an operating system (OS) producer 1040, or a combination thereof, etc. at a time of manufacture, at a time of installation or initialization of a device, during use of a device, as part of an update, monolithically, in parts, some combination thereof (e.g., an entity may both manufacture an end user device and produce an operating system therefor), or so forth. Examples of an operating system (OS) producer 1040 may include, but are not limited to, a display annex device OS producer 1040DADOSP (e.g., Google, Apple, Roku, TiVo, Arris, Amazon, Cisco, Huawei, Broadcom, Comcast, Echostar, etc.), a smart display device OS producer 1040SDDOSP (e.g., Google, Apple, Samsung, Amazon, LG, etc.), a mobile device OS producer 1040MDOSP (e.g., Google, Apple, Samsung, Amazon, Lenovo, Windows, Huawei, etc.), some combination thereof, or so forth. By way of example only, an OS for a display annex device 1004DA may be produced by a display annex device OS producer 1040DADOSP, an OS for a smart display device 1004SD may be produced by a smart display device OS producer 1040SDDOSP, or an OS for a mobile device 1004M may be produced by a mobile device OS producer 1040MDOSP. However, a single operating system (OS) producer 1040 may produce operating systems for different types of end user devices.

With reference to FIG. 1K or 1E, for certain example embodiments, at least one media playing application 1016 may be provided by an application provider 1070, such as a media playing application provider 1070MP. A media playing application may be a separate application, a dedicated application, part of another application such as a browser, embedded in another application, a plugin or extension of an application, part of an operating system, some combination thereof, or so forth. By way of example only, a media playing application 1016 may include or may be part of or may communicatively interface with a media guidance application 1014, which is described further herein below with particular reference to FIG. 1P. A media playing application 1016 may be adapted to play one or more media items, which may be received from or provided by at least one media source 1020 (e.g., of FIG. 1O).

With reference to FIG. 1O, at least one media source 1020 is shown as represented by one or more buildings. For certain example implementations, one or more media sources 1020 may be involved with an end user or an associated media tracker 1012 or a media guidance system as indicated by a media source 1020*a*, a media source 1020*b*, a media source 1020*c*, some combination thereof, or so forth. Different media sources 1020 may serve as sources for different types of media items, may source media items using different delivery mechanisms, may offer media items via different business models, some combination thereof, or so forth.

With reference to FIG. 1F, 1R, or 1Q, multiple different examples of media sources are shown. For certain example embodiments, media source examples are described herein below by example category or type—such as network operator, media streamer, or amalgamator—to facilitate understanding; however, actual real-world media sources may be applicable to different or multiple categories or types. For instance, a cable network may stream media items over a private network or the internet. In FIG. 1F, at least one network operator 1020NO is shown. Examples of network operators 1020NO may include, but are not limited to, a cable network operator 1020NO-C (e.g., Comcast, Charter, AT&T U-verse, Verizon FiOS, etc.), a satellite network operator 1020NO-S (e.g., DirecTV, DISH, etc.), a television (TV) network 1020TN (e.g., a broadcast network such as CBS, a basic cable channel such as USA or AMC, a premium cable channel such as Starz or HBO, etc.), some combination thereof, or so forth. For certain example implementations, a network operator 1020NO may have access to at least one media repository 1120, such as a media repository 1120a or a media repository 1120b, that may be localized, distributed, redundant, shared, private, owned, leased, some combination thereof, or so forth. A media repository 1120 may include at least one media item 1018. For certain example embodiments, a media item 1018 may include at least a show, a series, a television episode, a television series, a web series, a webisode, a movie, a film, a movie series-such as a trilogy, a song, an album, a music video, a video clip, a "YouTube channel", a miniseries, an item described herein above with regard to a media tracker 1012 some combination thereof, or so forth.

In FIG. 1R, at least one media streamer 1020MS is shown. Examples of media streamers 1020MS may include, but are not limited to, a package fee streamer 1020MS-PF (e.g., Amazon Instant Video Prime, Netflix, Hulu Plus, HBO with HBO Go, etc.), a per-item fee streamer 1020MS-PIF (e.g., Amazon Instant Video, Apple iTunes, Comcast On-Demand, etc.), an advertising streamer 1020MS-A (e.g., Hulu, Google YouTube, Yahoo! Video, news web sites, etc.), some combination thereof, or so forth. For certain example implementations, a media streamer 1020MS may have access to at least one media repository 1120, such as a media repository 1120c or a media repository 1120d, which may include at least one media item 1018. In FIG. 1Q, at least one amalgamator 1050, which may serve or function as a media source 1020 (e.g., of FIG. 1O), is shown. By way of example only, an amalgamator 1050 may amalgamate various media items, which may include at least those that are user-submitted or non-professionally generated. An example of an amalgamator 1050 may include, but is not limited to, a cloud amalgamator 1050CA (e.g., Google, Yahoo!, Facebook, Microsoft, etc.), or so forth. For certain example implementations, an amalgamator 1050 may have access to at least one media repository 1120, such as a media repository 1120e, which may include at least one media item 1018. Media sources 1020 (e.g., of FIG. 1O, 1F, 1Q or 1R) may distribute one or more media items 1018 via at least one media distribution system.

With reference to FIG. 1L, an example media distribution system 1100 is illustrated. For certain example embodiments, at least one media distribution system 1100 may be used by a media source 1020, such as a network operator 1020NO or a media streamer 1020MS, to distribute (e.g., transmit, send, deliver, share, broadcast, or a combination thereof, etc.) one or more media items 1018. By way of example but not limitation, a media distribution system 1100 may include at least one or more of the following: at least one network 1102 (e.g., the internet), at least one satellite 1106, at least one terrestrial part of a satellite system 1108 (e.g., a satellite dish or network node), at least one cable/fiber optic/DSL network part 1110 (e.g., a switch, router, or other node), at least one wireless network part 1112 (e.g., a base station, gateway, or other network node), some combination thereof, or so forth. Network 1102, by way of example only, may enable communicative coupling between or among various entities, devices, repositories, or a combination thereof, etc. that are shown in FIG. 1 or described herein.

With reference to FIG. 1K, a network 1102 is shown along with at least one message 1114. For certain example embodiments, at least one network 1102 may enable interconnection between different devices to facilitate exchange of media items 1018, media tracker 1012 data, media tracker attributes, messages 1114, or a combination thereof, etc. to facilitate media guidance for one or more end users. For certain example implementations, a network 1102 may have at least or include, but not be limited to, at least one wireless network, at least one wired network, at least one public network, at least one private network, at least one internet, at least one intranet, at least one infrastructure network, at least one ad hoc network, at least one cellular network, at least one packet-switched network, at least one circuit switched network, at least one virtual network, some combination thereof, or so forth. For certain example implementations, a message 1114 may have at least or include, but not be limited to, at least one packet, at least one signal, some communicated electrical or magnetic data, encapsulated information, at least one encrypted message, at least one unencrypted message, at least one Boolean value, one or more alphanumeric characters, at least one code, a file, at least a portion of a media tracker 1012, at least a portion of a media guidance application 1014, some combination thereof, or so forth.

With reference to FIG. 1J, 1K, or 1L, at least one network 1102 as illustrated may communicatively couple one or more end user devices 1004 (e.g., of FIG. 1J or 1K), at least one server device 1104 (e.g., of FIG. 1K), at least one (other) network 1102 (e.g., of FIG. 1L), some combination thereof, or so forth. For certain example embodiments, an end user device 1004 or a server device 1104 may utilize (e.g., store, execute, disseminate, obtain, have access to, interface with, augment, or a combination thereof, etc.) at least a portion of a media tracker 1012, a media guidance application 1014, some combination thereof, or so forth. Example embodiments for a media guidance application 1014 are described further herein below with particular reference to at least FIG. 1P. For certain example implementations, a server device 1104 may be realized as part of a media guidance milieu as: at least one operating system producer server device 1104OP (e.g., of FIG. 1D), at least one network operator server device 1104NO (e.g., of FIG. 1F), at least one application provider server device 1104AP (e.g., of FIG. 1E or 1P), at least one media distribution system server device 1104MDS (e.g., of FIG. 1L), at least one media streamer server device 1104MS (e.g., of FIG. 1R), at least one microblogging service server device 1104MBS (e.g., of FIG. 1Q), at least one amalgamator server device 1104A (e.g., of FIG. 1Q), some combination thereof, or so forth. One or more server devices 1104 may work together or with at least one end user device 1004 in furtherance of providing media guidance, such as by executing or interacting with at least a portion of at least one media guidance application (MGA) 1014 (e.g., of FIG. 1P).

With reference to FIG. 1P, a media guidance application (MGA) 1014 may be provided by an application provider 1070. An example of an application provider 1070 may include, but is not limited to, a media guidance application provider 1070MG (e.g., Samsung, Google, Amazon, Comcast, Apple, Facebook, etc.). For certain example embodiments, a media guidance application 1014 may include at least part of a program, a module, an app (e.g., that is native, that runs in a browser, that runs within a virtual machine, or a combination thereof, etc.), an operating system, software (e.g., at least one high-level computer program serving as a hardware specification), processor-executable instructions, other code, some combination thereof, or so forth. For an example end user device implementation, a media guidance application 1014 may execute locally (e.g., on an end user device), remotely (e.g., on a server device in the cloud), a combination thereof, or so forth. For an example server device implementation, a media guidance application 1014 may execute locally (e.g., on one or more server devices), remotely (e.g., on at least one end user device), a combination thereof, or so forth. Additionally or alternatively, a media guidance application 1014, or portion thereof, may be instantiated on a single device, may be distributed across multiple devices, may migrate fully or partially across devices or from one device to another device, may execute in a distributed fashion, some combination thereof, or so forth. A media guidance application 1014 may be delivered, loaded, installed, activated, or otherwise provided to an end user device 1004 by a manufacturer of a device, by a third party, by a media guidance application provider 1070MG, or a combination thereof, etc. at a time of manufacture, at a time of installation or initialization of a device, during use of a device, as part of an update, monolithically, in parts, some combination thereof (e.g., an entity may both manufacture an end user device and produce a media guidance application therefor), or so forth.

With reference to FIG. 1P, for certain example embodiments, at least a portion of a media tracker 1012 may be acquired, maintained, shared, disseminated, built, accessed, used, or a combination thereof, etc. by at least one media guidance application (MGA) 1014. A media guidance application 1014 may include, but is not limited to, one or more modules. Although certain modules may be described herein separately, their operations may include overlapping or interrelated functionality. For instance, a social network interaction module 1072I may interface or overlap with a media guidance presentation module 1072P. Additionally or alternatively, other modules that may be included as part of an example media guidance application 1014 are described herein or illustrated in other figures but are omitted from FIG. 1P for the sake of clarity (e.g., a media adaption module 1072A of FIG. 1U). For certain example implementations, a media guidance application 1014 may include a media item observation obtainment module 1072O. By way of example, a media item observation obtainment module 1072O may obtain at least one indication of one or more media items 1018 that have been at least partially observed by an end user 1002 (e.g., of FIG. 1H) with at least one end user device 1004 (e.g., of FIG. 1J) that is playing media 1202 (e.g., of FIG. 1I). For certain example implementations, a media guidance application 1014 may include a media guidance presentation module 1072P. By way of example, a media guidance presentation module 1072P (e.g., also of FIG. 1O) may present media guidance to an end user 1002 (e.g., of FIG. 1H) via at least one end user device 1004 (e.g., of FIG. 1J). For certain example implementations, a media guidance application 1014 may include a social network interaction module 1072I. By way of example, a social network interaction module 1072I may enable or facilitate an interfacing of media guidance functionality with separate or integrated social network 1060 (e.g., of FIG. 1B) functionality. For certain example implementations, a media guidance application 1014 may include a social message communication (SMC) handling module 1072H. By way of example, a social message communication (SMC) handling module 1072H may enable or facilitate a synchronization of a message stream 1082 (e.g., of FIG. 1W) with or to a media stream 1022 (e.g., of FIG. 1W). For certain example implementations, a media guidance application 1014 may include a multiple screen synthesis module 1072S. By way of example, a multiple screen synthesis module 1072S may enable or facilitate providing guidance, including but not limited to media observation experiences, with at least first and second devices having first and second screens, respectively.

With reference to FIG. 1H, 1I, 1J, or 1N, for certain example embodiments, an end user 1002 may observe a media item 1018 with such observance being memorialized with a media tracker 1012. As indicated at a blurb 2002, a media item 1018 may be played visually, played aurally, played in 2D or 3D, played using a virtual reality (VR) capability, played on one or multiple screens or speakers, some combination thereof, or so forth. For certain example implementations, as indicated at a blurb 2004, at least partial observance of at least one media item 1018 by an end user 1002 may be detected. By way of example but not limitation, detection may include at least: a sign-in by an end user into at least one account, realization that a certain portion of a media item has been played, usage of a particular person's device, biometric recognition (e.g., facial recognition, fingerprint recognition, iris recognition, behavioral usage analysis, or a combination thereof, etc.), media recognition (e.g., via comparison of sound or video portions to at least one reference data base of sounds or videos if an end user is at a friend's house or a public venue such as a movie theatre), some combination thereof, or so forth. A single server device or end user device may detect one or more end users that are observing a single media playing event (e.g., with facial recognition via a camera or multiple user names or alias being input or uploaded). Additionally or alternatively, different respective devices that are associated with different respective end users may separately detect observance of their respective end users of a single shared observing of a media item—at one location or geographically dispersed. For example, an end user's personal end user device may monitor the end user and detect if eyes are closed for sleep, heart rate slows indicating sleep, movement patterns indicate sleep, or a combination thereof, etc. to determine if the end user has fallen asleep and then memorialize a playing position at which a media item was observed prior to or approximately around when the end user fell asleep, even if the media item is not stopped or paused and the end user remains where the media item is playing.

With particular reference to FIG. 1N, for certain example implementations, blurbs 2006-2014 are shown with respect to a media history 1012MH portion (e.g., of FIG. 1M) of a media tracker 1012 (e.g., of FIG. 1G). As indicated at a blurb 2006, a media guidance application may memorialize (e.g., store, archive, transmit for storage or archival purposes, add to a data structure, identify, catalog, or a combination thereof, etc.) one or more aspects of at least one media item that has been at least partially observed—memorialization may include, but is not limited to having, a measure of historical context, such as environmental factors gleaned from device sensors, event information extracted from calendar data, social interactions ascertained from a social network profile, manually added/amended/annotated context information, context determined from other end user communications, context derived from news or other public information, some combination thereof, or so forth.

As indicated at a blurb 2008, a media guidance application may memorialize, for example, TV series, TV seasons, TV episodes, including an entirety or portions thereof, etc. that have been observed by an end user. As indicated at a blurb 2010, a media guidance application may memorialize media items that have been observed across different devices (e.g., multiple end user devices of an end user, end user devices of a friend of an end user, a server device streaming images over the internet to a potentially "non-intelligent" display screen device, or a combination thereof, etc.), different media sources (e.g., cable company via a cable box and possibly "dumb" screen, an internet media streaming company via a tablet computer, or a combination thereof, etc.), some combination thereof, or so forth. As indicated at a blurb 2012, a media guidance application may memorialize at least one identification (e.g., description, make, model number, serial number, user-provided name, system or service-provided name, network address, alphanumeric designation, code, or a combination thereof, etc.) of a device (e.g., screen, tablet, smart phone, television, display annex device, smart watch, or a combination thereof, etc.) or at least one identification (e.g., description, company name, account designation, subscription type, user-provided alias, system or service-provided alias, or a combination thereof, etc.) of a media source (e.g., network operator, media streamer, amalgamator, or a combination thereof, etc.) that is used to observe at least one media item.

As indicated at a blurb 2014, a desirability of an end user for being presented a synopsis may be imparted to a media tracker. By way of example only, synopsis indication(s) may include, but are not limited to: a preferred type of synopsis (e.g., visual, textual, aural, edited, user-created, professionally-created, formed from excerpts, or a combination thereof, etc.), full versus partial synopsis (e.g., a complete episode, a synopsis that begins from a start of a media item and concludes at a final point that was observed, a synopsis that begins from a final point that was observed and continues to an end of an episode, or a combination thereof, etc.), hidden versus revealed synopsis (e.g., synopses may be shown automatically—such as once a full title is shown or may be hidden until an additional UI selection or indication is activated, in case an end user prefers to hide synopses for un-observed media items to avoid spoilers or prefers to hide synopses for observed media items to save time), some combination thereof, or so forth.

With reference to FIG. 1H or 1I, for certain example implementations, blurbs 2016-2028 are shown. By way of example but not limitation, a media guidance presentation module 1072P (e.g., of FIG. 1P) may execute to realize one or more operations pertaining to any one or more of blurbs 2016-2028. As indicated at a blurb 2016, media guidance may be presented, for example, in one or more of any of a number of formats or qualities in which media may be played. Example formats or quality levels may include, but are not limited to, standard definition (SD), high definition (HD), 4K video, 3D video, virtual reality (VR) interface, monaural sound, stereo sound, surround sound, an end user device that is to play media (e.g., on a wall-mounted television), a separate end user device (e.g., a tablet computer) from one that is to play media (e.g., a wall-mounted television), some combination thereof, or so forth. As indicated at a blurb 2018, an end user may indicate a desirability of having media item options pertaining to particular media sources or applicable to particular media-playing devices. For example, for contemporaneous media guidance or to establish settings for future media guidance, an end user may enter or identify what media sources are subscribed to or preferred, which end-user devices are available or preferred for media playing, which media devices are to be associated with particular media sources or media format options, some combination thereof, or so forth.

For certain example implementations, as indicated at a blurb 2020, an end user may indicate interest in a media item, such as via a user interface (UI) selection of a media item representation in a grid, in a list of search results, by speaking a title of a media item, some combination thereof, or so forth. As indicated at a blurb 2022, a media guidance application may formulate a response to an interest indication of an end user based at least partly on at least one media tracker that is associated with the end user. For example, a media guidance application may check if an end user has at least partially already observed an indicated media item; may determine if an indicated media item is available—and if so when, with what media source, with which available end user device, or a combination thereof, etc.; may determine if anyone in an end user's media watching social network sphere is currently observing an indicated media item; may ascertain if anyone in an end user's media watching social network sphere has an indicated media item on his/her media plans; some combination thereof; or so forth.

For certain example implementations, as indicated at a blurb 2024, if an indicated media item of interest matches a previously-observed media item, a media guidance application may so notify an end user or provide one or more options. Options may include, but are not limited to, suggesting an alternative media item—such as a next episode in a series or a title that is rated well by people who rated an indicated media item highly, informing an end user of a social network connection that may share an interest in observing an indicated media item some combination thereof, or so forth. As indicated at a blurb 2026, if an indicated media item of interest fails to match an oldest un-observed media item of a particular media series, a media guidance application may so notify an end user or provide one or more options. Options may include, but are not limited to, identifying an oldest un-observed media item of a particular media series, offering access to a synopsis of an oldest un-observed media item of a particular media series, some combination thereof, or so forth. As indicated at a blurb 2028, in response to a request—such as a search request or a general inquiry—or an indication of interest in a particular media series, a media guidance application may perform a search to identify (and subsequently present) multiple episodes or series not yet observed for a particular title. For example, if an end user indicates an interest in Deep Space 9, a media guidance application may identify and present a list of unobserved Deep Space 9 episodes or identify and present other Star Trek television series (e.g., Star Trek: The Original Series, Star Trek: The Next Generation, Star Trek: Voyager, Star Trek: Enterprise, Star Trek: The Animated Series, or a combination thereof, etc.).

With reference to FIG. 1O, for certain example embodiments, a media guidance presentation module 1072P of a media guidance application 1014 may operate based, at least partially, on one or more media characteristics 1310, one or more device characteristics 1330, some combination thereof, or so forth. By way of example but not limitation, one or more media characteristics 1310 may relate to at least one media item 1018 or at least one media source 1020 (e.g., a media source 1020a, a media source 1020b, a media source 1020c, or a combination thereof, etc.) or may describe, provide attributes of, identify offering of, or a combination thereof, etc. at least one media item 1018 or at least one media source 1020. By way of example but not limitation, one or more device characteristics 1330 may relate to at least one end user device 1004 (e.g., a display annex device 1004DA, a smart display device 1004SD, a mobile device 1004M, or a combination thereof, etc.) or may describe, provide attributes of, identify capabilities of, or a combination thereof, etc. at least one end user device 1004.

For certain example implementations, one or more media characteristics 1310 may include, but are not limited to, media item 1312 (e.g., identification of which media items a given media source may provide), media source 1314 (e.g., identification of which media source(s) a given media item may be provided by), timing availability 1316 (e.g., immediately, on-demand, days or times, end date for availability, or a combination thereof, etc.), device applicability 1318 (e.g., which devices are capable or permitted to play a given media item or media items from a given media source—such as if a show is not permitted to be streamed to a mobile device or only permitted to be delivered to an end-user's home), format—including but not limited to quality—1320 (e.g., SD, HD, 4K, 3D, stereo, surround sound, resolution, VR, .mp3, QuickTime, MPEG-4, annotated/augmented video, or a combination thereof, etc.), share-ability 1322 (e.g., an indication of whether a given media item may be loaned to another or streamed to another's device if an end user is logged in thereto), cost 1324 (e.g., dollar value, number of points, free, associated subscription service that can provide, free because of a service subscribed to, length—such as total time or number—of commercial(s) that must be observed/played to be able to observe a given media item, or a combination thereof, etc.), some combination thereof, or so forth.

For certain example implementations, one or more device characteristics 1330 may include, but are not limited to, proximity 1332 (e.g., a distance to a particular device—with respect to an end user or a device providing media guidance, an indication as to whether a device is within a same house or other building, or a combination thereof, etc.), power 1334 (e.g., a current power level of another device, an indication of whether a device has sufficient power to be able to play a particular media item, an approximate length of time a device may play a kind of media before exhausting its power reserves, whether a device may be plugged in for power, or a combination thereof, etc.), device usage feasibility 1336 (e.g., whether or how well a device may play a particular media item or content from a particular media source), some combination thereof, or so forth. By way of example only, device usage feasibility 1336 may pertain to format capability 1338 (e.g., whether a device may play a media item in a selected format, an indication of one or more formats—such as VR versus 3D—that a device is capable of, MPEG-4, QuickTime, compression/decompression capabilities, codecs handled, a media quality indication, or a combination thereof, etc.), media source capability 1342 (e.g., an indication of which media sources a device is permitted to play from, an indication of what media sources a device is already configured—such as a loaded app with logged in credentials—to handle, whether a device is capable of playing media from a selected media source, or a combination thereof, etc.), some combination thereof, or so forth. By way of example but not limitation, a format capability 1338 may include a quality capability 1340 (e.g., whether a device may play a media item at a selected quality level, what is a maximum quality level capability, high definition, resolution, WXGA, bandwidth available to device, progressive scan, or a combination thereof, etc.).

With reference to FIG. 1I, 1N, or 1O, for certain example implementations, blurbs 2030-2036 are shown. By way of example but not limitation, a media guidance presentation module 1072P may execute to realize one or more operations pertaining to any one or more of blurbs 2030-2036. For certain example implementations, as indicated at a blurb 2030, a media guidance application may generate at least one media guide based at least partly on multiple media sources (e.g., a network operator—such as a cable company or a broadcast network, an unpaid media streamer, a media streamer subscription, or a combination thereof, etc.). As indicated at a blurb 2032, a media source may agree to provide access to its catalog (e.g., an identification) of media items that it can provide or may agree to provide one or more indications of media items observed by an end user or current subscriber. A media source 1020 may be compensated for providing this information, for example, directly with a financial payment or in exchange for publicizing a media source's available media items as part of a media guidance presentation (e.g., to current subscribers that already have access to a media source's media items or to potential subscribers that may subscribe to a media source to gain access to its media items) (e.g., as a form of advertising compensation).

For certain example implementations, as indicated at a blurb 2034, a media guidance application may generate at least one media guide based at least partly on one or more end user devices that are available to play media (e.g., a mobile device, a 3D-capable device, a device that is linked to sufficient bandwidth, a device that has sufficient power reserves to play an entirety or an indicated amount of a media item, a proximate—which proximity level may be user-defined—of an end user device, or a combination thereof, etc.). A media guidance application may, by way of example only, ascertain a current location of one or more specified end user devices if an end user requests inclusion of a proximity factor in media guidance while receiving media guidance, at regular intervals, when devices are moved, upon activation of a media guidance request or functionality, after an end user device is registered with a media guidance system or service, some combination thereof, or so forth. As indicated at a blurb 2036, a media guidance application may add, insert, omit, delete, reveal, hide, or a combination thereof, etc. blocks, entries, search results, media item options, media guidance suggestions, or a combination thereof, etc. based at least partially on applicable media sources, available user devices, some combination thereof, or so forth. Additionally or alternatively, media guidance 1204 may include an indication (e.g., an icon that represents an end user device, a color such as green or red indicating a quality that will be played, or a combination thereof, etc.) as to how (e.g., whether, to what degree, or a combination thereof, etc.) an end user device's capabilities match or can accommodate a specific media item's or a media source's overall format offerings or demands (e.g., an HD media item may have a green background or an iPad icon while a 4K media item may have a red background or an iTV icon).

With reference to FIG. 1B, at least one social network 1060 is shown. For certain example embodiments, a social network may include at least a physical network or a virtual network that pertains to interpersonal, professional, or other communicative interactions between or among people, groups, companies, or other entities, which communicative interactions may be enabled at least partially through web browsers, desktop applications, mobile applications, cloud applications, internet servers, operating systems, cloud services, some combination thereof, or so forth. Examples of social networks may include, but are not limited to, Facebook, Twitter, Google+, LinkedIn, MySpace, Flickr, Friendster, Instagram, Reddit, Digg, Foursquare, WhatsApp, certain communication networks or services—such as messenger apps that provide real-time interaction or an indication of presence/availability or Twitter, Bebo, CafeMom, Classmates [dot] com, Orkut, Pinterest, Tumblr, Vkontakte, Qzone, some combination thereof, or so forth. An example of a social network 1060 may include, but is not limited to, a social network provider 1060P, or so forth. For certain example implementations, a social network 1060 may include at least one or more members 1062. By way of example only, a social network member 1062a, a social network member 1062b, a social network member 1062c, or a social network member (group) 1062d, etc. are shown. Social network members 1062 may communicate with, e.g., their social network connections over at least one network 1102 via one or more avenues provides by at least one social network 1060. A social network 1060 may be created, maintained, facilitated, or a combination thereof, etc. substantially separately or independently of a media guidance system or service or substantially by or integrated with—such as instantiated at least partly using—a media guidance system or service, including but not limited to operations thereof.

For certain example embodiments, a social network connection (SNC) media conduit 1064 may be instantiated, exposed, created, offered, or a combination thereof, etc. by a social network 1060, a media guidance service or system, some combination thereof, or so forth. A social network connection media conduit 1064 may include, but is not limited to, at least one application programming interface (API), one or more functions exposed by a server device, a web app, a capability established via cloud computing, some combination thereof, or so forth. For certain example implementations, a social network connection media conduit 1064 may enable one or more media guidance features to be provided in a social network context, may enable social network connections to communicate with one another to share media-related communications, may enable media-related commentary or preferences to be fed into a media guidance system or service or vice versa (e.g., media-related comments or preferences may be used to augment or adjust or build a media tracker or media tracker data may be used to facilitate social experiences via a social network), may enable social network connections to jointly observe one or more media items in one physical location via planning/scheduling or geographically dispersed, some combination thereof, or so forth.

With reference to FIG. 1B, for certain example implementations, blurbs 2038-2042 are shown. By way of example but not limitation, a social network interaction module 1072I (e.g., of FIG. 1P) may execute to realize one or more operations pertaining to any one or more of blurbs 2038-2042. For certain example implementations, as indicated at a blurb 2038, one or more social network connections of a media circle 1012MC (e.g., also of FIG. 1G) of a media tracker 1012 (e.g., of FIG. 1G) for media guidance may inform (e.g., inspire, serve as suggested connections for or inclusion with, provide a foundation regarding, or a combination thereof, etc.) one or more social network connections of a social graph of a social network 1060, or vice versa. By way of example only, an individual 1240 (e.g., of FIG. 1G) or a group 1252 (e.g., of FIG. 1G) of a media circle 1012MC portion of a media tracker may be used as a basis for a social network connection (SNC) indication 1066 (e.g., an indication that two persons should be connected, an indication that two people should be friends, an indication that a social network should suggest a connection, an indication that a media guidance system or service should refer to a person's associated media tracker if making social-network-based media guidance suggestions or other presentation, or a combination thereof, etc.).

For certain example implementations, as indicated at a blurb 2040, a media guidance application may have access to a social network connection (SNC) group or listing for a separate or an integrated social network. By way of example only, it may have access to a schedule, presence information, media plans, media sources, media-related topics of interest, media items that are followed or investigated or discussed, some combination thereof, or so forth. Accordingly, a media guidance application may coordinate one or more times (e.g., may determine times, may send out invites for, may collect responses regarding, or a combination thereof, etc.) for social network connections to jointly observe at least one media item, even if the social network connections are geographically distributed—such as be facilitating synchronous playing of at least one media item. As indicated at a blurb 2042, a media guidance application may facilitate community observing—e.g., joint watching of a television show—with connected social network members. By way of example only, community observing may be based at least partially on social network connection (SNC) availability, mutual media plans (e.g., of media plans 1012MP (e.g., of FIG. 1G)) with at least one SNC, mutual media source or media item availability with respect to at least one SNC, some combination thereof, or so forth.

With reference to FIG. 1U, example embodiments with respect to adapted media (e.g., adapted media playing, adapted media guidance, or a combination thereof, etc.) are shown. For certain example embodiments, a media guidance application 1014 is illustrated receiving or processing one or more factors (e.g., variables, inputs, parameters, characteristics, attributes, or a combination thereof, etc.). By way of example only, a media guidance application 1014 may produce at least one media-related action 1356 based at least partially on one or more factors. Examples of factors may include, but are not limited to, one or more format preferences 1350 (e.g., which may be memorialized as at least part of at least a portion of a media tracker 1012), one or more available media devices 1352, one or more available media formats 1354, at least one schedule 1358 (e.g., of an end user based at least partially on calendar data, habit, an explicit indication of time available to observe, or a combination thereof, etc.), some combination thereof, or so forth. For certain example implementations, examples of media-related actions 1356 may include, but are not limited to, adapted media playing 1202A, adapted media guidance 1204A, some combination thereof, or so forth. Examples of adapted media guidance 1204A may include, but are not limited to, at least a portion of an adapted media guide 1204A-MG (e.g., an adapted media grid, an adapted media item suggestion, or a combination thereof, etc.), at least one media option 1204A-O (e.g., an adapted option to engage a social network connection with respect to at least one media item), some combination thereof, or so forth.

With reference to FIG. 1U, for certain example implementations, blurbs 2044-2046 are shown. By way of example but not limitation, at least one media adaption (or adaptation) module 1072A may execute (e.g., as part of a media guidance application 1014) to realize one or more operations pertaining to any one or more of blurbs 2044-2046. For certain example implementations, as indicated at a blurb 2044, at least one entity (e.g., a social network, a media source such as a network operator or an amalgamator, or a combination thereof, etc.) may present at least one survey or questionnaire asking about specific media item titles or general media genres that an end user likes to observe, has enjoyed in the past, wishes to discuss on social media, is willing to listen to even if accompanying video is to be omitted (e.g., a sporting event, a soap opera, a talk show, or a combination thereof, etc.), prefers clarifying annotations for, some combination thereof, or so forth. As indicated at a blurb 2046, a media guidance application may learn end user preferences gradually over time based on, for example, detecting trends of choices or selections made, analyzing responses to options or suggestions, some combination thereof, or so forth. By way of example only, with respect to a given end user device for a particular media item, a media adaption module 1072A may realize that an end user will accept an audio-only observation of video for particular media items or at certain times of day, or so forth. For instance, an end user may be willing to see a low-resolution or visually-truncated version of Fox News on an iPhone at any time of the day, or an end user may be willing to experience Jon Stewart's "The Daily Show" in an audio-only format via an iWatch in the evening from 6-7 pm, such as during a daily exercise session. Accordingly, a media guidance application 1014 may adapt media item delivery based at least partly on at least one actively-expressed preference or at least one preference that has been inferred responsive to at least one suggestion to provide an alternative media item presentation or a request to receive an alternative media item presentation to thereby learn an end-user preference. Additionally or alternatively, a media adaption module 1072A may learn that an end user only or tends to watch a new "Game of Thrones" episode when a social network connection is available to watch it simultaneously.

With reference to FIG. 1X, for certain example embodiments, one or more of multiple possible media guidance factors (MGFs) 1362 may be considered for at least one media guidance production mechanism 1360. Production of media guidance 1204 may be based, at least partly, on one or more media guidance factors 1362. As indicated at a blurb 2048, one or more media guidance factors 1362 may be incorporated into production of, or analysis for, media guidance 1204. Additionally or alternatively, one or more relevant media guidance factors 1362 may be indicated in a presentation of media guidance 1204. For instance, if a media item has available annotations, if a social network connection is available to watch a show immediately or at a certain time, if a particular end user device is currently feasible for observing a given media item, or a combination thereof, etc. may be included as part of a media guidance 1204 presentation.

With reference to FIG. 1X or 1N, for certain example implementations, a synopsis preference or availability MGF 1362e (e.g., as also shown in FIG. 1N) may be considered in production 1360 of media guidance 1204. As also shown in FIG. 1N (or media history 1012MH of FIG. 1M), if an end user has a preference expressed as part of a synopsis entry 1228, media guidance 1204 may be produced based at least partly on a synopsis preference indication. For example, media items that have a corresponding synopsis that matches an end user preference may be presented or highlighted in a media guidance 1204 presentation while other media items that do not may be excluded or un-highlighted.

With reference to FIG. 1X or 1E, for certain example implementations, a media item annotation characteristic MGF 1362d (e.g., as also shown in FIG. 1E) may be considered in production 1360 of media guidance 1204. With reference to FIG. 1E, a media item annotation 1116 is illustrated. By way of example only, a media item annotation 1116 may include images appended to an aural media item, text applied over video, sound that explains what is being shown on a video, some combination thereof, or so forth. For certain example embodiments, as indicated at a blurb 2050, a media item (e.g., file or stream) may be augmented with at least one annotation relating to (e.g., describing, explaining, highlighting, or a combination thereof, etc.) non-played or non-discernable aspects. For example, an audio commentary may be added or modified that describes one or more aspects of a playing video that are pertinent to understanding the video (e.g., a location of a live news reporting segment that is displayed textually on a screen may be added as an audio annotation if a media item playing is audio-only for an end user, a cut-off portion of a video scene may be described if a screen fails to match a full extent of a format of a media item, or a combination thereof, etc.). As indicated at a blurb 2052, a marker 1132 indicative of a temporal location of media item for when/where an annotation is to be played may be inserted into a file of a media item or a list of annotation playing times may accompany a media item or a set of annotations therefor. As shown at FIG. 1E (with a jump to FIG. 1X), if an end user has indicated a preference to be played media item annotations 1116 or a willingness to experience truncated versions of media items (e.g., audio-only playings of videos with sound and images in a vehicle, a low-res or cut-off version of a widescreen HD media item on an intelligent watch, or a combination thereof, etc.), a media item annotation characteristic MGF 1362d may be considered by a media guidance production 1360 mechanism—such as by visually specially indicating those media items that have associated annotations, by suggesting media items having relevant annotations based on historical end user preferences, combinations thereof, or so forth.

With reference to FIG. 1X or 1C, for certain example implementations, one or more social-network-related media guidance factors (MGFs) 1362a, 1362b, 1362c, or 1362f are shown. For certain example embodiments, a media item popularity with respect to social media MFG 1362f may be considered in a production 1360 operation for media guidance 1204. For example, media items (e.g., particular television shows or live sporting events) that tend to inspire or correlate with higher-than-average social media chatter (e.g., trend highly on Twitter) during their initial debut (e.g., broadcast on a network or dropping on a media streamer)—generally across at least one social media outlet or specifically with respect to social network connections of an end user) may be surfaced in a media guidance grid, may be the subject of a media guidance suggestion, may be the target of a media guidance social-viewing option that is presented, may be ranked higher in a listing of media items pulled from a media plans 1012MP portion of a media tracker 1012, may be used to find a nexus between/among social media popularity and observing preferences, some combination thereof, or so forth. Social-network-related media guidance factors (MGFs) 1362a, 1362b, or 1362c are described below with particular reference to FIG. 1C.

With reference to FIG. 1C (with a jump to FIG. 1X), a calendar schedule MGF 1362c is shown. For certain example embodiments, calendar data of an end user or calendar data of a social network connection of the end user may be factored into a production 1360 of media guidance 1204. By way of example only, a media guidance presentation (i) may be responsive to available times or dates of an end user with respect to creation of a media grid or to formulation of media suggestions or (ii) may be responsive to times or dates in which an end user and one or more social network connections thereof are also available, e.g., to suggest or plan a shared observing experience.

With reference to FIG. 1C (with a jump to FIG. 1X), a preference MGF 1362a is shown, with a preference that may pertain to an end user or a social network connection thereof. For certain example embodiments, as indicated at a blurb 2054, one or more current or previous preferences of an end user or a social network connection may be factored into media guidance (e.g., a media grid, a media item suggestion—such as a recommendation, a media observing option—such as a different device or a shared observing experience with another, or a combination thereof, etc.). Examples of preferences may include, but are not limited to, content ratings (e.g., implicit ones like repeated viewings or frequent media item selection within a given genre or family of shows or like not finishing a media item, explicit ones like stars given or a numeral assigned, or a combination thereof, etc.), favorability indications (e.g., a thumbs up or down, tweeting or commenting positively or negatively about a media item, or a combination thereof, etc.), answers to a survey or a quiz about media observing generally or particular media items, some combination thereof, or so forth.

With reference to FIG. 1C (with a jump to FIG. 1X), a media item that is currently being observed by a social network connection MGF 1362*b* is shown. For certain example embodiments, as indicated at a blurb 2056, what media item (if any) a social network connection (SNC) is currently observing may be identified (e.g., an indication thereof may be ascertained, a message having information about such a media item may be received, a media tracker associated with a social network connection may be accessed to determine a current media item, or a combination thereof, etc.). By way of example only, to factor into media guidance production what a social network connection is currently observing, corresponding media items may be so indicated in a media grid, may be a subject of a media guidance suggestion, may be identified in a media guidance option to join a social network connection in a current observing experience, some combination thereof, or so forth.

With reference to FIG. 1X, other media guidance factors 1362*g* may be applied to a media guidance production 1360 mechanism. By way of example but not limitation, media item meta-data availability may be applied as a media guidance factor (MGF). For example, whether or not a media item is linked to or whether an end user may call up performer (or other artistic contributor or creator) data may be reflected in media guidance 1204—such as by including an icon with those media items having associated meta data, by ranking higher those media items having associated meta data, by excluding media items lacking associated meta data, some combination thereof, or so forth.

With reference to FIG. 1X, for certain example embodiments, two example selectable zones 1122 or 1124 are shown with regard to media guidance 1204. A selectable zone may include, by way of example but not limitation, at least some text, at least a virtual button, at least one menu item, a command entry, text that may be spoken, an area that may be highlighted with a remote, a screen portion that may be pressed, a feature that may be activated, some combination thereof, or so forth. For certain example implementations, a media guidance 1204 presentation may include at least one communicate with social network connection (SNC) selectable zone 1122. As indicated at a blurb 2058, a user interface (UI) element may be presented that, if activated via end user selection, may enable communication (e.g., textual, audio, video, or a combination thereof, etc.) with at least one social network connection (i) via a same device that is playing or will be playing a media item or that is presenting media guidance 1204 or (ii) via a different device—which may be user indicate-able via a media guidance 1204 UI to, for example, invite a social network connection to share a real-time observing experience.

For certain example implementations, a media guidance 1204 presentation may include at least one observe media item like social network connection (SNC) selectable zone 1124. As indicated at a blurb 2060, if or after what a social network connection is currently observing is identified to an end user as part of media guidance 1204, an activatable link may be included (e.g., added, displayed, incorporated, or a combination thereof, etc. as part of media guidance 1204—such as provided as part of a media grid, displayed as a media option, listed as a media suggestion, or a combination thereof, etc.) to enable observing of a media item that the social network connection is currently observing. If selected by an end user, playing of a media item to enable a shared observing experience with a social network connection may be initiated from a media item's start, may be initiated from a point/time that a social network connection is currently observing (e.g., to synchronize their observing experience to facilitate socialization), some combination thereof, or so forth.

With reference to FIG. 1C, a social network connection media conduit 1064 is shown. For certain example embodiments, a social network connection media conduit 1064 may enable shared media observing experiences between or among at least one end user and one or more social network connections via at least one social network or a media guidance system or service. For certain example implementations, synchronization messages (that may have, e.g., media item identification, timing information, commercial break length information, media stream manipulation updates, or a combination thereof, etc.) may be exchanged between end user devices, a media source, network buffers, some combination thereof, or so forth. As indicated at a blurb 2062, media item observance synchronization with at least one social network connection may be enabled such that media item playing is substantially simultaneously (e.g., as limited by network bandwidth constraints or lag times; so that textual, verbal, or video discussion may be carried out by observers with each other without undue annoyance; or a combination thereof, etc.) effected at different end user devices of different social network members. By way of example, if play, pause, rewind, etc. are being controlled at one end user device, a corresponding media stream of a social network connection may also be automatically synchronously played, paused, rewound, etc., respectively. As indicated at a blurb 2064, commercial timing, commercial break length, or a combination thereof, etc. may be harmonized for synchronized social observing of media items that are preceded by or interrupted by advertisements. If social network connections are co-located—such as within a single room, in addition to harmonizing advertisement length(s), actual same or identical commercials may be sent to or played by each end user device to avoid commercial cacophony.

With reference to FIG. 1Q, a microblogging service 1080 is shown. For certain example embodiments, a microblogging service 1080 may enable or facilitate communications between or among multiple individuals, communications from individuals to groups, intragroup communications, intergroup communications, some combination thereof, or so forth. By way of example, communications may be limited—such as by character length, video length, image size, number of communications per unit of time, some combination thereof, or so forth. An example of an entity offering a microblogging service 1080 may include, but is not limited to, a microblogging service provider 1080MSP (e.g., Twitter, Tumblr, SnapChat, Sina Weibo, Vine, etc.).

With reference to FIG. 1V or 1W, for certain example embodiments, a media stream 1022 may be coupled to a message stream 1082. A media source 1020 may provide at least access to a media item 1018, which may correspond to or include at least a media stream 1022. A microblogging service 1080 (e.g., of FIG. 1Q) may provide at least access to a message stream 1082. By way of example only, a message stream 1082 may correspond to or include at least one or more social message communications (SMCs) 1084. A correspondence or inclusion may be based, at least partially, on at least one account to which each SMC 1084 belongs, a keyword (e.g., a tag, a Twitter #/hashtag, a categorization, or a combination thereof, etc.) that is associated with—such as is included in—each SMC 1084, an identification or origin of an SMC 1084, an identification of destination of an SMC 1084, some combination thereof, or so forth. For certain example implementations, a time scale 1086 may be determined (e.g., ascertained, established, or a combination thereof, etc.) that can be used to connote or denote corresponding times (e.g., time stamps 1086S) of a message stream 1082 with or to corresponding times (e.g., time indexes 1086I) of a media stream 1022.

With particular reference to FIG. 1V or 1W, for certain example implementations, blurbs 2066-2072 are shown with respect to a synchronization of a message stream 1082 to a media stream 1022, or vice versa. By way of example but not limitation, a social message communication (SMC) handling module 1072H (e.g., of FIG. 1P) may execute to realize one or more operations pertaining to any one or more of blurbs 2066-2072. As indicated at a blurb 2066, a media source 1020 (e.g., a network operator, a media streamer, an amalgamator, or a combination thereof, etc.) may provide a media item 1018 (e.g., rapidly in bulk form) or a media stream 1022 version thereof (e.g., over time). As indicated at a blurb 2068, at least one social message communication (SMC) 1084 (e.g., a social network message posting or publishing, such as a transmitted microblogging message like a tweet) may be scaled to at least one media stream 1022 time index 1086I. By way of example only, one or more social message communications 1084 that are associated with respective time stamps 1086S may be presented to an end user at corresponding media stream 1022 time indexes 1086I during delayed or repeated observations to recreate a "live" social observing experience or create a pseudo-live observing experience with respect to at least one designated message stream 1082.

For certain example implementations, as indicated at a blurb 2070, social message communication collection, analysis, coordination, tagging, storage, syncing, scaling to a media stream, or a combination thereof, etc. by at least one entity (e.g., a media source 1020, an amalgamator 1050 (e.g., of FIG. 1Q), a social network 1060 (e.g., of FIG. 1B), a microblogging service 1080 (e.g., of FIG. 1Q), or a combination thereof, etc.) may enable presentation of one or more social message communications (SMCs), which are associated with time stamps 1086S at which they were posted or intended to be posted, as scaled to at least one time index 1086I of a playing media stream 1022. By way of example only, social message communication (SMC) handling may enable insertion of at least one new SMC 1084 as scaled to a time index 1086I of a media stream 1022 via at least one linkage 1088, which may scale an SMC 184 time stamp 1086S to at least one time index 1086I, while playing a media stream 1022 after it is first debuted (e.g., after its initial broadcast, publishing to the web, "dropping" onto a media source's catalog, or a combination thereof, etc.). By way of example but not limitation, one or more linkages 1088 may be used to tie an SMC 1084 to a media item 1018 so that an SMC 1084 may be inserted into a playing media stream 1022 at a corresponding time index 1086I based, at least partly, on a time stamp 1086S of an SMC 1084. A time stamp 1086S, for example, (i) may be relative and may match a corresponding time index 1086I based on when an end user "posts" an associated SMC 1084 while watching a delayed playing of a media stream 1022; may match an 'absolute', real-world clock time that may be used to determine a corresponding time index 1086I based at least partly on when a media stream 1022 was started; may have multiple time values; may otherwise be linkable to a time index 1086I; some combination thereof; or so forth. As indicated at a blurb 2072, a new social message communication (SMC) may be posted and scaled to a media streaming time index 1086I during a delayed observation by one end user to establish a time stamp 1086S therefor. A new SMC may be tagged to a relevant media item 1018, because or even though the 'absolute' times of the SMC posting and the media item debut may not match. For still further delayed observations—such as by other end users, a newly-inserted SMC may be included in a message stream 1082 at a corresponding media stream time index 1086I for experiencing by those subsequent observers. Subsequent observers may be given an option to include or exclude non-live, or "non-original", SMCs in a message stream 1082 that is being presented to them while observing a media stream 1022 with a delayed playing thereof.

With particular reference to FIG. 1S or 1T, for certain example embodiments, media guidance may be pertinent to a multiple screen environment. By way of example only, an end user 1002 may be proximate to or capable of manipulating or observing at least a first device and a second device having a first screen and a second screen, respectively. As illustrated, a relatively larger display device 1004LD (e.g., a television or a tablet computer) and a relatively smaller display device 1004SD (e.g., a tablet computer or a smart phone, respectively) may be communicatively coupled via a wired interface or a wireless interface directly or indirectly (e.g., via one or more network 1102 nodes, such as a Wi-Fi access point (AP) or a router or server on the internet).

With particular reference to FIG. 1S or 1T, for certain example implementations, blurbs 2074-2084 are shown with respect to a multiple-screen environment, which may entail, by way of example only, two screens controlled by one device or two screens controlled by two devices. By way of example but not limitation, a multiple screen synthesis module 1072S (e.g., of FIG. 1P) may execute to realize one or more operations pertaining to any one or more of blurbs 2074-2084. As indicated at a blurb 2074, one display device may be aware of (e.g., in terms of context, inputs, operations, or a combination thereof, etc.) another display device and respond accordingly (e.g., selecting an image or other representation of a scene that is displayed on one device may cause the scene to play on the other device; if a message arrives on a smaller screened-device, then a media item being played on a larger-screened device may pause automatically; or a combination thereof, etc.). Additionally or alternatively, one of two devices or a third device may coordinate what is to be displayed on two devices (e.g., to establish synchronization, correlation of images, a causal linkage of UIs, etc., such that user interaction with one device of two devices affects a display of another device of the two devices, etc.).

For certain example implementations, as indicated at a blurb 2076, user selection (e.g., via an arrow, a circle, a clicking, a highlighting, a screen touch, a voice command, or a combination thereof, etc.) of a displayed media item element (e.g., an actor, a set, a prop item, an overall scene, or a combination thereof, etc.) on larger display device may result in presentation of associated meta-data (e.g., an actor filmography, a set description, a prop explanation, a director scene commentary, or a combination thereof, etc.) by a smaller display device. As indicated at a blurb 2078, a social network connection (SNC) identification via (e.g., a selection by an end user of, receipt of a message from, or a combination thereof, etc.) a smaller display device may affect media guidance presented on larger display device (e.g., pressing a name or picture of Samuel Adams on a Samsung Galaxy Tablet may cause a media guidance suggestion to watch episode 13 of "The American Revolution" to catch up to where Mr. Adams is so that an end user and Samuel Adams can watch episode 14 together synchronously soon).

For certain example implementations, as indicated at a blurb 2080, a notification (e.g., receipt or selection of a notification) or user interaction with an application with respect to smaller display device may result in at least one playing media item being paused on a larger display device. As indicated at a blurb 2082, a smaller display device may present at least one notification if a denoted media item is starting (e.g., immediately, soon, etc.). Alternatively, a notification may be displayed or otherwise presented via a larger display device to warn an end user that a media item desired by the end user or a social network connection thereof is starting soon. Additionally or alternatively, a notification may be routed to a smaller display device to warn an end user that a media item desired by a social network connection thereof is starting soon to suggest or provide a media guidance option to try to synchronously observe the media item.

For certain example implementations, as indicated at a blurb 2084, a time stamp associated with a social message communication (SMC) (e.g., of FIG. 1W) that is entered via a relatively smaller display device may be scaled to a time index associated with a media stream (e.g., of FIG. 1W) that is playing on a relatively larger display device to facilitate synchronization of a message stream to a subsequent playing of media item of the media stream. By way of example only, at least one time index of at least one image of a media stream that is playing on a larger display device at a given moment may be obtained by a media guidance application for linking to a time stamp of a social message communication that is "posted" via a smaller display device at the given moment. Although not separately indicated in FIG. 1T, a smaller display device may also or alternatively track what an end user is or is not observing on a larger display device using one or more sensors—such as a camera or microphone to detect what media item is being presented on a larger display device, a camera or microphone or accelerometer to track movements or detect head or eyelid position to determine when/if an end use is paying attention to a presented media item, some combination thereof, or so forth.

With reference to FIG. 1L, an example device 1500 is shown. As illustrated, a device 1500 may include at least one or more of any of the following: at least one processor 1502, at least one medium 1504, at least one communication interface 1506, at least some circuitry 1508, some combination of thereof, or so forth. As further illustrated, a medium 1504 may include at least some instructions 1510. By way of example but not limitation, a device 1500 may comprise at least or include but is not limited to at least one end user device 1004 (e.g., of FIG. 1J or 1K), at least one server device 1104 (e.g., of FIG. 1K), or so forth. However, a device 1500 may alternatively include more, fewer, or different component(s) from those that are illustrated without departing from claimed subject matter.

For certain example embodiments, a device 1500 may include or comprise at least one electronic device. A device 1500 may include, for example, a computing platform or any electronic device having at least one processor or memory. A processor 1502 may include, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, one or more processing cores, discrete/fixed logic circuitry, controllers, micro-controllers, microprocessors, some combination thereof, or so forth. A medium 1504 may bear, store, contain, include, provide access to, or a combination thereof, etc. one or more instructions 1510, which may be executable by a processor 1502. Instructions 1510 may include or comprise or facilitate implementation of, by way of example but not limitation, a program, a module, an application or app (e.g., that is native, that runs in a browser, that runs within a virtual machine, or a combination thereof, etc.), an operating system, or a combination thereof, etc. or portion thereof; operational data structures; source code, object code, just-in-time (JIT) compiled code, or a combination thereof, etc.; software (e.g., at least one high-level computer program serving as a hardware specification); processor-executable instructions; other code; some combination thereof; or so forth. A medium 1504 may include, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, or a combination thereof, etc.) that is capable of bearing instructions or data.

For certain example embodiments, execution of instructions 1510 by one or more processors 1502 may transform at least a portion of at least one device 1500 into a special-purpose computing device, apparatus, platform, machine, some combination thereof, or so forth. Instructions 1510 may include, for example, instructions that are capable of realizing at least a portion of one or more flow diagrams, methods, processes, procedures, operations, functionality, technology, mechanisms, or a combination thereof, etc. that are described herein or illustrated in the accompanying drawings. Instructions may, such as if executed or under operational conditions, create or realize a given machine. During execution or operation, instructions may tear down a given machine, build up or create a different machine, modify an individual machine, or a combination thereof, etc. via changing machine states so as to implement a particular machine or emergent process. A process-assembled machine, for example, (i) may perform a process or (ii) may produce or instantiate or exhibit different machine states, such as different voltages, currents, voltage or current patterns, switch positions, electric potential levels, charge levels, steady-state values, transient outputs, or a combination thereof, etc.

For certain example embodiments, circuitry 1508 may include hardware, software (e.g., at least one high-level computer program serving as a hardware specification), firmware, discrete/fixed logic circuitry, other electrical circuitry, or a combination thereof, etc. that is capable of performing or facilitating performance of flow diagrams, methods, processes, procedures, operations, functionality, technology, mechanisms, or a combination thereof, etc. that are described herein or illustrated in the accompanying drawings, wherein circuitry 1508 includes at least one physical or hardware component or aspect. By way of example only, circuitry 1508 may be formed if one or more instructions 1510 configure or reconfigure at least one processor 1502 into one or more processing modules or machines to enable at least one processor 1502 to perform one or more operations during execution of one or more instructions 1510. Circuitry (which may include, but is not limited to, a processor, a medium, or a communication interface) may include one or more sub-parts such as an amplifier, a filter, an accumulator, a latch, a logic gate, a switch, a transistor, a resistor, a capacitor, an inductor, or a combination thereof, etc.

For certain example embodiments, one or more communication interfaces 1506 may provide one or more interfaces between device 1500 and another device or a person/operator/entity directly or indirectly. With respect to a person/operator, a communication interface 1506 may include, by way of example but not limitation, a screen, a speaker, a keyboard or keys, a microphone, a camera, or other person-device input/output apparatuses. A wireless communication interface or a wired communication interface may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, or a combination thereof, etc.), a physical or logical network adapter or port, a frequency converter, a baseband processor, a photoreceptor, an infrared port, an internet or telecommunications backbone connector, a fiber optic connector, a storage area network (SAN) connector, a local area network (LAN) connector, or a combination thereof, etc. to communicate wireless signals or wired signals via one or more wireless communication links or wired communication links, respectively, such as over at least one communication channel. Communicating or communications with at least one communication interface 1506 may enable transmitting, receiving, or initiating of transmissions, just to name a few examples.

For certain example embodiments, at least one power source (not explicitly shown) may provide power to one or more components of a device 1500. A power source may include, by way of example but not limitation, at least one battery, at least one power connector for a wall socket, at least one solar power source, at least one solar-powered charger, a mechanical power source or charger, a fuel source or cell, a power connector for accessing an electrical grid, some combination thereof, or so forth. For certain example embodiments, at least one sensor (not explicitly shown) may sense, produce, or otherwise provide at least one sensor value. A sensor may include, by way of example only, a camera, a microphone, an accelerometer, a thermometer, a satellite positioning system (SPS) sensor, a barometer, a humidity sensor, a compass, an altimeter, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor may include, by way of example but not limitation, an image/video, a sound recording, an acceleration value, a temperature, one or more SPS coordinates, a barometric pressure, a humidity level, a compass direction, an altitude, a gyroscopic value, a magnetic reading, a pressure value, an oscillation value, an ambient light reading, inertial readings, touch detections, finger placements, flex detections, some combination thereof, or so forth. However, claimed subject matter is not limited to any particular described embodiments, implementations, examples, or so forth of a device 1500.

With respect to certain example embodiments, an example applicable scenario is described with reference to multiple example annotations 2502 to 2540, which annotations are depicted by curly brackets or braces (e.g., "{ }") in FIGS. 1B-1X. However, other scenarios may alternatively or additionally be applicable. For an example annotation 2502 (e.g., of FIG. 1H), an end user 1002 may sign up to have his/her life experiences, including but not limited to media observing experiences, tracked—such as across different devices, different media sources, over time, with context, having shared observing experiences, some combination thereof, or so forth.

For an example annotation 2504 (e.g., of FIG. 1G), an end user may provide (e.g., separately, manually, using email contacts, with reference to a social network's membership, or a combination thereof, etc.) connections for a media circle 1012MC portion of a media tracker 1012. For an example annotation 2506 (e.g., of FIG. 1G), an end user may provide (e.g., separately, manually, by inputting series names, with reference to at least one genre, by selecting one or more search results, by selecting at least one media grid block, or a combination thereof, etc.) entries for a media plans 1012MP portion of a media tracker 1012.

For an example annotation 2508 (e.g., of FIG. 1G), one or more media sources 1020 that are preferred or subscribed to may be noted or linked to with a media source 1012MS portion of a media tracker 1012. One or more usernames/account names/email addresses or corresponding passwords may be provided to enable watching history, current catalog, etc. to be retrieved. For an example annotation 2510 (e.g., of FIG. 1G), media history (e.g., relatively basic history such as media item identification) may be used to seed (e.g., manually by typing titles or clicking on show names) a media history 1012MH portion of a media tracker 1012 with those media items that have already been observed based on human memory, reviewing a subscription service's recent viewing page, some combination thereof, or so forth. For an example annotation 2512 (e.g., of FIG. 1N), media items observed may be memorialized over time as part of a media history 1012MH portion of a media tracker 1012. By way of example only, a device (e.g., an end user device that is playing a media item, a server device that is streaming a media item, a server device that authorizes access to a media item, an end user device that is not playing a media item but has knowledge via sensors or other data of what media item is being observed by a particular end user, or a combination thereof, etc.).

For an example annotation 2514*a* (e.g., of FIG. 1J), an end user device 1004 may provide (e.g., via at least one message 1114) media item observation data 1130 (e.g., what media item is watched, what portion is watched, contextual data from other applications—such as a calendaring/email or social network application, what device is used to watch it, when it is watched, a format at which it is watched, or a combination thereof, etc.) to a media guidance application (MGA) 1014 (e.g., that resides on a same or a different end user device, that is executing on a server device in a cloud, or a combination thereof, etc.). For an example annotation 2514*b* (e.g., of FIG. 1K), a server device 1104 (e.g., of a media source) may provide media item observation data 1130 (e.g., what media item is watched, what portion is watched, contextual data from other applications/services—such as a calendaring/email or social networking application/service, what device is used to watch it, when it is watched, a format in which it is watched, or a combination thereof, etc.) to a media guidance application (MGA) 1014 (e.g., that executes on at least one end user device, that is running on a same or a different server device in a cloud, or a combination thereof, etc.).

For an example annotation 2516 (e.g., of FIG. 1P), a media guidance application 1014 may obtain media item observation data 1130 from one or more of any of: an end user device, a media server device, a browser of an end user device, a media source, an operating system (OS) of an end user device, at least one sensor of an end user device, an app executing on an end user device, a cloud-based or web app, some combination thereof, or so forth. For an example annotation 2518 (e.g., of FIG. 1P), a media guidance application 1014 may keep a media tracker 1012 current or consistent across one or more incarnations thereof, which one or more incarnations may be distributed across multiple end user devices 1004 or server devices 1104.

For an example annotation 2520 (e.g., of FIG. 1H), a user interface (UI) may enable an end user to indicate interest in, e.g., a particular media item 1018 such as a show. At least partially in response to an indication of interest by an end user, an end user may be presented media guidance 1204 (e.g., a media grid 1204G, a media item suggestion 1204S, a media option 1204O, or a combination thereof, etc.) that is based at least partially on at least one media tracker 1012. For an example annotation 2522 (e.g., of FIG. 1I), presentation of media guidance 1204 (e.g., a media grid 1204G, a media item suggestion 1204S, a media option 1204O, or a combination thereof, etc.) may be based at least partially on available media sources 1020 or feasible end user devices 1004. By way of example only, 4K media items may be omitted from a media grid 1204G if an end user has but a smart phone accessible for viewing a media item. As another example, if an end user selects an HD cartoon for observing via a smart watch, a media suggestion 1204S may include at least a different cartoon with a lower resolution that is on the end user's media plans 1012MP.

For an example annotation 2524 (e.g., of FIG. 1E), during playing of a media item 1018, one or more media item annotations 1116 associated with respective tags may be played to an end user at corresponding respective markers 1132 (e.g., a tag, a time index, a watermark, or a combination thereof, etc.) of a media item 1018 being played (e.g., streamed, decoded, or a combination thereof, etc.).

For an example annotation 2526 (e.g., of FIG. 1V), a user interface (UI) may enable an end user 1002 to enjoy a media item 1018 in terms of social networking/media or social message communication (SMC) 1084 sharing after a debut of the media item (e.g., after a first broadcast or other initial availability thereof—including but not limited to media items that are "dropped" or first publicly made available without a specific traditional broadcast time). For an example annotation 2528a (e.g., of FIG. 1V), existing social message communications (SMCs) 1084 may be presented to an end user 1002 while the end user plays a media item 1018 at a time scale 1086 corresponding to when an issuer of a given social message communication (SMC) 1084 previously posted the SMC to establish a time stamp 1086S with a temporal reference to, or time index 1086I of, an elapsed playing time of the media item. For an example annotation 2528b (e.g., of FIG. 1V), new social message communications (SMCs) 1084 may be injected via one or more linkages 1088 into a message stream 1082 (e.g., a set of social message communications (SMCs)) that are associated with a media stream 1022 of a particular media item 1018 at time indexes 1086I corresponding to when the new social message communication (SMC) is posted so as to establish a time stamp 1086S thereof with a temporal reference to an elapsed playing time of, or a time index 1086I of, the media item. Subsequent observances of a media item 1018 in which new SMCs 1084 have been injected into a message stream 1082 via one or more linkages 1088 may include a presentation of the subsequently-injected SMCs 1084.

For an example annotation 2530 (e.g., of FIG. 1T), an end user 1002 may be exposed to or may manipulate a user interface (UI) having one or more elements that span across screens of two different devices or interact there between such that manipulation on a screen of one device affects a presentation or a playing (or other operation) on another device.

For an example annotation 2532 (e.g., of FIG. 1N), a media guidance application 1014 may present to an end user 1002 context (e.g., details from a prior observance, such as when, where, an associated event—such as trip, with whom—such as within a same room or geographically-distributed shared observing, or a combination thereof, etc.) that is extracted from at least one media tracker 1012 (e.g., as part of historical context 1210 from a corresponding media item entry 1206) and that relates to a media item 1018 for which an end user 1002 has indicated interest (e.g., via a media grid 1204G, one or more search results, at least one media suggestion 1204S, at least one media option 1204O, or a combination thereof, etc.) to help an end user remember observing the media item.

For an example annotation 2534 (e.g., of FIG. 1H), an end user 1002 may be able to utilize a user interface (UI) of a media guidance application 1014 to conduct one or more searches for unobserved media items 1018. For instance, an end user may ask for a listing of any television episodes that have not been watched for which J. J. Abrahams is associated (e.g., missed episodes from Lost, Alias, Fringe, etc.) or a popularity-ordered ranking of Seinfeld episodes that neither the end user nor his/her spouse have watched. For an example annotation 2536 (e.g., of FIG. 1I), a media item 1018 may be played, including but not limited to with a separate app that is launched, by selecting a media item that is represented in a media grid 1204G that displays media items that are available from multiple different media sources 1020.

For an example annotation 2538 (e.g., of FIG. 1U), a media guidance application 1014 (e.g., a media adaptation module 1072A thereof) may adapt media guidance 1204A such that observing one or more identified media items may fit within an available observing period (e.g., an end user indicates that he/she has 75 minutes to watch TV or calendar and mapping data indicate that an end user has to leave in 52 minutes to make a doctor's appointment 15 minutes away that is at 3:30) or may adapt (e.g., by compressing a time by running a show at 1.2× speed, by omitting 50% of the commercials—maybe with an agreement that a viewing of a next episode or a next show from same media source will involve 50% more commercials, or a combination thereof, etc.) at least one media item to fit within an available observing period.

For an example annotation 2540 (e.g., of FIG. 1I), a media guidance application 1014 may adjust presented media guidance 1204 responsive at least partly to an end user device that is to perform the presenting. By way of example only, a smart watch may be given an abbreviated listing that is manipulated haptically, intelligent glasses may be given a 3D carousel that is flipped through via voice—e.g., to change episodes in a series or flip from week to week on a grid, a tandem device environment may be given a grid for a smaller display device that projects previews of a media item on a larger display device if a media item is highlighted on a larger display device, a device with social network connection contacting-abilities may be given media guidance organized by social network groups or media plans, some combination thereof, or so forth.

FIG. 2 is a schematic diagram 200 that includes at least one example machine that is capable of handling scenarios or situations for life experience memorialization with observational linkage via user recognition in accordance with certain example embodiments. As shown in FIG. 2, by way of example but not limitation, schematic diagram 200 depicts at least one end user 1002 and at least one machine 210 that may include or comprise or form at least a portion of at least one end user device 1004 (e.g., of FIG. 1J, 1K, 1O, 1S, or 1T) of at least one end user 1002 (e.g., also of FIG. 1H or 1T). For certain example embodiments, at least one machine 210 may include, may be coupled to, may have access to, or may be associated with, by way of example but not limitation, at least one first component 201, at least one second component 202, at least one third component 203, at least one first set of voltages 211 (or first voltage set 211), at least one second set of voltages 212 (or second voltage set 212), at least one third set of voltages 213 (or third voltage set 213), at least one light-perturbing unit 221, at least one sensor 222, at least one voltage level 223, at least one display 220, or at least one media item 1018.

For certain example embodiments, a machine 200 may be at least partially directed to or may include: at least one first component including at least a first set of voltages coupled to at least one light-perturbing unit of at least one display, the first set of voltages corresponding to at least one media item; at least one second component including at least a second set of voltages coupled to at least one sensor, the second set of voltages representative of at least one user; or at least one third component including at least a third set of voltages having one or more voltage levels that are responsive at least to: (i) the first set of voltages of the at least one first component and (ii) the second set of voltages of the at least one second component. In addition to or in alternative to description herein with specific reference to FIG. 2, illustrated aspects of schematic diagram 200 may be relevant to example description herein below with particular reference to any one or more of FIGS. 3A-3G2. However, claimed subject matter is not limited to any particular described embodiments, implementations, examples, or so forth.

For certain example implementations, at least one first component 201 (e.g., an integrated circuit chip portion, a frame buffer, a bus, or a combination thereof, etc.) may include (e.g., have, produce, use, input, output, or a combination thereof, etc.) at least a first set (e.g., two, four, five, eight, 16, constant number, varying number, independent, internally dependent or linked, group, or a combination thereof, etc.) of voltages 211 (e.g., electric potential difference, electromotive force (EMF), measure of work involved to transport charge within an electric field, static voltage, time-varying voltage, analog voltage, digital voltage, or a combination thereof, etc.) coupled to (e.g., in electrical communication with, directly or indirectly connected to, capable of sending or receiving signals with respect to, connected wirelessly or via at least one wire or trace, or a combination thereof, etc.) at least one light-perturbing (e.g., generating, emanating, exposing, affecting, filtering, or a combination thereof, etc. electromagnetic radiation that is at least partially in a visible spectrum) unit 221 (e.g., diode, liquid crystal, electron gun or electron emitter, laser, ionized gas cell, quantum dot, spherical janus particle, pixel, or a combination thereof, etc.) of at least one display 220 (e.g., screen, projector, virtual reality (VR) image, integrated display, separate display, or a combination thereof, etc.), with first set of voltages 211 corresponding to (e.g., produced from, derived using, visually representing, associated with content of, or a combination thereof, etc.) at least one media item 1018 (e.g., video, television show, movie, music, song, commercial production, individual production, visual or audible representation thereof, data that may be decoded to produce same, one or more results of decoding operation to produce same, or a combination thereof, etc.).

For certain example implementations, at least one second component 202 (e.g., an integrated circuit chip portion, a latch, a sensor interface, or a combination thereof, etc.) may include (e.g., have, produce, use, input, output, or a combination thereof, etc.) at least a second set (e.g., two, four, five, eight, 16, constant number, varying number, independent, internally dependent or linked, group, or a combination thereof, etc.) of voltages 212 (e.g., electric potential difference, electromotive force (EMF), measure of work involved to transport charge within an electric field, static voltage, time-varying voltage, analog voltage, digital voltage, or a combination thereof, etc.) coupled to (e.g., in electrical communication with, directly or indirectly connected to, capable of sending or receiving signals with respect to, connected wirelessly or via at least one wire or trace, or a combination thereof, etc.) at least one sensor 222 (e.g., visual sensor, touch sensor, biometric sensor, camera, fingerprint reader, iris scanner, or a combination thereof, etc.), with second set of voltages 212 representative of (e.g., derived from, indicative of a physical attribute of, associated with a known or determinable linkage to, at least partially produced by, or a combination thereof, etc.) at least one (e.g., end) user 1002 (e.g., person, individual, group, device manipulator, device viewer, observance participant, or a combination thereof, etc.).

For certain example implementations, at least one third component 203 (e.g., an integrated circuit chip portion, a memory controller, a transistor, or a combination thereof, etc.) may include (e.g., have, produce, use, input, output, or a combination thereof, etc.) at least a third set of voltages 213 (e.g., electric potential difference, electromotive force (EMF), measure of work involved to transport charge within an electric field, static voltage, time-varying voltage, analog voltage, digital voltage, or a combination thereof, etc.) having (e.g., actualizing, including, reflecting, providing, embodying, representing, hypostatizing, or a combination thereof, etc.) one or more voltage levels 223 (e.g., amount of volts, high level, low level, analog level, digital level, constant, fluctuating, signal carrying, waveform, amplitude, average level, peak level, strength of potential difference, transient, settled, or a combination thereof, etc.) that are responsive at least to (e.g., are based at least partially on, are established as a result of, are at least partly determined using, are set to reflect a status of, are determined using a sequence of one or more operations that are affected by, are changed as a consequence of an analysis involving, or a combination thereof, etc.): (i) first set of voltages 211 of at least one first component 201 and (ii) second set of voltages 212 of at least one second component 202.

Following are descriptions of a number of schematic diagrams depicting example implementations. For ease of understanding, the schematic diagrams are organized such that initial schematic diagram(s) present implementations via an example implementation and thereafter subsequent schematic diagrams present alternate implementations and/ or expansions of the initial schematic diagram(s) as either sub-components or additional components building on one or more earlier-presented schematic diagrams. Those having skill in the art will appreciate that the style of presentation utilized herein (e.g., beginning with a presentation of a schematic diagram(s) including an example implementation and thereafter providing additions to and/or further details in subsequent schematic diagrams) generally allows for a rapid and easy understanding of various machine or process implementations. In addition, those skilled in the art will further appreciate that the style of presentation used herein also lends itself well to technological modularization (or object-oriented program design paradigms). By way of example but not limitation, at least one module may include or comprise or be realized with at least one processor that executes instructions (e.g., sequentially, in parallel, at least partially overlapping in a time-multiplexed fashion on at least one core, at least partially distributed across multiple cores, or a combination thereof, etc.) as at least part of: at least one special-purpose computing component, at least one code-configured electronic system, at least one process-assembled apparatus, a machine, some combination thereof, or otherwise as described herein. However, claimed subject matter is not limited to any particular described embodiments, implementations, examples, or so forth.

FIGS. 3A-3G2 are schematic diagrams 300A-300G2 that include at least a portion of at least one example machine and that depict example additional or alternative scenarios or machine states for life experience memorialization with observational linkage via user recognition in accordance with certain example embodiments. For certain example embodiments, as shown in FIGS. 3A-3G2, by way of example but not limitation, one or more of schematic diagrams 300A-300G2 may include, may be coupled to, may have access to, or may be associated with one or more of: at least one first component 201, at least one second component 202, at least one third component 203, at least one first set of voltages 211 (or first voltage set 211), at least one second set of voltages 212 (or second voltage set 212), at least one third set of voltages 213 (or third voltage set 213), at least one light-perturbing unit 221, at least one sensor 222, at least one voltage level 223, at least one display 220, or at least one media item 1018. Each of schematic diagrams 300A-300G2 may include alternative or additional depictions, which may relate to life experience memorialization with observational linkage via user recognition, as described herein. However, claimed subject matter is not limited to any particular described embodiments, implementations, examples, or so forth.

Although components are shown or described in a particular arrangement or with a particular relationship to one or more other components, it should be understood that machines may be realized in alternative manners without departing from claimed subject matter, including, but not limited to, with a different arrangement or number of components or with a different relationship between or among components (e.g., components that are illustrated as nested blocks are not necessarily subsidiary or internal components and may instead be implemented independently or in conjunction with one or more other components). Also, at least some component(s) of schematic diagrams of FIGS. 3A-3G2 may be implemented so as to be fully or partially incorporated with (e.g., integrated with, included as part of, instantiated in conjunction with, or a combination thereof, etc.) one or more other components. Furthermore, one or more additional components that are depicted as overlapping with at least one other component may alternatively be implemented independently or separately. For certain example embodiments, one or more components of schematic diagrams 300A-300G2 (e.g., of FIGS. 3A-3G2) may be realized by at least one device (e.g., of FIG. 1) or at least a portion thereof. However, claimed subject matter is not limited to any particular described embodiments, implementations, examples, or so forth.

FIG. 3A is a schematic diagram 300A that illustrates at least one example machine and that depicts example scenarios or situations for life experience memorialization with observational linkage via user recognition in accordance with certain example embodiments. For certain example embodiments, a machine may further include at least one first component including at least a first set of voltages and a fourth set of voltages coupled to at least one light-perturbing unit of at least one display, the first set of voltages corresponding to a first time index of at least one media item and the fourth set of voltages corresponding to a second time index of the at least one media item. For certain example implementations, at least one first component 201 (e.g., a graphics processor) may further include at least a first set of voltages 211 (e.g., voltages driving 24-bit color) and a fourth set of voltages 3002 (e.g., +3 Volts or +0.2 Volts) coupled to at least one light-perturbing unit 221 (e.g., pixel) of at least one display 220 (e.g., LCD flat-panel screen), with first set of voltages 211 corresponding to a first time index 3004(1) (e.g., a time of 10:28) of at least one media item 1018 (e.g., episode 308 of TV show "Winged") and with fourth set of voltages 3002 corresponding to a second time index 3004(2) (e.g., one hour, seven minutes, and 42 seconds) of at least one media item 1018. For certain example embodiments, a machine may further include at least one first component including at least a first set of voltages and a fourth set of voltages coupled to at least one light-perturbing unit of at least one display, the first set of voltages corresponding to a first point of a movie and the fourth set of voltages corresponding to a second point of a movie. For certain example implementations, at least one first component 201 (e.g., a cache for a graphics processor) may include at least a first set of voltages 211 (e.g., a group of voltages output from a version of graphics double data rate (GDDR) memory at a first time) and a fourth set of voltages 3002 (e.g., 32 voltages output from a version of GDDR memory at a subsequent time) coupled to at least one light-perturbing unit 221 (e.g., an RGB liquid crystal pixel) of at least one display 220 (e.g., an integrated LCD screen of a tablet), with first set of voltages 211 corresponding to a first point 3006(1) (e.g., a first time, such as after a first scheduled commercial break) of a movie 3008 (e.g., a made-for television movie) and with fourth set of voltages 3002 corresponding to a second point 3006(2) (e.g., a second, different time, such as mid-way through a TV movie that is scheduled for two hours) of a movie 3008.

For certain example embodiments, a machine may further include at least one first component including at least a first set of voltages coupled to at least one pixel of at least one display. For certain example implementations, at least one first component 201 (e.g., internal video bus) may include at least a first set of voltages 211 (e.g., sixteen voltages per pixel) coupled to at least one pixel 3010 (e.g., picture element assembly including red, green, and blue light sources) of at least one display 220 (e.g., an active-matrix organic light-emitting diode (AMOLED) display). For certain example embodiments, a machine may further include at least one first component including at least a first set of voltages coupled to at least one light-emitting diode of at least one display. For certain example implementations, at least one first component 201 (e.g., a transistor) may include at least a first set of voltages 211 (e.g., two voltages for a pair of transistors for a pixel of a thin-film-transistor array) coupled to at least one light-emitting diode 3012 (e.g., an electroluminescent pn-junction diode) of at least one display 220 (e.g., a screen on a Samsung Galaxy Gear wearable, such as a watch).

For certain example embodiments, a machine may further include at least some memory including at least a first set of voltages coupled to at least one light-perturbing unit of at least one display. For certain example implementations, at least some memory 3014 (e.g., main memory that is partitioned or unified for sharing with graphical operations) may include at least a first set of voltages 211 (e.g., stored electrical potential energy representing pixel appearance) coupled to at least one light-perturbing unit 221 (e.g., LCD pixel) of at least one display 220 (e.g., projector or projected image). For certain example embodiments, a machine may further include at least some graphics memory including at least a first set of voltages representative of at least one frame of at least one media item. For certain example implementations, at least some graphics memory 3016 (e.g., synchronous graphics RAM, such as graphics double data rate (GDDRx) memory, on an integrated circuit (IC) chip) may include at least a first set of voltages 211 (e.g., potential differences readable from video memory) representative of (e.g., usable to produce a human-discernable version of) at least one frame 3018 (e.g., one of 24 displayable screen/window images per second of a moving picture) of at least one media item 1018 (e.g., a movie such as Jaws 3D).

For certain example embodiments, a machine may further include at least one video decoder including at least a first set of voltages coupled to at least one light-perturbing unit of at least one display. For certain example implementations, at least one video decoder 3020 (e.g., a machine that transforms at least a portion of a file or a stream of bits into data that is displayable for human viewing) may include at least a first set of voltages 211 (e.g., 16 voltages) coupled to at least one light-perturbing unit 221 (e.g., a Janus particle) of at least one display 220 (e.g., an electronic ink display, such as for an Amazon Kindle). For certain example embodiments, a machine may further include at least one processor configured to produce from at least one media item a first set of voltages coupled to at least one light-perturbing unit of at least one display. For certain example implementations, at least one processor 3022 (e.g., a central processing unit (CPU), a graphics processing unit (GPU), an ARM-based processing unit, or a combination thereof, etc.) may be configured (e.g., assembled into a machine via code so as to enable it) to produce (e.g., generate, calculate, compute, or a combination thereof, etc.) from at least one media item 1018 (e.g., a YouTube video) a first set of voltages 211 (e.g., potential difference on output pins of a processor that is) coupled to at least one light-perturbing unit 221 (e.g., a quantum dot) of at least one display 220 (e.g., an LCD screen for an Amazon Kindle Fire).

Figure 3B:
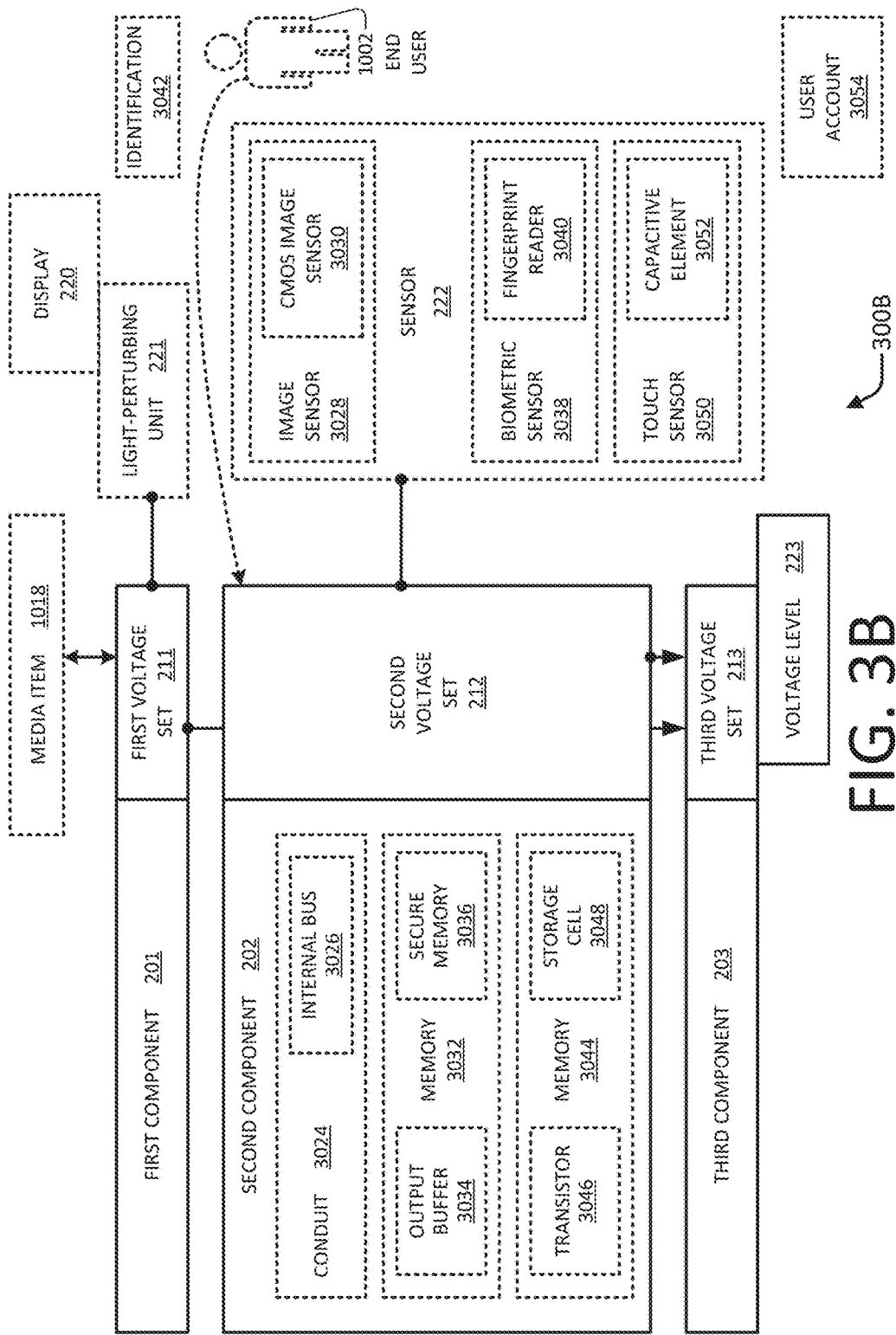

FIG. 3B is a schematic diagram 300B that illustrates at least one example machine and that depicts example scenarios or situations for life experience memorialization with observational linkage via user recognition in accordance with certain example embodiments. For certain example embodiments, a machine may further include at least one conduit including at least a second set of voltages coupled to at least one image sensor. For certain example implementations, at least one conduit 3024 (e.g., one or more traces of a printed circuit board (PCB) or integrated circuit (IC), at least one bus, one or more wires, at least one (e.g., through-chip) via, at least one interface to communicate using at least one propagating electromagnetic wave, one or more electrical pathways, or a combination thereof, etc.) may include at least a second set of voltages 212 (e.g., potential with respect to a system ground) coupled to at least one image sensor 3028 (e.g., a six megapixel camera with lens in a separate housing). For certain example embodiments, a machine may further include at least one internal bus including at least a second set of voltages coupled to at least one complementary metal-oxide semiconductor (CMOS) image sensor. For certain example implementations, at least one internal bus 3026 (e.g., one or more wires, traces, electrical connections, optical fibers, or a combination thereof, etc. coupling one or more integrated circuits, discrete components, functional units, or a combination thereof, etc. within a device housing) may include at least a second set of voltages 212 (e.g., at least four voltage levels in parallel) coupled to at least one complementary metal-oxide semiconductor (CMOS) (e.g., a metal oxide semiconductor having field effect transistors (FETs)) image sensor 3030 (e.g., back-side illuminated semiconductor device that converts light into at least one electronic signal).

For certain example embodiments, a machine may further include at least one memory including at least a second set of voltages coupled to at least one biometric sensor. For certain example implementations, at least one memory 3032 (e.g., random access memory (RAM) or flash memory) may include at least a second set of voltages 212 (e.g., 16 voltages in parallel) coupled to at least one biometric sensor 3028 (e.g., an iris or retina scanner, a fingerprint reader, a camera for facial recognition, DNA analyzer, a palm print reader, microphone for voice recognition, or a combination thereof, etc.). For certain example embodiments, a machine may further include at least one output buffer including at least a second set of voltages coupled to at least one fingerprint reader. For certain example implementations, at least one output buffer 3034 (e.g., a latch, a cache, a FIFO memory area, or a combination thereof, etc. that may receive an output of at least one sensor) may include at least a second set of voltages 212 (e.g., 1.5 V, 3.0 V, 4.5 V, or a combination thereof, etc.) coupled to at least one fingerprint reader 3040 (e.g., fingerprint scanner, optical fingerprint reader, capacitive fingerprint reader, sensor for Apple iPhone 5s Touch ID, or a combination thereof, etc.). For certain example embodiments, a machine may further include at least one secure memory including at least a second set of voltages representative of at least one identification of at least one user. For certain example implementations, at least one secure memory 3036 (e.g., data storage that is encrypted, that has limited access, that offers authentication or authorization capabilities, or a combination thereof, etc., such as Apple's Secure Enclave portion of A7) may include at least a second set of voltages 212 (e.g., voltage on inputs of transistors) representative of (e.g., derived from, indicative of a physical attribute of, associated with a known or determinable linkage to, at least partially produced by, or a combination thereof, etc.) at least one identification 3042 (e.g., facial image, fingerprint facsimile, voice recording, eye image, account identifier, DNA sample, or a combination thereof, etc.) of at least one (e.g., end) user 1002 (e.g., person, brother, mother, friend, or multiple ones thereof, etc.).

For certain example embodiments, a machine may further include at least one memory including at least a second set of voltages coupled to at least one touch sensor. For certain example implementations, at least one memory 3044 (e.g., synchronous random access memory (SRAM), flash memory, on-chip cache memory, or a combination thereof, etc.) may include at least a second set of voltages 212 (e.g., voltages on output of at least one amplifier) coupled to at least one touch sensor 3050 (e.g., a fingerprint scanner, a resistive touch sensor, a capacitive touch sensor, or a combination thereof, etc.). For certain example embodiments, a machine may further include at least one transistor including at least a second set of voltages coupled to at least one capacitive element. For certain example implementations, at least one transistor 3046 (e.g., a bipolar junction transistor (BJT), a field effect transistor (FET), an integrated transistor, a discrete transistor, a semiconductor-based switch or amplifier, or a combination thereof, etc.) may include at least a second set of voltages 212 (e.g., eight voltages generated or changed responsive to touch input) coupled to at least one capacitive element 3052 (e.g., a sensor that detects human touch responsive to a sensed capacitive differential between human skin and a dielectric of air). For certain example embodiments, a machine may further include at least one storage cell including at least a second set of voltages coupled to at least one touch sensor, the second set of voltages representative of at least one user account. For certain example implementations, at least one storage cell 3048 (e.g., a semiconductor unit that maintains at least one voltage level to reflect at least one data value) may include at least a second set of voltages 212 (e.g., one or more electric potential differentials, including but not limited to processed versions thereof, that are) coupled to at least one touch sensor 3050 (e.g., a touch screen), with second set of voltages 212 representative of (e.g., corresponding to, serving to identify, capable of authenticating, input for, or a combination thereof, etc.) at least one user account 3054 (e.g., an account of an owner of a device, a user name—such as email address or alphanumeric identification—and associated password, a user name and associated biometric data, one or more of multiple device contexts corresponding to at least one person having authorized access to at least a portion of a device, or a combination thereof, etc.).

Figure 3C:
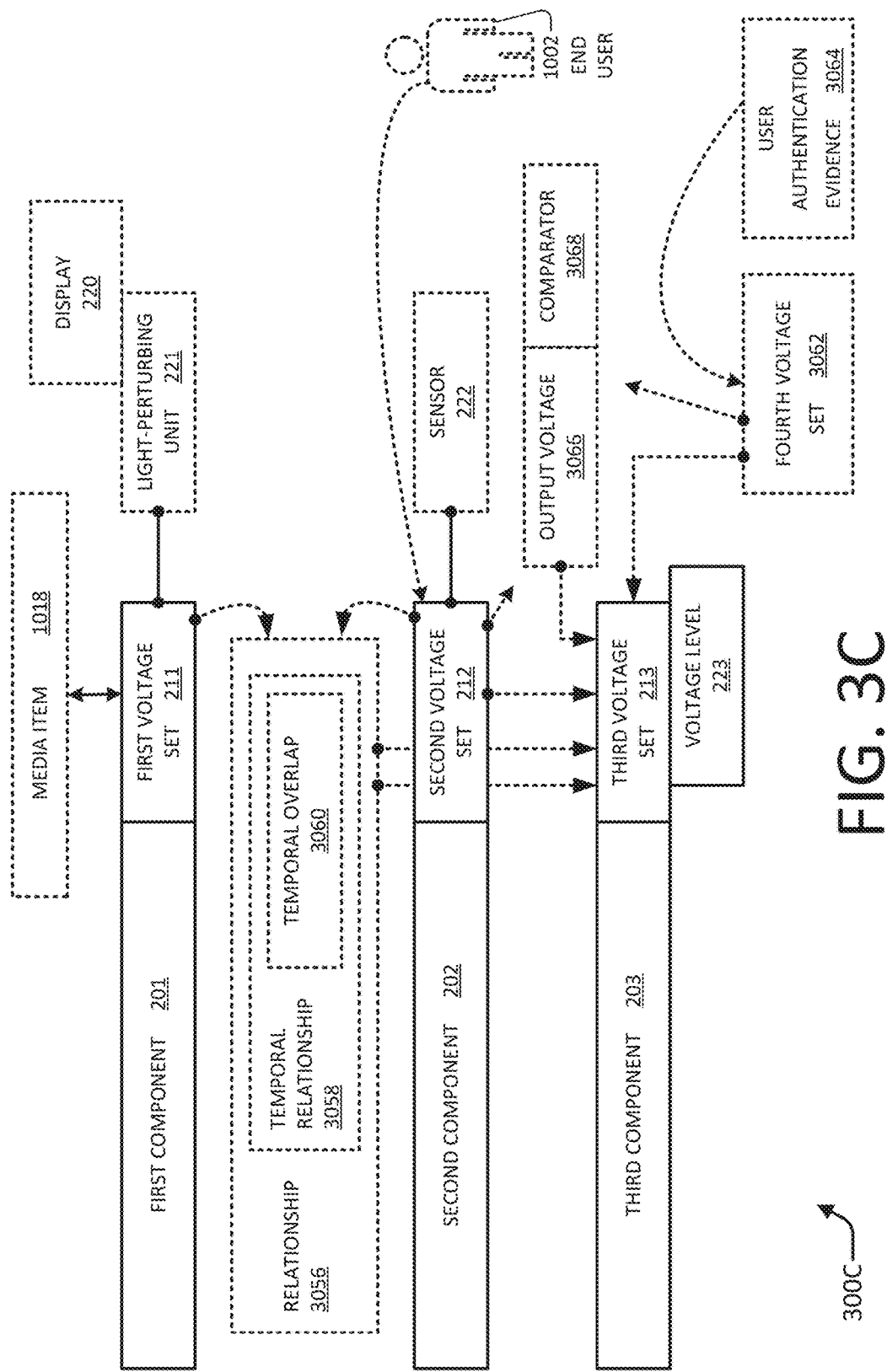

FIG. 3C is a schematic diagram 300C that illustrates at least one example machine and that depicts example scenarios or situations for life experience memorialization with observational linkage via user recognition in accordance with certain example embodiments. For certain example embodiments, a machine may further include at least one third component including at least a third set of voltages having one or more voltage levels that are responsive at least to a relationship between or among at least: (i) the first set of voltages of the at least one first component and (ii) the second set of voltages of the at least one second component. For certain example implementations, at least one third component 203 (e.g., semiconductor memory) may include at least a third set of voltages 213 (e.g., 32 voltages) having one or more voltage levels 223 (e.g., 0.5 or 4.5 volts) that are responsive at least to a relationship 3056 (e.g., a connection, a temporal overlap, a timing overlap, a mutual existence, a dependence, a correlation, a detectable presence of one if the other is actualized, or a combination thereof, etc.) between or among at least: (i) first set of voltages 211 (e.g., voltages to drive at least one pixel) of at least one first component 201 (e.g., graphics processing unit (GPU)) and (ii) second set of voltages 212 (e.g., voltages generated using output) of at least one second component 202 (e.g., sensor interface). For certain example embodiments, a machine may further include at least one third component including at least a third set of voltages having one or more voltage levels that are responsive at least to a temporal relationship. For certain example implementations, at least one third component 203 (e.g., flash memory block) may include at least a third set of voltages 213 (e.g., programming voltage) having one or more voltage levels 223 (e.g., 10 Volts created via at least one charge pump) that are responsive at least to a temporal relationship 3058 (e.g., correlation with respect to timing, coexistence for one or more moments, causal interaction, contemporaneous connection, or a combination thereof, etc.). For certain example embodiments, a machine may further include at least one third component including at least a third set of voltages having one or more voltage levels that are responsive at least to at least a partial temporal overlap. For certain example implementations, at least one third component 203 (e.g., one or more floating gate transistors) may include at least a third set of voltages 213 (e.g., potential difference created by injecting electrons into one or more floating gates across eight transistors) having one or more voltage levels 223 (e.g., 1 V, 2 V, 3 V, or 4 V for eight multi-level cells) that are responsive at least to at least a partial (e.g., a portion, 10%, 90%, complete, when checked, or a combination thereof, etc.) temporal overlap 3060 (e.g., coexistence for at least a single moment in time, for one minute, for 10 minutes, for an entirety of a media item, or a combination thereof, etc.).

For certain example embodiments, a machine may further include at least one third component including at least a third set of voltages having one or more voltage levels that are responsive at least to: (i) the second set of voltages of the at least one second component and (ii) a fourth set of voltages representative of user authentication evidence. For certain example implementations, at least one third component 203 (e.g., working memory) may include at least a third set of voltages 213 (e.g., 16 voltages) having one or more voltage levels 223 (e.g., one or more logic highs or logic lows) that are responsive at least to: (i) second set of voltages 212 (e.g., eight voltages) of at least one second component 202 (e.g., a camera or a fingerprint reader) and (ii) a fourth set of voltages 3062 (e.g., eight voltages) representative of (e.g., created from, an algorithmically-determined version of, encrypted data produced using, a compressed version of, or a combination thereof, etc.) user authentication evidence 3064 (e.g., a facial image, a fingerprint scan, an iris image, visual input, touch input, or a combination thereof, etc.). For certain example embodiments, a machine may further include at least one third component including at least a third set of voltages having one or more voltage levels that are responsive to at least one output voltage of at least one comparator. For certain example implementations, at least one third component 203 (e.g., on-CPU-chip random access memory (RAM)) may include at least a third set of voltages 213 (e.g., 32 voltages) having one or more voltage levels 223 (e.g., number of joules per coulomb) that are responsive to at least one output voltage 3066 (e.g., watts per ampere output from at least one amplifier) of at least one comparator 3068 (e.g., circuitry to determine if at least two values are equivalent, how different two or more values are, how similar two or more values are, a degree of correlation between or among two or more values, a processor configured to ascertain any of the above, or a combination thereof, etc.). For certain example embodiments, a machine may further include at least one third component including at least a third set of voltages having one or more voltage levels that are responsive to at least one output voltage indicative of at least one comparison operation including at least: (i) the second set of voltages of the at least one second component and (ii) a fourth set of voltages representative of user authentication evidence. For certain example implementations, at least one third component 203 (e.g., processing unit) may include at least a third set of voltages 213 (e.g., eight voltages on eight capacitors) having one or more voltage levels 223 (e.g., amount of charge differential on eight capacitors) that are responsive to at least one output voltage 3066 (e.g., 16 voltages on an exit of a processing pipeline) indicative of (e.g., showing result of, revealing answer to, having an encoded version of an output of, or a combination thereof, etc.) at least one comparison operation (e.g., obtaining—such as accepting or retrieving—at least one first value, obtaining at least one second value, determining a level of similarity or an extent of a difference between first and second values/files/user representations, or a combination thereof, etc. using at least one processor) that may include at least: (i) second set of voltages 212 (e.g., 2 voltages) of at least one second component 202 (e.g., a camera or a fingerprint reader) and (ii) a fourth set of voltages 3062 (e.g., 16 voltages driven on an output of a secure memory) representative of user authentication evidence 3064 (e.g., a facial image, a fingerprint scan, an iris image, visual input, touch input, or a combination thereof, etc.).

Figure 3D:
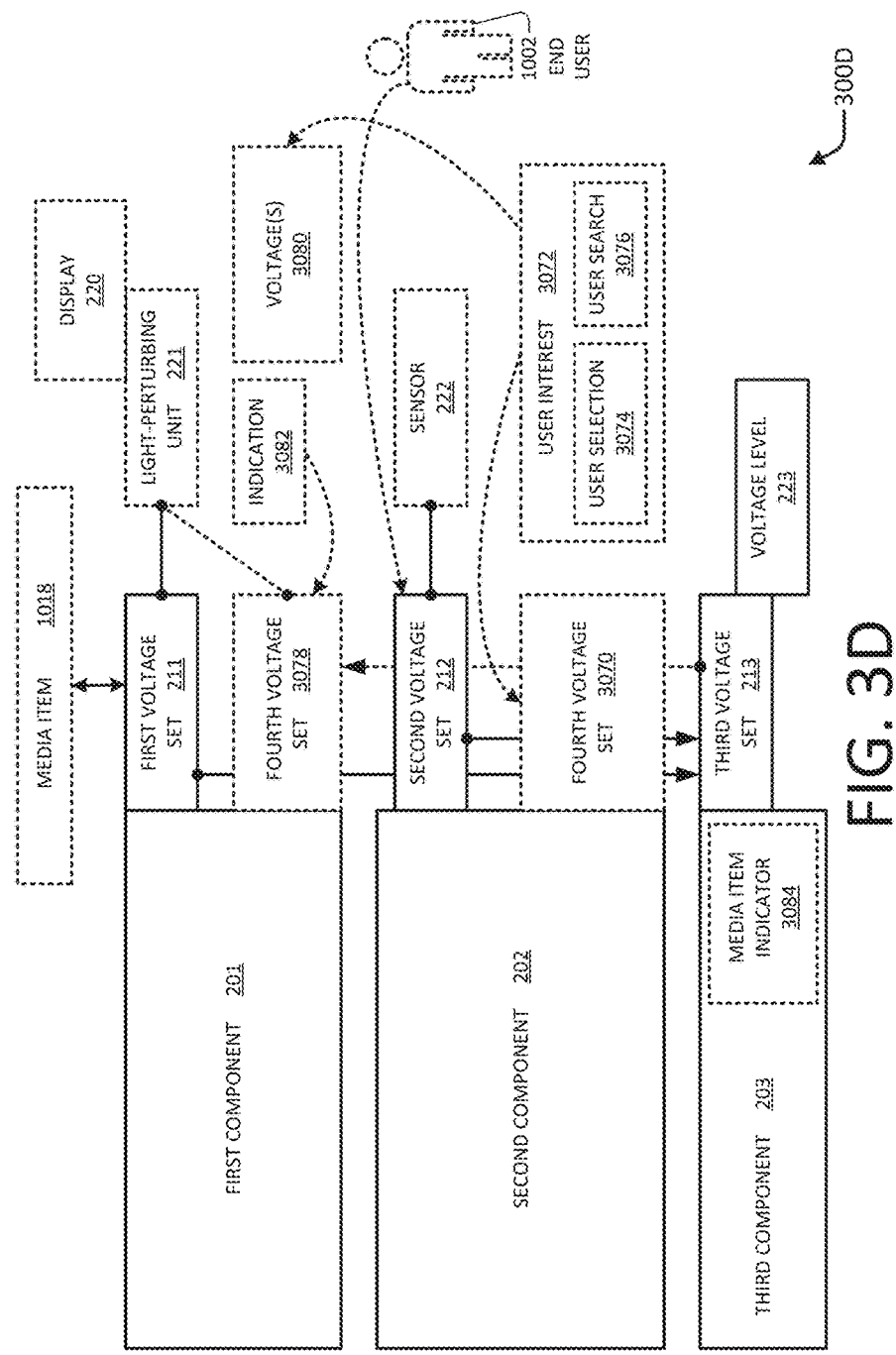

FIG. 3D is a schematic diagram 300D that illustrates at least one example machine and that depicts example scenarios or situations for life experience memorialization with observational linkage via user recognition in accordance with certain example embodiments. For certain example embodiments, a machine may further include at least one second component including at least a fourth set of voltages coupled to at least one sensor, the fourth set of voltages representative of user interest in at least one media item. For certain example implementations, at least one second component 202 (e.g., transistor) may include at least a fourth set of voltages 3070 (e.g., voltages on transistor output) coupled to at least one sensor 222 (e.g., a photosensitive diode), with fourth set of voltages 3070 representative of (e.g., digitally characterizing, reflecting, incorporating, signifying, or a combination thereof, etc.) user interest 3072 in (e.g., desire to observe, clicked visual indication, search term input that relates to, attempt to add to a list of media plans, or a combination thereof, etc.) at least one media item 1018 (e.g., three of the "Die Hard" movies). For certain example embodiments, a machine may further include at least one second component including at least a fourth set of voltages coupled to at least one sensor, the fourth set of voltages representative of user selection of at least one media item. For certain example implementations, at least one second component 202 (e.g., a memory buffer) may include at least a fourth set of voltages 3070 (e.g., charge level on a capacitor relative to a reference voltage) coupled to at least one sensor 222 (e.g., a charge-coupled device (CCD) image sensor), with fourth set of voltages 3070 representative of user selection 3074 (e.g., pressing an icon or image on a screen, selecting an entry in a media guidance grid with a remote, requesting information regarding using a voice command, instructing playing, or a combination thereof, etc.) of at least one media item 1018 (e.g., Season 3, Episode 18 of "Friends"). For certain example embodiments, a machine may further include at least one second component including at least a fourth set of voltages coupled to at least one sensor, the fourth set of voltages representative of at least part of at least one user search that pertains to at least one media item. For certain example implementations, at least one second component 202 (e.g., a conduit leading to/from a circuit board) may include at least a fourth set of voltages 3070 (e.g., 32 voltages) coupled to at least one sensor 222 (e.g., a touch screen), with fourth set of voltages 3070 representative of at least part of at least one user search 3076 (e.g., entered alphanumeric characters, at least one search term, approval of a search suggestion, one or more search results, description of at least one search result, or a combination thereof, etc.) that pertains to (e.g., relates to, targets, produces, uncovers, surfaces, or a combination thereof, etc. at least one indication—such as a title—of) at least one media item 1018 (e.g., Hootie & the Blowfish's biggest hit(s)).

For certain example embodiments, a machine may further include at least one first component including at least a fourth set of voltages coupled to at least one light-perturbing unit of at least one display, the fourth set of voltages responsive at least to: (i) a third set of voltages of the at least one third component and (ii) one or more voltages representative of user interest in at least one media item. For certain example implementations, at least one first component 201 (e.g., a graphics processing unit) may include at least a fourth set of voltages 3078 (e.g., 16 voltages) coupled to at least one light-perturbing unit 221 (e.g., an organic light-emitting diode (OLED)) of at least one display 220 (e.g., active-matrix organic light-emitting diode (AMOLED) screen), with fourth set of voltages 3078 responsive at least to (e.g., are based at least partially on, are established as a result of, are at least partly determined using, are set to reflect a status of, are determined using a sequence of one or more operations that are affected by, are changed as a consequence of an analysis involving, or a combination thereof, etc.): (i) a third set of voltages 213 (e.g., voltages defined at least partly by stored charge) of at least one third component 203 (e.g., storage unit) and (ii) one or more voltages 3080 (e.g., 16 voltages) representative of (e.g., digitally characterizing, reflecting, incorporating, signifying, or a combination thereof, etc.) user interest 3072 (e.g., desire to observe, clicked visual indication, search term input that relates to, attempt to add to a list of media plans, or a combination thereof, etc.) in at least one media item 1018 (e.g., movie trilogy). For certain example embodiments, a machine may further include at least one first component including at least a fourth set of voltages coupled to at least one light-perturbing unit of at least one display, the fourth set of voltages representative of at least one indication of at least a partial match of at least one media item corresponding to user interest and at least one media item indicator included by the at least one third component. For certain example implementations, at least one first component 201 (e.g., at least a portion of at least one frame buffer) may include at least a fourth set of voltages 3078 (e.g., 24 voltages) coupled to at least one light-perturbing unit 221 (e.g., RGB set of liquid crystals) of at least one display 220 (e.g., a liquid crystal display (LCD) assembly), with fourth set of voltages 3078 representative of (e.g., storing, transferring, signifying, entailing, or a combination thereof, etc.) at least one indication 3082 (e.g., a title of a series, a title of an episode, a director, an assigned code, an abbreviation, an image—such as a marketing poster or screen shot, a search result, a description, or a combination thereof, etc.) of at least a partial match (e.g., substantially similar text, equivalent terms, substantially similar image, assigned to at least one same category or genre, an identification of a contributor—such as actor or writer or set designer—that co-occurs, or a combination thereof, etc.) of at least one media item 1018 (e.g., a number of television episodes having an identified actress) corresponding to user interest 3072 (e.g., a circled face of an actress on a touch screen) and at least one media item indicator 3084 (e.g., a title or numerical indication of an episode of a series) included by at least one third component 203 (e.g., stored in a memory having a database).

For certain example embodiments, a machine may further include at least one first component including at least a fourth set of voltages coupled to at least one light-perturbing unit of at least one display, the fourth set of voltages representative of at least one indication of at least one media item that is not represented by a third set of voltages of the at least one third component. For certain example implementations, at least one first component 201 (e.g., video signal output buffer) may include at least a fourth set of voltages 3078 (e.g., four voltages) coupled to at least one light-perturbing unit 221 (e.g., an LED) of at least one display 220 (e.g., a glass assembly including an LED screen), with fourth set of voltages 3078 representative of (e.g., storing, transferring, signifying, entailing, or a combination thereof, etc.) at least one indication 3082 (e.g., a title of a series, a title of an episode, a director, an assigned code, an abbreviation, an image—such as a marketing poster or screen shot, a search result, a description, or a combination thereof, etc.) of at least one media item 1018 (e.g., particular episode(s) in season three of "Deep Space 9") that is not represented by a third set of voltages 213 (e.g., electrical potential differences) of at least one third component 203 (e.g., an op amp in a wireless receiver chain).

Figure 3E:
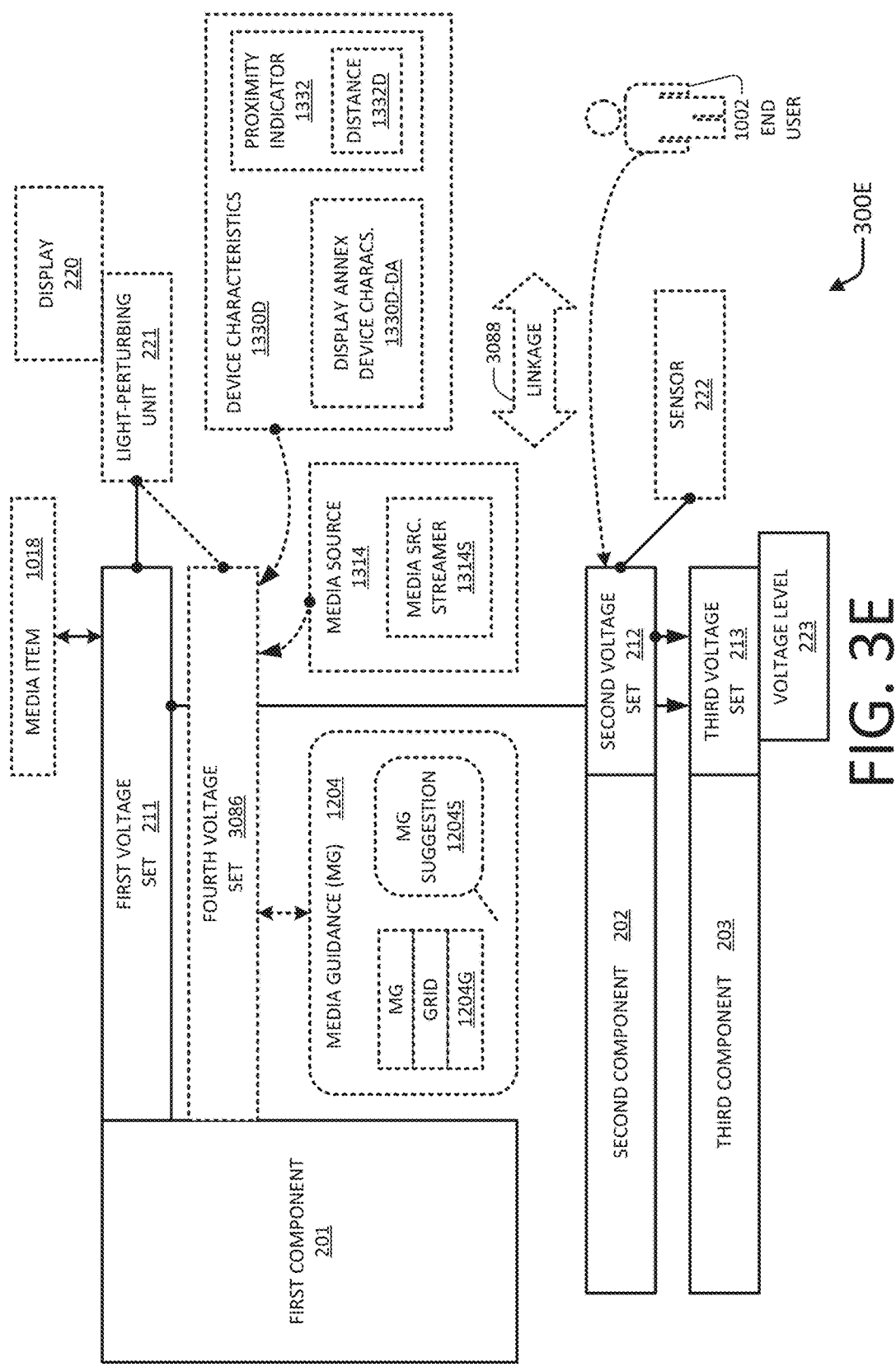

FIG. 3E is a schematic diagram 300E that illustrates at least one example machine and that depicts example scenarios or situations for life experience memorialization with observational linkage via user recognition in accordance with certain example embodiments. For certain example embodiments, a machine may further include at least one first component including at least a fourth set of voltages coupled to at least one light-perturbing unit of at least one display, the fourth set of voltages corresponding to at least some media guidance. For certain example implementations, at least one first component 201 (e.g., video memory) may include at least a fourth set of voltages 3086 (e.g., two voltages) coupled to at least one light-perturbing unit 221 (e.g., a light-emitting diode (LED)) of at least one display 220 (e.g., an LED screen), with fourth set of voltages 3086 corresponding to at least some media guidance (MG) 1204 (e.g., a grid of media items available in the present or future, a suggestion based on passed observing or previous ratings or noted media plans, an option to share an observing experience with a social network connection, or a combination thereof, etc.). For certain example embodiments, a machine may further include at least one first component including at least a fourth set of voltages coupled to at least one light-perturbing unit of at least one display, the fourth set of voltages corresponding to at least one media guidance grid. For certain example implementations, at least one first component 201 (e.g., capacitor) may include at least a fourth set of voltages 3086 (e.g., 16 voltages) coupled to at least one light-perturbing unit 221 (e.g., a light-emitting diode (LED)) of at least one display 220 (e.g., an LED screen), with fourth set of voltages 3086 corresponding to at least one media guidance (MG) grid 1204G (e.g., a table of media items organized by time or expected desirability, a three-dimensional (3D) matrix of media items organized by available media source or feasible media device, a set of blocks representing media items that may be observed prior to a next scheduled event, or a combination thereof, etc.). For certain example embodiments, a machine may further include at least one first component including at least a fourth set of voltages coupled to at least one light-perturbing unit of at least one display, the fourth set of voltages corresponding to at least one media guidance suggestion. For certain example implementations, at least one first component 201 (e.g., a transistor) may include at least a fourth set of voltages 3086 (e.g., >1.0 volts) coupled to at least one light-perturbing unit 221 (e.g., a light-emitting diode (LED)) of at least one display 220 (e.g., an LED screen), with fourth set of voltages 3086 corresponding to at least one media guidance (MG) suggestion 1204S (e.g., a media item alternative to a requested media item, an oldest unobserved media item of an identified series, an indication of what a social network connection is currently observing, or a combination thereof, etc.).

For certain example embodiments, a machine may further include at least one first component including at least a fourth set of voltages coupled to at least one light-perturbing unit of at least one display, the fourth set of voltages responsive at least to multiple media sources. For certain example implementations, at least one first component 201 (e.g., a conduit) may include at least a fourth set of voltages 3086 (e.g., voltages to drive at least one pixel) coupled to at least one light-perturbing unit 221 (e.g., a liquid crystal RGB unit) of at least one display 220 (e.g., an LCD screen), with fourth set of voltages 3086 responsive at least to multiple media sources 1314 (e.g., a media source—such as a media streamer or a TV network or a cable network—indication of one or more media characteristics 1310 (e.g. of FIG. 1O)). For certain example embodiments, a machine may further include at least one first component including at least a fourth set of voltages coupled to at least one light-perturbing unit of at least one display, the fourth set of voltages responsive at least to at least one streaming media source. For certain example implementations, at least one first component 201 (e.g., connector to screen input) may include at least a fourth set of voltages 3086 (e.g., potential differences read out of VRAM) coupled to at least one light-perturbing unit 221 (e.g., a liquid crystal RGB unit) of at least one display 220 (e.g., an LCD screen), with fourth set of voltages 3086 responsive at least to at least one streaming media source 1314S (e.g., a name of, an account with, a set of media items associated with, or a combination thereof, etc. at least one media source streamer, such as Netflix). For certain example embodiments, a machine may further include at least one first component including at least a fourth set of voltages coupled to at least one light-perturbing unit of at least one display, the fourth set of voltages responsive at least to at least one stored linkage between at least one media source and at least one user. For certain example implementations, at least one first component 201 (e.g., wire) may include at least a fourth set of voltages 3086 (e.g., four voltages) coupled to at least one light-perturbing unit 221 (e.g., a liquid crystal RGB unit) of at least one display 220 (e.g., an LCD screen), with fourth set of voltages 3086 responsive at least to at least one stored linkage 3088 (e.g., saved association, listing of a media source under or in conjunction with an identification of an end user, listing of qualified user under or in conjunction with an identification of a media source, or a combination thereof, etc.) between at least one media source (e.g., a media source 1020 (e.g., of FIG. 1) or a media source 1314 indication) and at least one (e.g., end) user 1002 (e.g., an individual, a family account, a person associated with a facial image, or a combination thereof, etc.).

For certain example embodiments, a machine may further include at least one first component including at least a fourth set of voltages coupled to at least one light-perturbing unit of at least one display, the fourth set of voltages responsive at least to multiple devices. For certain example implementations, at least one first component 201 (e.g., shared main memory) may include at least a fourth set of voltages 3086 (e.g., 32 voltages) coupled to at least one light-perturbing unit 221 (e.g., at least one pixel) of at least one display 220 (e.g., projector), with fourth set of voltages 3086 responsive at least to multiple devices 1330D (e.g., a device identification aspect—such as user-given name, make or model, description, or device type—of one or more device characteristics 1330 (e.g. of FIG. 1O)). For certain example embodiments, a machine may further include at least one first component including at least a fourth set of voltages coupled to at least one light-perturbing unit of at least one display, the fourth set of voltages responsive at least to at least one display annex device. For certain example implementations, at least one first component 201 (e.g., dedicated shared main memory) may include at least a fourth set of voltages 3086 (e.g., four voltages) coupled to at least one light-perturbing unit (e.g., a Janus particle) of at least one display 220 (e.g., electronic ink assembly), with fourth set of voltages 3086 responsive at least to at least one display annex device 1330D-DA (e.g., a set-top box device (e.g., an example of a display annex device 1004DA (e.g., of FIG. 1J or 1O) identification aspect—such as user-given name, make or model, description, or associated network provider—of one or more device characteristics 1330 (e.g. of FIG. 1O)). For certain example embodiments, a machine may further include at least one first component including at least a fourth set of voltages coupled to at least one light-perturbing unit of at least one display, the fourth set of voltages responsive at least to at least one proximity indicator. For certain example implementations, at least one first component 201 (e.g., memory buffer) may include at least a fourth set of voltages 3086 (e.g., voltages held on at least one latch) coupled to at least one light-perturbing unit 221 (e.g., quantum dot) of at least one display 220 (e.g., an LED or LCD screen), with fourth set of voltages 3086 responsive at least to at least one proximity indicator 1332 (e.g., expression of closeness to an end user or current device, distance to another device, time to reach another device, or a combination thereof, etc.). For certain example embodiments, a machine may further include at least one first component including at least a fourth set of voltages coupled to at least one light-perturbing unit of at least one display, the fourth set of voltages responsive at least to at least one distance to at least one device. For certain example implementations, at least one first component 201 (e.g., transistor output) may include at least a fourth set of voltages 3086 (e.g., voltages driven on transistor output) coupled to at least one light-perturbing unit 221 (e.g., liquid crystal part) of at least one display 220 (e.g., LCD screen), with fourth set of voltages 3086 responsive at least to at least one distance 1332D to (e.g., measurement in feet or meters, indication of same room or same building, close or nearby or remote label, or a combination thereof, etc.) at least one device (e.g., another end user device 1004 (e.g., of FIG. 1)).

FIG. 3F1 is a schematic diagram 300F1 that illustrates at least one example machine and that depicts example scenarios or situations for life experience memorialization with observational linkage via user recognition in accordance with certain example embodiments. For certain example embodiments, a machine may further include at least one fourth component including at least a fourth set of voltages associated with at least one network communication, the fourth set of voltages corresponding to one or more favorability indications. For certain example implementations, at least one fourth component 3090 (e.g., a part of a network interface, a portion of memory, an internal device conduit, or a combination thereof, etc.) may include at least a fourth set of voltages 3094 (e.g., 16 voltages) associated with (e.g., derived from, received via, routed from, processed using, or a combination thereof, etc.) at least one network communication 3092 (e.g., received signal, wireless communication, wired communication, multiple packets, or a combination thereof, etc.), with fourth set of voltages 3094 corresponding to one or more favorability indications 3096 (e.g., a "like", a "+1", a retweet, a critique, a positive or negative posting discussing or commenting on, a rating, or a combination thereof, etc.). For certain example embodiments, a machine may further include at least one fourth component including at least a fourth set of voltages associated with at least one network communication, the fourth set of voltages corresponding to one or more favorability indications associated with one or more social network connections of at least one user. For certain example implementations, at least one fourth component 3090 (e.g., a radio) may include at least a fourth set of voltages 3094 (e.g., eight potential differences) associated with at least one network communication 3092 (e.g., an app-specific status update), with fourth set of voltages 3094 corresponding to one or more favorability indications 3096 (e.g., a "like", a "+1", a retweet, a critique, a positive or negative posting discussing or commenting on, a rating, or a combination thereof, etc.) associated with one or more social network connections 3098 (e.g., a social network member that is a friend, a connection, part of a same group, a follower, one that is followed, or a combination thereof, etc.) of at least one (e.g., end) user 1002 (e.g., individual). For certain example embodiments, a machine may further include at least one fourth component including at least a fourth set of voltages associated with at least one network communication, the fourth set of voltages corresponding to one or more starred reviews of at least one media item. For certain example implementations, at least one fourth component 3090 (e.g., a transistor of a memory that also forms at least part of another component, such as a third component) may include at least a fourth set of voltages 3094 (e.g., a group of voltages obtainable from at least one transistor output) associated with at least one network communication 3092 (e.g., light pulses over a fiber optic cable), with fourth set of voltages 3094 corresponding to one or more starred reviews 3100 (e.g., a 3-star review of one movie, a 4.5 star review of another movie, or a combination thereof, etc.) of at least one media item 1018 (e.g., a movie).

For certain example embodiments, a machine may further include at least one receiver chain including at least a fourth set of voltages associated with at least one network communication. For certain example implementations, at least one receiver chain 3102 (e.g., one or more analog or digital parts that accept a relatively higher frequency electromagnetic signal and convert it to a relatively lower frequency string of bits or bytes, such as a filter, an amplifier, a demodulator, an analog to digital converter (ADC), or a combination thereof, etc.) may include at least a fourth set of voltages 3094 (e.g., voltages on an output of an amplifier) associated with at least one network communication 3092 (e.g., a high-frequency wireless analog signal that is modulated with digital data from the internet). For certain example embodiments, a machine may further include at least one baseband processor that has one or more junctions including at least a fourth set of voltages and that has one or more junctions that are coupled to at least one transceiver. For certain example implementations, at least one baseband processor 3104 (e.g., a chip or chip portion that manages one or more radio functions) that has one or more junctions 3106 (e.g., contact, pin, pad, metal layer, bus interface, or a combination thereof, etc.) may include at least a fourth set of voltages 3094 (e.g., a group of 16 voltages) and that has one or more junctions 3106 (e.g., contact, pin, pad, metal layer, bus interface, or a combination thereof, etc.) that are coupled to at least one transceiver 3108 (e.g., a transmitter, a receiver, a radio, transmitter-receiver, or a combination thereof, etc.).

FIG. 3F2 is a schematic diagram 300F2 that illustrates at least one example machine and that depicts example scenarios or situations for life experience memorialization with observational linkage via user recognition in accordance with certain example embodiments. For certain example embodiments, a machine may further include at least one first component including at least a fourth set of voltages coupled to at least one light-perturbing unit of at least one display, the fourth set of voltages responsive at least to one or more favorability indications. For certain example implementations, at least one first component 201 (e.g., video memory) may include at least a fourth set of voltages 3110 (e.g., 2 voltages) coupled to at least one light-perturbing unit 221 (e.g., a liquid crystal assembly for one or more pixels) of at least one display 220 (e.g., an LCD screen), with fourth set of voltages 3110 responsive at least to one or more favorability indications 3096 (e.g., a "like", a "+1", a retweet, a critique, a positive or negative posting discussing or commenting on, a rating, or a combination thereof, etc.). For certain example embodiments, a machine may further include at least one first component including at least a fourth set of voltages coupled to at least one light-perturbing unit of at least one display, the fourth set of voltages responsive at least to the second set of voltages of the at least one second component. For certain example implementations, at least one first component 201 (e.g., transistor) may include at least a fourth set of voltages 3110 (e.g., potential different on transistor output) coupled to at least one light-perturbing unit 221 (e.g., light emitting diode (LED)) of at least one display 220 (e.g., LED screen), with fourth set of voltages 3110 responsive at least to second set of voltages 212 (e.g., 16 voltages) of at least one second component 202 (e.g., amplifier for a sensor 222). For certain example embodiments, a machine may further include at least one first component including at least a fourth set of voltages coupled to at least one light-perturbing unit of at least one display, the fourth set of voltages responsive at least to an association between at least: (i) one or more social network connections corresponding to one or more favorability indications and (ii) at least one user. For certain example implementations, at least one first component 201 (e.g., video memory output buffer) may include at least a fourth set of voltages 3110 (e.g., eight voltages in parallel) coupled to at least one light-perturbing unit 221 (e.g., active-matrix organic light emitting diode (AMOLED)) of at least one display 220 (e.g., AMOLED screen on computing tablet), with fourth set of voltages 3110 responsive at least to an association 3112 (e.g., friends, shared group, shared pinup board, follower or followed relationship, or a combination thereof, etc.) between at least: (i) one or more social network connections 3098 (e.g., a social network member that is a friend, a connection, part of a same group, a follower, one that is followed, or a combination thereof, etc.) corresponding to one or more favorability indications 3096 (e.g., a "like", a "+1", a retweet, a critique, a positive or negative posting discussing or commenting on, a rating, or a combination thereof, etc.) and (ii) at least one (e.g., end) user 1002 (e.g., a person with an account on a device).

For certain example embodiments, a machine may further include at least one first component including at least a fourth set of voltages coupled to at least one light-perturbing unit of at least one display, the fourth set of voltages representative of at least some media guidance. For certain example implementations, at least one first component 201 (e.g., graphics processing unit (GPU)) may include at least a fourth set of voltages 3110 (e.g., four voltages) coupled to at least one light-perturbing unit 221 (e.g., light emitting diode (LED)) of at least one display 220 (e.g., thin-film-transistor (TFT) array assembly), with fourth set of voltages 3110 representative of at least some media guidance (MG) 1204 (e.g., a grid of media items available in the present or future, a suggestion based on passed observing or previous ratings or noted media plans, an option to share an observing experience with a social network connection, or a combination thereof, etc.). For certain example embodiments, a machine may further include at least one first component including at least a fourth set of voltages coupled to at least one light-perturbing unit of at least one display, the fourth set of voltages representative of at least one media guidance grid. For certain example implementations, at least one first component 201 (e.g., graphics memory) may include at least a fourth set of voltages 3110 (e.g., four electric potential differences) coupled to at least one light-perturbing unit 221 (e.g., light emitting diode (LED)) of at least one display 220 (e.g., thin-film-transistor (TFT) array assembly), with fourth set of voltages 3110 representative of at least one media guidance (MG) grid 1204G (e.g., a table of media items organized by time or expected desirability, a three-dimensional (3D) matrix of media items organized by available media source or feasible media device, a set of blocks representing media items that may be observed prior to a next scheduled event, or a combination thereof, etc.). For certain example embodiments, a machine may further include at least one first component including at least a fourth set of voltages coupled to at least one light-perturbing unit of at least one display, the fourth set of voltages representative of at least one media guidance suggestion. For certain example implementations, at least one first component 201 (e.g., one or more transistors) may include at least a fourth set of voltages 3110 (e.g., eight outputs having voltage levels) coupled to at least one light-perturbing unit 221 (e.g., light emitting diode (LED)) of at least one display 220 (e.g., thin-film-transistor (TFT) array assembly), with fourth set of voltages 3110 representative of at least one media guidance (MG) suggestion 1204S (e.g., a media item alternative to a requested media item, an oldest unobserved media item of an identified series, an indication of what a social network connection is currently observing, or a combination thereof, etc.). For certain example embodiments, a machine may further include at least one first component including at least a fourth set of voltages coupled to at least one light-perturbing unit of at least one display, the fourth set of voltages representative of multiple media guidance suggestions ranked based at least partially on one or more favorability indications. For certain example implementations, at least one first component 201 (e.g., frame buffer) may include at least a fourth set of voltages 3110 (e.g., voltages on a serial output buffer) coupled to at least one light-perturbing unit 221 (e.g., light emitting diode (LED)) of at least one display 220 (e.g., thin-film-transistor (TFT) array assembly), with fourth set of voltages 3110 representative of multiple media guidance (MG) suggestions 1204S (e.g., a media item alternative to a requested media item, an oldest unobserved media item of an identified series, an indication of what a social network connection is currently observing, or a combination thereof, etc.) ranked (e.g., put in order, organized by strength of favorability, listed in increasing or decreasing order of rating, or a combination thereof, etc.) based at least partially on (e.g., using, with reference to, or a combination thereof, etc.) one or more favorability indications 3096 (e.g., a "like", a "+1", a retweet, a critique, a positive or negative posting discussing or commenting on, a rating, or a combination thereof, etc.).

FIG. 3G1 is a schematic diagram 300G1 that illustrates at least one example machine and that depicts example scenarios or situations for life experience memorialization with observational linkage via user recognition in accordance with certain example embodiments. For certain example embodiments, a machine may further include at least one fourth component including at least a fourth set of voltages associated with at least one network communication, the fourth set of voltages corresponding to one or more interest indications. For certain example implementations, at least one fourth component 3116 (e.g., electronic storage) may include at least a fourth set of voltages 3114 (e.g., four voltages) associated with (e.g., derived from, received via, routed from, processed using, or a combination thereof, etc.) at least one network communication 3118 (e.g., social media communication), with fourth set of voltages 3114 corresponding to one or more interest indications 3120 (e.g., desire to observe, clicked visual representation, search term input that relates to, attempt to add to a list of media plans, presence in media plans, current observance, spoken request for—such as speaking a title, or a combination thereof, etc.).

For certain example embodiments, a machine may further include at least one fourth component including at least a fourth set of voltages associated with at least one network communication, the fourth set of voltages corresponding to one or more interest indications of at least one social network connection. For certain example implementations, at least one fourth component 3116 (e.g., memory of a network interface) may include at least a fourth set of voltages 3114 (e.g., serial voltages) associated with at least one network communication 3118 (e.g., social network update), with fourth set of voltages 3114 corresponding to one or more interest indications 3120 (e.g., desire to observe, clicked visual representation, search term input that relates to, attempt to add to a list of media plans, presence in media plans, current observance, spoken request for—such as speaking a title, or a combination thereof, etc.) of at least one social network connection 3098 (e.g., a social network member that is a friend, a connection, part of a same group, a follower, one that is followed, or a combination thereof, etc.). For certain example embodiments, a machine may further include at least one fourth component including at least a fourth set of voltages associated with at least one network communication, the fourth set of voltages corresponding to one or more indications of at least one media item that is currently being observed by at least one social network connection. For certain example implementations, at least one fourth component 3116 (e.g., FIFO buffer for incoming data) may include at least a fourth set of voltages 3114 (e.g., parallel voltages) associated with at least one network communication 3118 (e.g., social network data intercepted and processed by an operating system), with fourth set of voltages 3114 corresponding to one or more indications 3122 (e.g., title, episode number, alphanumeric designation, starring actor/actress, year produced, corresponding album, or a combination thereof, etc.) of at least one media item 1018 (e.g., an episode of "Glee") that is currently being observed (e.g., being watched when a social network/media guidance update is created, sent, received, processed, or a combination thereof, etc.) by at least one social network connection 3098 (e.g., a social network member that is a friend, a connection, part of a same group, a follower, one that is followed, or a combination thereof, etc.). For certain example embodiments, a machine may further include at least one fourth component including at least a fourth set of voltages associated with at least one network communication, the fourth set of voltages corresponding to one or more indications of one or more media plans for at least one social network connection. For certain example implementations, at least one fourth component 3116 (e.g., cache memory) may include at least a fourth set of voltages 3114 (e.g., 16 voltage differentials) associated with at least one network communication 3118 (e.g., voltages extracted from internet protocol (IP) packet-carrying signals), with fourth set of voltages 3114 corresponding to one or more indications 3124 (e.g., title, episode number, alphanumeric designation, starring actor/actress, year produced, corresponding album, date of media debut, date or time of intended observing, or a combination thereof, etc.) of one or more media plans 1012MP (e.g., at least one identifier 1260 (e.g., of FIG. 1G) of a film, a show, a clip, or a combination thereof, etc., such as a series name or episode number, that a person—such as a social network member—hopes or intends to observe at a particular time or at an indefinite time in the future) for at least one social network connection 3098 (e.g., a social network member that is a friend, a connection, part of a same group, a follower, one that is followed, or a combination thereof, etc.).

For certain example embodiments, a machine may further include at least one transceiver including at least a fourth set of voltages coupled to at least one antenna. For certain example implementations, at least one transceiver 3126 (e.g., a transmitter, a receiver, a radio, a transmitter-receiver, or a combination thereof, etc.) may include at least a fourth set of voltages 3114 (e.g., two voltages) coupled to at least one antenna 3128 (e.g., metallic conductor, collector or director of electromagnetic energy, omnidirectional antenna, dipole antenna, directional antenna, or a combination thereof, etc.). For certain example embodiments, a machine may further include at least one Wi-Fi transceiver including at least a fourth set of voltages coupled to at least one antenna, the fourth set of voltages varying over time. For certain example implementations, at least one Wi-Fi transceiver 3130 (e.g., a transmitter, a receiver, a radio, a transmitter-receiver, or a combination thereof, etc. tuned or configured to handle at least one frequency or at least one protocol appropriate for an IEEE 802.11x standard) may include at least a fourth set of voltages 3114 (e.g., thousands of voltages per second) coupled to at least one antenna 3128 (e.g., metallic conductor, collector or director of electromagnetic energy, omnidirectional antenna, dipole antenna, directional antenna, or a combination thereof, etc.), with fourth set of voltages 3114 varying over time (e.g., changing, fluctuating in accordance with data, increasing or decreasing in accordance with a carrier wave, or a combination thereof, etc.).

For certain example embodiments, a machine may further include at least one transceiver including at least a fourth set of voltages coupled to at least one applications processor. For certain example implementations, at least one transceiver 3126 (e.g., a transmitter, a receiver, a radio, a transmitter-receiver, or a combination thereof, etc.) may include at least a fourth set of voltages (e.g., eight digital voltages) coupled to at least one applications processor 3132 (e.g., main central processing unit (CPU), processing core for a smart phone, at least one processor on which an operating system executes, at least one processor on which one or more applications execute, or a combination thereof, etc.). For certain example embodiments, a machine may further include at least one amplifier including at least a fourth set of voltages derived from at least one analog signal. For certain example implementations, at least one amplifier 3134 (e.g., electronic amplifier, voltage amplifier, current amplifier, operational amplifier, signal-amplifying circuit, or a combination thereof, etc.) may include at least a fourth set of voltages 3114 (e.g., group of eight voltages output from an amplifier) derived from (e.g., created from, resulting from manipulation of, existing after amplification of, or a combination thereof, etc.) at least one analog signal 3136 (e.g., a substantially continuous signal—within a finite time frame—with a time varying attribute, such as amplitude or frequency). For certain example embodiments, a machine may further include at least one analog-to-digital converter including at least a fourth set of voltages that substantially emulate at least one step function. For certain example implementations, at least one analog-to-digital (A/D) converter (ADC) 3138 (e.g., a converter of a continuous quantity to a discrete quantity, a device that quantizes an analog signal, a discrete A/D converter, a digital signal processor (DSP) configured to convert at least one analog signal into digital values, or a combination thereof, etc.) may include at least a fourth set of voltages 3114 (e.g., at least two discrete time or discrete amplitude electric potential differences) that substantially emulate (e.g., mimic within a given performance criterion, resemble but are affected by rise time or settling time, track except as hindered by effects of real-world physical devices, or a combination thereof, etc.) at least one step function (e.g., a digital signal, a set of values that repeatedly settle at discrete numbers over time, a signal that trends toward two or more relatively narrow zones between an upper rail and a lower rail, or a combination thereof, etc.).

FIG. 3G2 is a schematic diagram 300G2 that illustrates at least one example machine and that depicts example scenarios or situations for life experience memorialization with observational linkage via user recognition in accordance with certain example embodiments. For certain example embodiments, a machine may further include at least one first component including at least a fourth set of voltages coupled to at least one light-perturbing unit of at least one display, the fourth set of voltages corresponding to one or more interest indications. For certain example implementations, at least one first component 201 (e.g., a graphics processing area on at least one chip) may include at least a fourth set of voltages 3140 (e.g., voltage output on at least one ALU) coupled to at least one light-perturbing unit 221 (e.g., light emitting diode (LED)) of at least one display 220 (e.g., LED screen), with fourth set of voltages 3140 corresponding to one or more interest indications 3120 (e.g., desire to observe, clicked visual representation, search term input that relates to, attempt to add to a list of media plans, presence in media plans, current observance, spoken request for—such as speaking a title, or a combination thereof, etc.). For certain example embodiments, a machine may further include at least one first component including at least a fourth set of voltages coupled to at least one light-perturbing unit of at least one display, the fourth set of voltages corresponding to at least one indication of at least one media item in observance by at least one social network connection. For certain example implementations, at least one first component 201 (e.g., graphics memory) may include at least a fourth set of voltages 3140 (e.g., four voltages) coupled to at least one light-perturbing unit 221 (e.g., light emitting diode (LED)) of at least one display 220 (e.g., a liquid crystal display (LCD) with LED backlighting), with fourth set of voltages 3140 corresponding to at least one indication 3122 (e.g., title, episode number, alphanumeric designation, starring actor/actress, year produced, corresponding album, or a combination thereof, etc.) of at least one media item 1018 (e.g., a "Titanic" movie) in observance (e.g., being watched, listening to, experiencing three-dimensionally, or a combination thereof, etc.) by at least one social network connection 3098 (e.g., a social network member that is a friend, a connection, part of a same group, a follower, one that is followed, or a combination thereof, etc.).

For certain example embodiments, a machine may further include at least one first component including at least a fourth set of voltages coupled to at least one light-perturbing unit of at least one display, the fourth set of voltages corresponding to at least one indication that is user selectable to join at least one social network connection in observance of at least one media item. For certain example implementations, at least one first component 201 (e.g., video memory) may include at least a fourth set of voltages 3140 (e.g., two voltages) coupled to at least one light-perturbing unit 221 (e.g., a set of liquid crystal elements—such as a set of red-green-blue ones) of at least one display 220 (e.g., an LCD display assembly), with fourth set of voltages 3140 corresponding to at least one indication 3142 (e.g., a visual alert, an audible announcement, a user interface (UI) "button", a UI menu option, or a combination thereof, etc.) that is user selectable (e.g., selectable with a remote, activate-able with a voice command, press-able with a finger, pointing with a gesture, or a combination thereof, etc.) to join (e.g., virtually accompany, engage electronically, communicate visually or aurally with, or a combination thereof, etc.) at least one social network connection 3098 (e.g., a social network member that is a friend, a connection, part of a same group, a follower, one that is followed, or a combination thereof, etc.) in observance of (e.g., watching of, listening to, experiencing three-dimensionally, or a combination thereof, etc.) at least one media item 1018 (e.g., an episode of "Outlander"). For certain example embodiments, a machine may further include at least one first component including at least a fourth set of voltages coupled to at least one light-perturbing unit of at least one display, the fourth set of voltages corresponding to at least one option for observance of at least one media item from a beginning position. For certain example implementations, at least one first component 201 (e.g., memory output buffer) may include at least a fourth set of voltages 3140 (e.g., 16 voltages) coupled to at least one light-perturbing unit 221 (e.g., a Janus particle) of at least one display 220 (e.g., an electronic ink screen), with fourth set of voltages 3140 corresponding to at least one option 3144 (e.g., capability, feature, user interface (UI) command, invitation, or a combination thereof, etc.) for observance of (e.g., watching of, listening to, experiencing three-dimensionally, or a combination thereof, etc.) at least one media item 1018 (e.g., an episode of "Game of Thrones") from a beginning position (e.g., from a start, from an initial time, from a first second or minute, or a combination thereof, etc.). For certain example embodiments, a machine may further include at least one first component including at least a fourth set of voltages coupled to at least one light-perturbing unit of at least one display, the fourth set of voltages corresponding to at least one option for observance of at least one media item in at least substantial synchronization with at least one social network connection. For certain example implementations, at least one first component 201 (e.g., at least one transistor—such as one for a storage cell or for at least one pixel as part of a thin-film transistor (TFT) array) may include at least a fourth set of voltages 3140 (e.g., electric potential difference with respect to system ground) coupled to at least one light-perturbing unit 221 (e.g., a quantum dot) of at least one display 220 (e.g., a backlit built-in or integrated video screen), with fourth set of voltages 3140 corresponding to at least one option 3146 (e.g., capability, feature, user interface (UI) command, invitation, or a combination thereof, etc.) for observance of (e.g., watching of, listening to, experiencing three-dimensionally, or a combination thereof, etc.) at least one media item 1018 (e.g., "Lord of the Rings" trilogy) in at least substantial synchronization (e.g., within 2-3 or 10 seconds of simultaneousness, as practicable based on limitations of compression codec, within constraints of network bandwidth or lag, to extent reasonable possible with different hardware or operating systems between or among participants, as capable of compensating for geographically-dispersed participants, sufficiently close to facilitate sharing reactions to or making comments about media item events—such as surprises or dialog or action scenes, or a combination thereof, etc.) with at least one social network connection 3098 (e.g., a social network member that is a friend, a connection, part of a same group, a follower, one that is followed, or a combination thereof, etc.).

For certain example embodiments, a machine may further include at least one first component including at least a fourth set of voltages coupled to at least one light-perturbing unit of at least one display, the fourth set of voltages corresponding to at least one indication that is user selectable to communicate with at least one social network connection. For certain example implementations, at least one first component 201 (e.g., at least one latch) may include at least a fourth set of voltages 3140 (e.g., group of voltages) coupled to at least one light-perturbing unit 221 (e.g., pixel) of at least one display 220 (e.g., a three-dimensional (3D) projection), with fourth set of voltages 3140 corresponding to at least one indication 3148 (e.g., a visual cue, an audible invitation, a user interface (UI) "button", a UI menu option, or a combination thereof, etc.) that is user selectable (e.g., selectable with a remote, activate-able with a voice command, press-able with a finger, gesturing, or a combination thereof, etc.) to communicate with (e.g., speak with, have a teleconference with, engage in texting with, have a video conference with, or a combination thereof, etc.) at least one social network connection 3098 (e.g., a social network member that is a friend, a connection, part of a same group, a follower, one that is followed, or a combination thereof, etc.). For certain example embodiments, a machine may further include at least one first component including at least a fourth set of voltages coupled to at least one light-perturbing unit of at least one display, the fourth set of voltages corresponding to at least one indication that is user selectable to communicate with at least one social network connection at least visually. For certain example implementations, at least one first component 201 (e.g., a field effect transistor (FET)) may include at least a fourth set of voltages 3140 (e.g., extent of potential difference at eight or more circuit locations) coupled to at least one light-perturbing unit 221 (e.g., an electron gun or phosphorescent target surface therefor) of at least one display 220 (e.g., a cathode ray tube (CRT) assembly), with fourth set of voltages 3140 corresponding to at least one indication 3150 (e.g., a visual cue, an audible invitation, a user interface (UI) "button", a UI menu option, or a combination thereof, etc.) that is user selectable (e.g., selectable with a remote, activate-able with a voice command, press-able with a finger, gesturing, or a combination thereof, etc.) to communicate with (e.g., have a video conference with, video FaceTime, or a combination thereof, etc.) at least one social network connection 3098 (e.g., a social network member that is a friend, a connection, part of a same group, a follower, one that is followed, or a combination thereof, etc.) at least visually (e.g., with video, with moving images, using at least one camera, or a combination thereof, etc.). For certain example embodiments, a machine may further include at least one first component including at least a fourth set of voltages coupled to at least one light-perturbing unit of at least one display, the fourth set of voltages corresponding to at least one indication that is user selectable to communicate with at least one social network connection using at least one integrated microphone. For certain example implementations, at least one first component 201 (e.g., a capacitor) may include at least a fourth set of voltages 3140 (e.g., word-length group of voltages) coupled to at least one light-perturbing unit 221 (e.g., at least one pixel) of at least one display 220 (e.g., flat panel), with fourth set of voltages 3140 corresponding to at least one indication 3148 (e.g., a visual cue, an audible invitation, a user interface (UI) "button", a UI menu option, or a combination thereof, etc.) that is user selectable (e.g., selectable with a remote, activate-able with a voice command, press-able with a finger, gesturing, or a combination thereof, etc.) to communicate with (e.g., speak with, have a teleconference with, engage in texting with, have a video conference with, or a combination thereof, etc.) at least one social network connection 3098 (e.g., a social network member that is a friend, a connection, part of a same group, a follower, one that is followed, or a combination thereof, etc.) using (e.g., including, by way of, via, acquiring voice input with, or a combination thereof, etc.) at least one integrated microphone 3152 (e.g., a microphone within a same housing, a microphone that is part of a media-playing device instead of a separate device, a sound transducer that is sold along with a media-playing device, or a combination thereof, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein referenced method aspects. The circuitry and/or programming may be virtually any combination of hardware, software (e.g., a high-level computer program serving as a hardware specification), and/or firmware configured to effect the herein referenced method aspects depending upon the design choices of the system designer, and limited to patentable subject matter under 35 U.S.C. 101.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software (e.g., a high-level computer program serving as a hardware specification)).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to a human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en [dot] wikipedia [dot] org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en [dot] wikipedia [dot] org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en [dot] wikipedia [dot] org/wiki/Logic_gates (as of Jun. 5, 2012, 21:03 GMT). A modern microprocessor may often also include many resistors, capacitors, or inductors formed as part of at least one integrated circuit in a package.

The logic circuits forming the microprocessor are arranged to provide a microarchitecture that will carry out the instructions defined by that microprocessor's defined Instruction Set Architecture (ISA). The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en [dot] wikipedia [dot] org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en [dot] wikipedia [dot] org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that useful, tangible, and concrete work is done. For example, as indicated above, such machine language—the compiled version of the higher-level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood, with the apparatus powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software (e.g., a high-level computer program serving as a hardware specification), and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software (e.g., a high-level computer program serving as a hardware specification), and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software (e.g., a high-level computer program serving as a hardware specification) implementation; or, yet again alternatively, the implementer may opt for some combination of hardware, software (e.g., a high-level computer program serving as a hardware specification), and/or firmware in one or more machines, compositions of matter, and articles of manufacture, limited to patentable subject matter under 35 U.S.C. §101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software (e.g., a high-level computer program serving as a hardware specification), and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software (e.g., a high-level computer program serving as a hardware specification) or firmware, or of gate arrays or programmable hardware, such as by performing a reception of or a transmission of one or more instructions in relation to one or more operations described herein. Alternatively or additionally, in some variants, an implementation may include special-purpose hardware, software (e.g., a high-level computer program serving as a hardware specification), firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose, and then a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In a general sense, those skilled in the art will recognize that the various embodiments described herein can be implemented, individually and/or collectively, by various types of electro-mechanical systems having a wide range of electrical components such as hardware, software (e.g., a high-level computer program serving as a hardware specification), firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software (e.g., a high-level computer program serving as a hardware specification), firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software (e.g., a high-level computer program serving as a hardware specification), and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, Verizon, AT&T, etc.), or (g) a wired/wireless services entity (e.g., Sprint, AT&T, Verizon, etc.), etc.

In certain cases, use of a machine or process may occur in a given territory even if one or more physical or operational components are located outside the given territory or jurisdiction. For example, in a distributed computing context, use of a distributed computing system may occur in a given territory even though one or more parts of the system may be located outside of the given territory (e.g., relay, server, processor, signal-bearing medium, transmitting computer, receiving computer, etc. located outside the territory). For example, if machine state changes (e.g., electronic changes, voltage changes, switch positions, human-perceivable effects of machine operations, etc.) of a machine or process are detectable within a particular territory's borders, an extra-territorial positioning of all or part of a machine that is performing a process is immaterial. As an additional or alternative example, if voltages are provided (or, e.g., switches are flipped, images are displayed, routers propagate voltage changes, or a combination thereof, etc.) within a particular jurisdiction, a given process is being performed with the particular jurisdiction, even if a machine is processing instructions or germinating voltage changes outside of the particular jurisdiction. As an additional or alternative example, if a conductor of voltage or electromagnetic radiation leads into a particular territory from a machine that is physically positioned outside of the particular territory, it may be equivalent to that machine performing a process within the particular territory, especially if (but not necessarily only if) beneficial use of the process therefore occurs at least partially within the particular territory. As an additional or alternative example, for a device that performs one or more operations outside of a particular jurisdiction, if a termination of output or one or more results occurs at the particular jurisdiction, then the device may be considered to be present in the particular jurisdiction from an electronic engineering perspective or technological viewpoint. As an additional or alternative example, an extraterritorial positioning of a server may nevertheless be considered to be effectively in a given territory, such as in the United States, if the server sends one or more signals that are registered or effectuated (e.g., like throwing a switch or changing a voltage) in the given territory.

A sale of a system or method may likewise occur in a territory even if components of the system or method are located and/or used outside the territory. Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although end user 1002 is shown/described herein as a single illustrated figure, those skilled in the art will appreciate that end user 1002 may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software (e.g., a high-level computer program serving as a hardware specification) components that deliver or assist in the delivery of computational and/or storage capacity, including, but not limited to, one or more of a client, an application, a platform, an infrastructure, and/or a server. The cloud may refer to any of the hardware and/or software (e.g., a high-level computer program serving as a hardware specification) associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, an application back-end, and/or a programmed application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network and/or the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more program, module, and/or development tools hosted on an infrastructure (e.g., a computing platform and/or a solution stack from which the client can create software-based interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone; B alone; C alone; A and B together; A and C together; B and C together; and/or A, B, and C together; etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone; B alone; C alone; A and B together; A and C together; B and C together; and/or A, B, and C together; etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of (i) "A" or "B" or (ii) "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A machine comprising:
   at least one first component including at least a first set of voltages coupled to at least one light-perturbing unit of at least one display, the first set of voltages corresponding to an indication of at least one media item available for viewing on the at least one display by at least one user;
   at least one second component including at least a second set of voltages coupled to at least one sensor, the second set of voltages representative of at least one parameter of the at least one user; and
   at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to one or more alternate video media items related to the at least one media item and currently being presented on one or more displays of at least one device of one or more social network contacts of the at least one user.

2. The machine of claim 1, wherein the at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to one or more alternate video media items related to the at least one media item and currently being presented on one or more displays of at least one device of one or more social network contacts of the at least one user comprises:

at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to presentation of one or more alternate video media items on the at least one display of the at least one user synchronously with presentation of the one or more alternate video media items on one or more displays of at least one device of one or more social network contacts of the at least one user.

3. The machine of claim 2, wherein the at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to presentation of one or more alternate video media items on the at least one display of the at least one user synchronously with presentation of the one or more alternate video media items on one or more displays of at least one device of one or more social network contacts of the at least one user comprises:

at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to presentation of one or more alternate video media items on the at least one display of the at least one user synchronously with presentation of the one or more alternate video media items on one or more displays of at least one device of one or more social network contacts of the at least one user, wherein speed and position of the one or more alternative video media items is controlled by the at least one device of the one or more social network contacts of the at least one user.

4. The machine of claim 2, wherein the at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to presentation of one or more alternate video media items on the at least one display of the at least one user synchronously with presentation of the one or more alternate video media items on one or more displays of at least one device of one or more social network contacts of the at least one user comprises:

at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to presentation of one or more alternate video media items on the at least one display of the at least one user synchronously and beginning at a position of the one or more alternate video media items on one or more displays of at least one device of one or more social network contacts of the at least one user.

5. The machine of claim 1, wherein the at least one first component including at least a first set of voltages coupled to at least one light-perturbing unit of at least one display, the first set of voltages corresponding to an indication of at least one media item available for viewing on the at least one display by at least one user comprises:

at least one first component including at least a first set of voltages coupled to at least one light-perturbing unit of at least one display, the first set of voltages corresponding to a time index indication of at least one media item available for viewing on the at least one display by at least one user.

6. The machine of claim 1, wherein the at least one first component including at least a first set of voltages coupled to at least one light-perturbing unit of at least one display, the first set of voltages corresponding to an indication of at least one media item available for viewing on the at least one display by at least one user comprises:

at least one first component including at least a first set of voltages coupled to at least one pixel of at least one display, the first set of voltages corresponding to an indication of at least one media item available for viewing on the at least one display by at least one user.

7. The machine of claim 1, wherein the at least one first component including at least a first set of voltages coupled to at least one light-perturbing unit of at least one display, the first set of voltages corresponding to an indication of at least one media item available for viewing on the at least one display by at least one user comprises:

at least one video decoder including at least a first set of voltages coupled to at least one light -perturbing unit of at least one display, the first set of voltages corresponding to an indication of at least one media item available for viewing on the at least one display by at least one user.

8. The machine of claim 1, wherein the at least one first component including at least a first set of voltages coupled to at least one light-perturbing unit of at least one display, the first set of voltages corresponding to an indication of at least one media item available for viewing on the at least one display by at least one user comprises:

at least one first component including at least a first set of voltages coupled to at least one light-perturbing unit of at least one display, the first set of voltages corresponding to a selectable indication of at least one media item available for viewing on the at least one display by at least one user in connection with at least one social network contact.

9. The machine of claim 1, wherein the at least one first component including at least a first set of voltages coupled to at least one light-perturbing unit of at least one display, the first set of voltages corresponding to an indication of at least one media item available for viewing on the at least one display by at least one user comprises:

at least one first component including at least a first set of voltages coupled to at least one light-perturbing unit of at least one display, the first set of voltages corresponding to a selectable indication of at least one media item available for viewing from a beginning position on the at least one display by at least one user.

10. The machine of claim 1, wherein the at least one first component including at least a first set of voltages coupled to at least one light-perturbing unit of at least one display, the first set of voltages corresponding to an indication of at least one media item available for viewing on the at least one display by at least one user comprises:
at least one first component including at least a first set of voltages coupled to at least one light-perturbing unit of at least one display, the first set of voltages corresponding to a selectable indication of at least one media item available for synchronous viewing on the at least one display with at least one social network contact.

11. The machine of claim 1, wherein the at least one second component including at least a second set of voltages coupled to at least one sensor, the second set of voltages representative of at least one parameter of the at least one user comprises:
at least one second component including at least a second set of voltages coupled to at least one image sensor, the second set of voltages representative of at least one parameter of the at least one user.

12. The machine of claim 1, wherein the at least one second component including at least a second set of voltages coupled to at least one sensor, the second set of voltages representative of at least one parameter of the at least one user comprises:
at least one second component including at least a second set of voltages coupled to at least one biometric sensor, the second set of voltages representative of at least one parameter of the at least one user.

13. The machine of claim 1, wherein the at least one second component including at least a second set of voltages coupled to at least one sensor, the second set of voltages representative of at least one parameter of the at least one user comprises:
at least one second component including at least a second set of voltages coupled to at least one touch sensor, the second set of voltages representative of at least one parameter of the at least one user.

14. The machine of claim 1. wherein the at least one second component including at least a second set of voltages coupled to at least one sensor, the second set of voltages representative of at least one parameter of the at least one user comprises:
at least one second component including at least a second set of voltages coupled to at least one sensor, the second set of voltages representative of at least one user authentication parameter of the at least one user.

15. The machine of claim 1, wherein the at least one second component including at least a second set of voltages coupled to at least one sensor, the second set of voltages representative of at least one parameter of the at least one user comprises:
at least one second component including at least a second set of voltages coupled to at least one biometric sensor, the second set of voltages representative of at least one user authentication parameter of the at least one user.

16. The machine of claim 1, wherein the at least one second component including at least a second set of voltages coupled to at least one sensor, the second set of voltages representative of at least one parameter of the at least one user comprises:
at least one second component including at least a second set of voltages coupled to at least one sensor, the second set of voltages representative of interest of the at least one user in the at least one media item.

17. The machine of claim 1, wherein the at least one second component including at least a second set of voltages coupled to at least one sensor, the second set of voltages representative of at least one parameter of the at least one user comprises:
at least one second component including at least a second set of voltages coupled to at least one sensor, the second set of voltages representative of proximity of the at least one user.

18. The machine of claim 1, wherein the at least one second component including at least a second set of voltages coupled to at least one sensor, the second set of voltages representative of at least one parameter of the at least one user comprises:
at least one second component including at least a second set of voltages coupled to at least one sensor, the second set of voltages representative of distance of the at least one user to at least one device.

19. The machine of claim 1, wherein the at least one second component including at least a second set of voltages coupled to at least one sensor, the second set of voltages representative of at least one parameter of the at least one user comprises:
at least one second component including at least a second set of voltages coupled to at least one sensor, the second set of voltages representative of at least one selection of the at least one media item by the at least one user.

20. The machine of claim 1. wherein the at least one second component including at least a second set of voltages coupled to at least one sensor, the second set of voltages representative of at least one parameter of the at least one user comprises:
at least one second component including at least a second set of voltages coupled to at least one capacitive touch sensor for detecting user input, the second set of voltages representative of at least one touch selection of the at least one user.

21. The machine of claim 1, further comprising:
at least one fourth component including at least a fourth set of voltages, the fourth set of voltages corresponding to one or more favorability indications.

22. The machine of claim 1, further comprising:
at least one fourth component including at least a fourth set of voltages, the fourth set of voltages corresponding to one or more favorability indications associated with the one or more social network contacts of the at least one user.

23. The machine of claim 1, further comprising:
at least one fourth component including at least a fourth set of voltages, the fourth set of voltages corresponding to one or more interest indications.

24. The machine of claim 1, further comprising:
at least one fourth component including at least a fourth set of voltages, the fourth set of voltages corresponding to one or more interest indications of the one or more social network contacts with respect to the at least one media item.

25. The machine of claim 1, further comprising:
at least one fourth component including at least a fourth set of voltages, the fourth set of voltages corresponding to one or more indications of one or more media plans of at least one social network contact.

26. The machine of claim 1, further comprising:
at least one fourth component including at least a fourth set of voltages, the fourth set of voltages corresponding to one or more indications of observance of the at least one media item by at least one social network contact.

27. The machine of claim 1, further comprising:
at least one fourth component including at least a fourth set of voltages, the fourth set of voltages corresponding to one or more selectable indications to communicate with at least one social network contact.

28. The machine of claim 1, further comprising:
at least one fourth component including at least a fourth set of voltages, the fourth set of voltages corresponding to one or more selectable indications to communicate with at least one social network contact using at least one microphone.

29. The machine of claim 1, wherein the at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to one or more alternate video media items related to the at least one media item and currently being presented on one or more displays of at least one device of one or more social network contacts of the at least one user comprises:
at least one third component including at least a third set of voltages having one or more voltage levels that are responsive at least to at least a temporary recording of: (i) the first set of voltages of the at least one first component and (ii) the second set of voltages of the at least one second component, the third set of voltages corresponding to one or more alternate video media items related to the at least one media item and currently being presented on one or more displays of at least one device of one or more social network contacts of the at least one user.

30. The machine of claim 1, wherein the at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to one or more alternate video media items related to the at least one media item and currently being presented on one or more displays of at least one device of one or more social network contacts of the at least one user comprises:
at least one third component including at least a third set of voltages having one or more voltage levels that are responsive at least to a user authentication of the at least one user, the third set of voltages corresponding to one or more alternate video media items related to the at least one media item and currently being presented on one or more displays of at least one device of one or more social network contacts of the at least one user.

31. The machine of claim 1, wherein the at least one third component including at least a third set of voltages having one or more voltage levels that are responsive at least to a non-transitory recording of: (i) the first set of voltages of the at least one first component and (ii) the second set of voltages of the at least one second component, the third set of voltages corresponding to one or more alternate video media items related to the at least one media item and currently being presented on one or more displays of at least one device of one or more social network contacts of the at least one user comprises:
at least one third component including at least a third set of voltages having one or more voltage levels that are responsive at least to a touch input selection of the at least one media item by the at least one user, the third set of voltages corresponding to one or more alternate video media items related to the at least one media item and currently being presented on one or more displays of at least one device of one or more social network contacts of the at least one user.

\* \* \* \* \*

UNITED STATES PATENT AND TRADEMARK OFFICE
CERTIFICATE OF CORRECTION

PATENT NO. : 10,055,693 B2
APPLICATION NO. : 14/338345
DATED : August 21, 2018
INVENTOR(S) : Edward K. Y. Jung et al.

It is certified that error appears in the above-identified patent and that said Letters Patent is hereby corrected as shown below:

In the Claims

Column 73, Line 32, Claim 29 reads:
"responsive at least to at least a temporary recording"
Should read:
--responsive to at least a temporary recording--

Signed and Sealed this
Eighteenth Day of September, 2018

Andrei Iancu
*Director of the United States Patent and Trademark Office*